United States Patent
Long et al.

(10) Patent No.: US 11,110,405 B2
(45) Date of Patent: Sep. 7, 2021

(54) ADSORPTION-ENHANCED AND PLASTICIZATION RESISTANT COMPOSITE MEMBRANES

(71) Applicant: The Regents of the University of California, Oakland, CA (US)

(72) Inventors: Jeffrey R. Long, Oakland, CA (US); Jonathan Bachman, Berkeley, CA (US); Zachary Pace Smith, Belmont, MA (US)

(73) Assignee: The Regents of the University of California, Oakland, CA (US)

(*) Notice: Subject to any disclaimer, the term of this patent is extended or adjusted under 35 U.S.C. 154(b) by 62 days.

(21) Appl. No.: 15/775,376

(22) PCT Filed: Nov. 15, 2016

(86) PCT No.: PCT/US2016/062103
§ 371 (c)(1),
(2) Date: May 10, 2018

(87) PCT Pub. No.: WO2017/087422
PCT Pub. Date: May 26, 2017

(65) Prior Publication Data
US 2019/0247804 A1    Aug. 15, 2019

Related U.S. Application Data

(60) Provisional application No. 62/256,097, filed on Nov. 16, 2015.

(51) Int. Cl.
*B01D 69/14* (2006.01)
*B01D 67/00* (2006.01)
(Continued)

(52) U.S. Cl.
CPC ........ *B01D 69/148* (2013.01); *B01D 53/02* (2013.01); *B01D 53/04* (2013.01); *B01D 53/228* (2013.01);
(Continued)

(58) Field of Classification Search
CPC ...... B01D 53/02; B01D 53/04; B01D 53/228; B01D 67/0079; B01D 69/148;
(Continued)

(56) References Cited

U.S. PATENT DOCUMENTS 7,637,983 B1    12/2009 Liu et al.
9,597,643 B1 *  3/2017 Albenze ............... B01D 53/228
(Continued)

FOREIGN PATENT DOCUMENTS

WO    2014028574 A2    2/2014

OTHER PUBLICATIONS

Thomas, Shane, International Search Report and Written Opinion, PCT/US2016/062103, United States Patent & Trademark Office, dated Feb. 6, 2017.
(Continued)

*Primary Examiner* — Jason M Greene
(74) *Attorney, Agent, or Firm* — Gavrilovich, Dodd & Lindsey LLP

(57) ABSTRACT

The disclosure provides for polymer membranes which comprise metal organic frameworks, methods of making therein, and methods of use thereof, including in gas separation.

15 Claims, 36 Drawing Sheets

(51) Int. Cl.
  *B01D 69/02* (2006.01)
  *B01D 71/64* (2006.01)
  *B01D 53/62* (2006.01)
  *B01D 53/02* (2006.01)
  *B01D 53/22* (2006.01)
  *B01J 20/28* (2006.01)
  *B01J 20/22* (2006.01)
  *B01D 53/04* (2006.01)
  *B01D 69/12* (2006.01)

(52) U.S. Cl.
  CPC ......... *B01D 53/62* (2013.01); *B01D 67/0079* (2013.01); *B01D 69/02* (2013.01); *B01D 69/12* (2013.01); *B01D 71/64* (2013.01); *B01J 20/226* (2013.01); *B01J 20/28026* (2013.01); *B01J 20/28033* (2013.01); *B01D 2253/204* (2013.01); *B01D 2256/10* (2013.01); *B01D 2256/16* (2013.01); *B01D 2256/22* (2013.01); *B01D 2256/24* (2013.01); *B01D 2256/245* (2013.01); *B01D 2257/102* (2013.01); *B01D 2257/108* (2013.01); *B01D 2257/504* (2013.01); *B01D 2257/702* (2013.01); *B01D 2257/7022* (2013.01); *B01D 2257/7025* (2013.01); *B01D 2325/02* (2013.01); *B01D 2325/30* (2013.01); *Y02C 20/20* (2013.01); *Y02C 20/40* (2020.08)

(58) Field of Classification Search
  CPC ............. B01D 71/64; B01D 2253/204; B01D 2323/30; B01D 2325/30; B01J 20/226; B01J 20/28026; B01J 20/28033
  See application file for complete search history.

(56) References Cited

U.S. PATENT DOCUMENTS

| | | | |
|---|---|---|---|
| 2013/0096210 A1* | 4/2013 | Yaghi ................ | B01J 20/226 514/784 |
| 2013/0313193 A1 | 11/2013 | Nair et al. | |
| 2014/0061540 A1 | 3/2014 | Long et al. | |
| 2014/0179514 A1* | 6/2014 | Matzger ............. | B01J 20/226 502/165 |
| 2015/0101986 A1* | 4/2015 | Odeh .................. | B01D 69/148 210/640 |
| 2016/0030893 A1* | 2/2016 | Lind ................... | B01D 69/148 210/650 |
| 2016/0367948 A1* | 12/2016 | Song .................. | B01D 69/148 |
| 2017/0189866 A1* | 7/2017 | Koros ................. | B01D 69/148 |

OTHER PUBLICATIONS

Wessling et al., "Plasticization of gas separation membranes," Gas Separation & Purification, vol. 5, pp. 222-226, 1991.

Xiaofan Tang, International Preliminary Report on Patentability and Written Opinion, The International Bureau of WIPO, PCT/US2016/062013, dated May 31, 2018.

\* cited by examiner

Jeffamine ED-2003

PEBAX™: Poly(amide 12 –b-tetramethylene oxide)

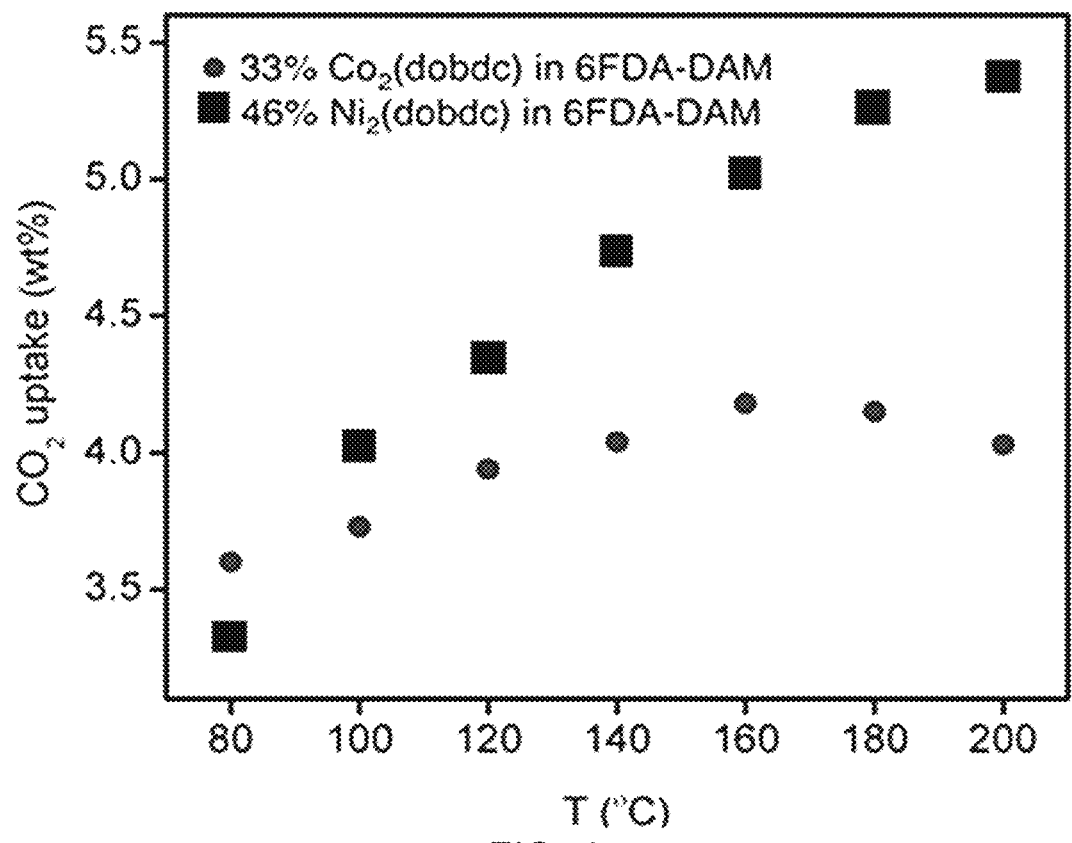
FIG. 4
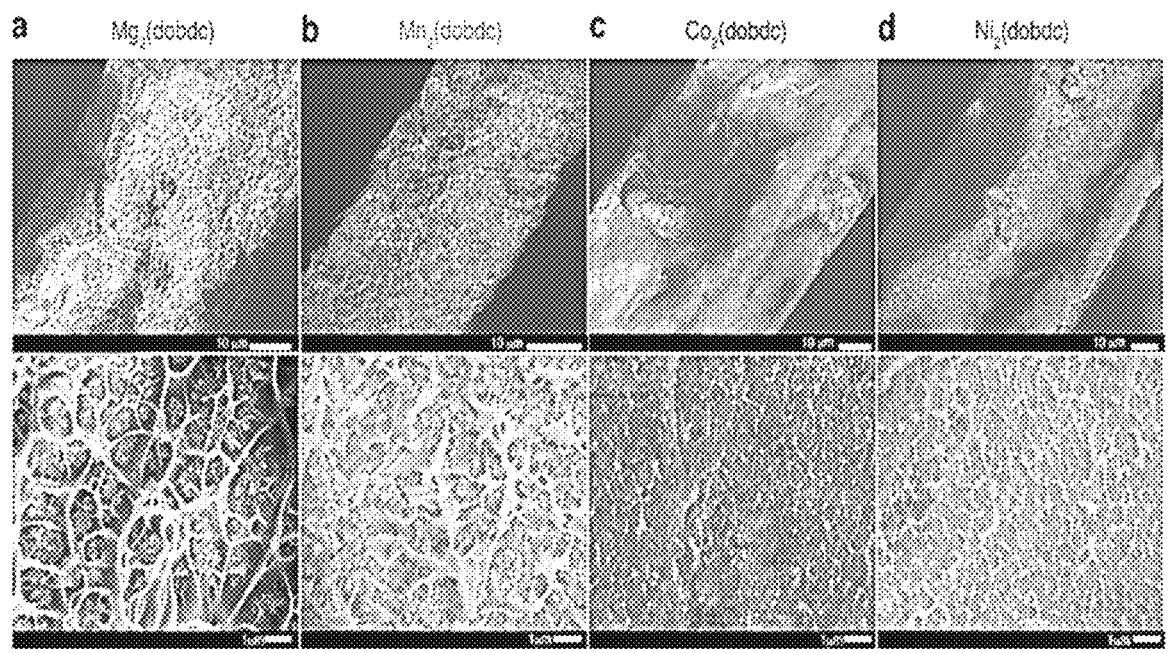
FIG. 5A-D

ADSORPTION-ENHANCED AND PLASTICIZATION RESISTANT COMPOSITE MEMBRANES

CROSS REFERENCE TO RELATED APPLICATIONS

This application is a U.S. National Stage Application filed under 35 U.S.C. § 371 and claims priority from International Application No. PCT/US2016/062103, filed Nov. 15, 2016, which application claims priority under 35 U.S.C. § 119 from Provisional Application Ser. No. 62/256,097, filed Nov. 16, 2015, the disclosures of which are incorporated herein by reference.

STATEMENT OF GOVERNMENT SUPPORT

This invention was made with government support under grant number DE-SC0001015 awarded the U.S. Department of Energy (DOE). The government has certain rights in the invention.

TECHNICAL FIELD

The disclosure provides for polymer membranes that comprise microporous adsorbents, methods of making therein, and methods of use thereof, including in gas separations.

BACKGROUND

Separations in the chemical and petrochemical industries are extremely energy intensive, and improving process efficiency has the potential to create significant cost and environmental savings. Some of the most challenging industrial gas separations is the purification of olefins from olefin/paraffin mixtures, purification of $H_2$ from syngas, and the removal of $CO_2$ from natural gas which is accomplished today by absorption and distillation. Membranes have been proposed as replacements for or supplements to conventional distillation, and although numerous membrane materials have shown promise for these separation, there are no materials with adequate separation performance under realistic process conditions.

SUMMARY

There are a number of gas separations that cannot be achieved using neat polymer membranes because the highest performing membranes do not have a sufficient selectivity or permeability to compete with other separation technologies, or they fail to retain high selectivities in the presence of plasticizing gases. The compositions and methods disclosed herein provide for membranes that are resistant to plasticization effects, and provide improved selectivity and permeability via an adsorptive enhancement. The incorporation of metal-organic frameworks (MOFs) into polymer membranes reduces the plasticization response of the membrane, and increases the amount of the targeted gas adsorbed into the film. The incorporation of MOFs resulted in significant reductions in plasticization effects, and significant enhancements in gas solubility and separation performance. These effects were generalized to numerous membrane compositions, including various polymer types as well as MOF nanocrystal types, indicating that this method is general across a broad range of compositions.

The disclosure provides a composite membrane comprising a metal organic framework (MOF) dispersed within a polymer material, wherein the composite membrane maintains high selectivity for a component gas in the presence of plasticizing gases when compared to the pure polymer material. In one embodiment, the polymer material is selected from the group consisting of polyimides, polyetherimides, polyamides, aryl polyetherimides, Ultem 1000, (4,4'-hexafluoroisopropylidene) diphthalic anhydride (6FDA)-based polyimides, 6FDADAM, 6FDA-Durene, 6FDA-Durene:Jeffamine copolymers; cellulosic polymers, cellulose acetate, cellulose triacetate, cellulose acetate-butyrate, cellulose propionate, ethyl cellulose, methyl cellulose, nitrocellulose, polycarbonate polymers, polystyrene, acrylonitrilestyrene copolymers, styrene-butadiene copolymers, styrene-vinylbenzylhalide copolymers, polysulfone, polyether, poly(arylene oxide) polymers, poly(phenylene oxide), poly(xylene oxide), poly(esteramide-diisocyanate), polyurethane, polyester polymers, polyarylate polymers, poly(ethylene terephthalate), poly(alkyl methacrylates), poly(acrylates), poly(phenylene terephthalate), polysulfide polymers, poly (ethylene), poly(propylene), poly(butene-1), poly(4-methyl pentene-1), polyvinyls, poly(vinyl chloride), poly(vinyl fluoride), poly(vinylidene chloride), poly(vinylidene fluoride), poly(vinyl alcohol), poly(vinyl esters), poly(vinyl acetate, poly(vinyl propionate), poly(vinyl pyridines), poly(vinyl pyrrolidones), poly(vinyl ethers), poly (vinyl ketones), poly(vinyl aldehydes), poly(vinyl formal), poly(vinyl butyral), poly(vinyl amides), poly(vinyl amines), poly(vinyl urethanes), poly(vinyl ureas), poly(vinyl phosphates), and poly(vinyl sulfates), polyallyls, poly(benzobenzimidazole), polyhydrazides, polyoxadiazoles, polytriazoles, poly (benzimidazole), polycarbodiimides, and polyphosphazines. In another or further embodiment, the polymer material is a 6FDA-based polyimide material. In still yet a further embodiment, the polymer material comprises 6FDA-DAM, 6FDA-DAT, 6FDA-Durene, 6FDA-DAM:DAT, 6FDA-DAT:Durene, poly(ether-b-amide), or 6FDA-Durene:Jeffamine as composite materials (membranes) comprised of nanocrystals of the metal-organic frameworks $M_2(dobdc)$ (M=Mg, Mn, Co, Ni; $dobdc^{4-}$=2,5-dioxido-1,4-benzenedicarboxylate), and $M_2(dobpdc)$ (M=Mg; $dobpdc^{4-}$=4,4'-dioxidobiphenyl-3,3'-dicarboxylate) dispersed within a high-performance polymers, which display enhanced selectivity for ethylene over ethane, $CO_2$ over methane, $CO_2$ over $H_2$, greater $C_2H_4$ or $CO_2$ permeability, and improved membrane stability. The results presented herein show that framework-polymer interactions reduce chain mobility of the polymer while simultaneously boosting membrane separation performance. The increased stability, or plasticization resistance, is expected to improve membrane utility under real process conditions for petrochemical separations and natural gas purification. Furthermore, this approach can be broadly applied to numerous polymers that encounter aggressive environments, potentially making gas separations previously inaccessible to membranes now possible. In a particular embodiment, the disclosure provides for a polymer membrane comprising a metal organic framework (MOF) dispersed within a polymer material, wherein the polymer membrane maintains high selectivity for a component gas in the presence of plasticizing gases. In yet another embodiment of any of the foregoing embodiments, the MOF comprises one or more cores made from one or more linking moieties of structural Formula I-X:

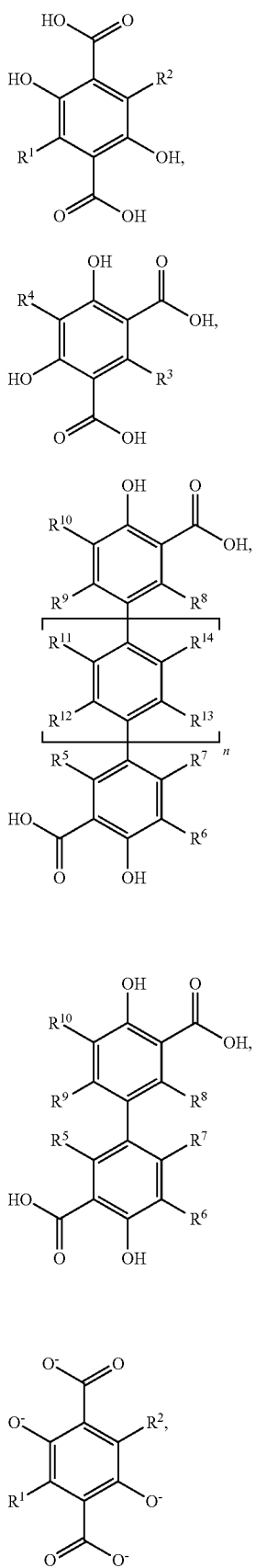
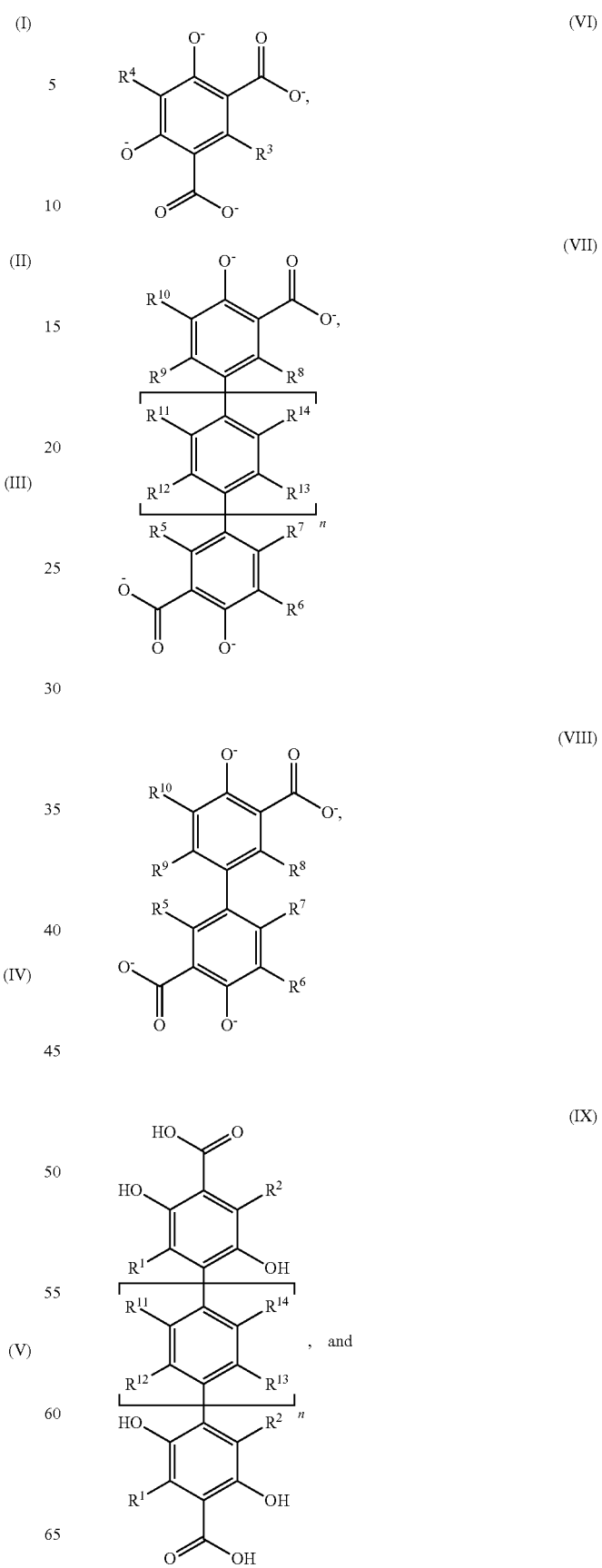

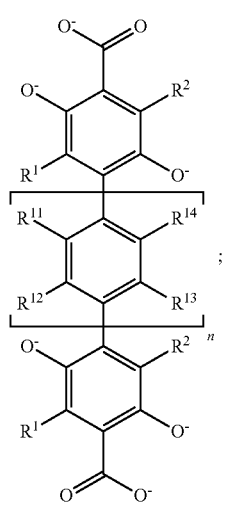

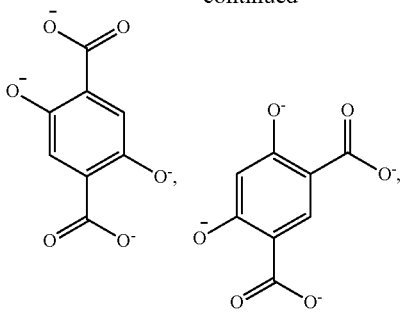

wherein $R^1$-$R^{14}$ are independently selected from H, D, optionally substituted FG, optionally substituted ($C_1$-$C_{20}$) alkyl, optionally substituted ($C_1$-$C_{19}$)heteroalkyl, optionally substituted ($C_1$-$C_{20}$)alkenyl, optionally substituted ($C_1$-$C_{19}$) heteroalkenyl, optionally substituted ($C_1$-$C_{19}$)alkynyl, optionally substituted ($C_1$-$C_{19}$)heteroalkynyl, optionally substituted ($C_1$-$C_{19}$)cycloalkyl, optionally substituted ($C_1$-$C_{19}$)cycloalkenyl, optionally substituted aryl, optionally substituted heterocycle, optionally substituted mixed ring system, wherein one or more adjacent R groups can be linked together to form one or more substituted rings selected from the group comprising cycloalkyl, cycloalkenyl, heterocycle, aryl, and mixed ring system, and wherein n=0 to 3. In still a further embodiment, the linking moiety is obtained from a structure selected from the group consisting of:

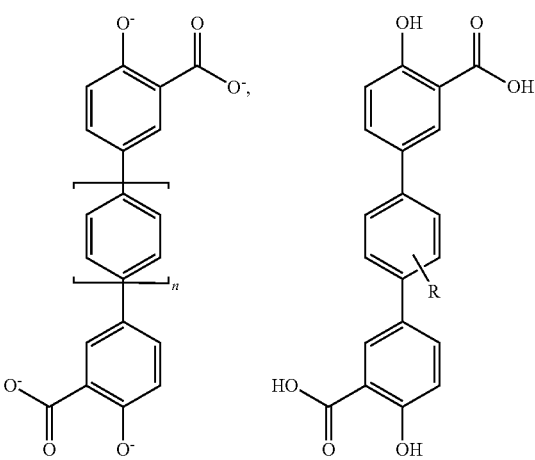

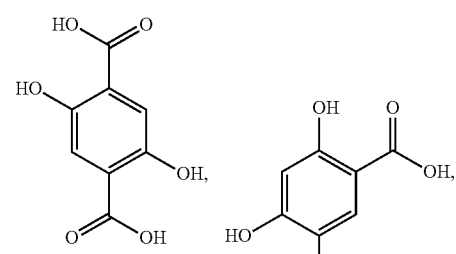

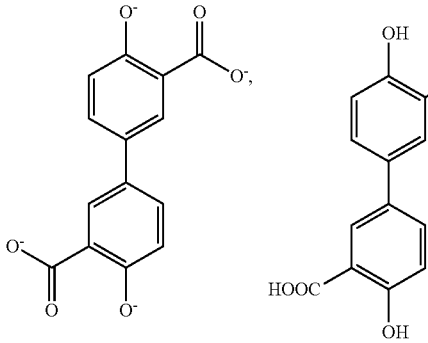

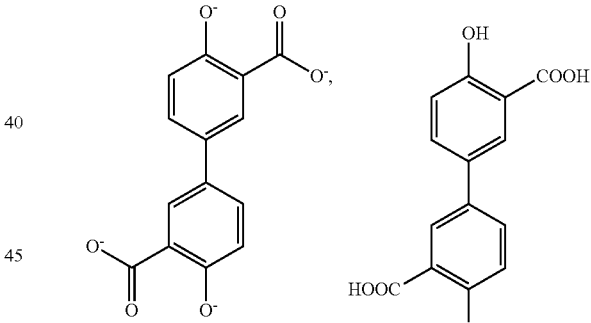

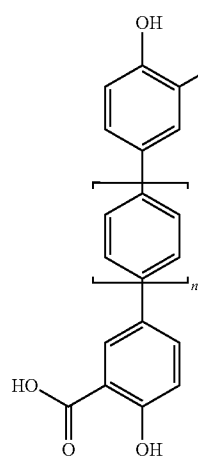

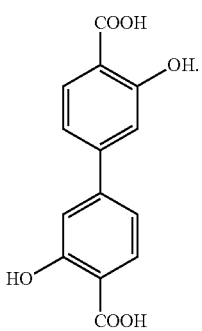

In yet another embodiment, the MOF comprises one or more cores comprising one or more linking moieties obtained from:

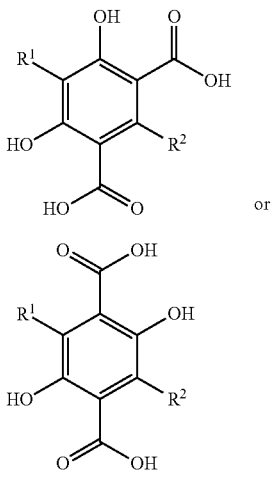

Formula (I)

or

Formula (II)

wherein, $R^1$-$R^2$ are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, and optionally substituted mixed ring system. In yet another or further embodiment, the MOF comprises one or more cores obtained from linking moieties of structural Formula I(a) or Formula II(a):

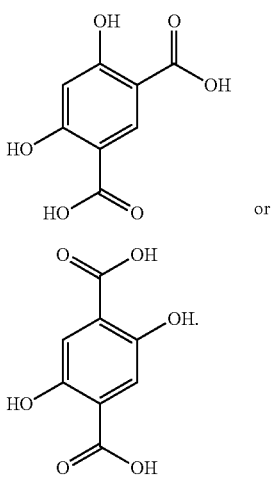

Formula I(a)

or

Formula II(a)

In still yet another embodiment of any of the foregoing embodiments, the cores of the MOF comprises a metal or metal ion selected from $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $Nb^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, Cr, $Mo^{6+}$, $Mo^{5+}$, $Mo^{4+}$, $Mo^{3+}$, $Mo^{2+}$, $Mo^+$, Mo, $W^{6+}$, $W^{5+}$, $W^{4+}$, $W^{3+}$, $W^{2+}$, $W^+$, W, $Mn^{7+}$, $Mn^{6+}$, $Mn^{5+}$, $Mn^{4+}$, $Mn^{3+}$, $Mn^{2+}$, $Mn^+$, $Re^+$, $Re^{6+}$, $Re^{5+}$, $Re^+$, $Re^{3+}$, $Re^{2+}$, $Re^+$, Re, $Fe^{6+}$, $Fe^{4+}$, $Fe^{3+}$, $Fe^{2+}$, $Fe^+$, Fe, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $Os^{4+}$, $Os^{3+}$, $Os^{2+}$, $Os^+$, Os, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^+$, Ir, $Ni^{3+}$, $Ni^{2+}$, $Ni^+$, Ni, $Pd^{6+}$, $Pd^{4+}$, $Pd^{2+}$, $Pd^+$, Pd, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au^+$, $Zn^{2+}$, $Zn^+$, Zn, $Cd^{2+}$, $Cd^+$, $Hg^{4+}$, $Hg^{2+}$, $Hg^+$, $B^{3+}$, $B^{2+}$, $B^+$, $Al^{3+}$, $Al^{2+}$, $Al^+$, $Ga^{3+}$, $Ga^{2+}$, $Ga^+$, $In^{3+}$, $In^{2+}$, $In^+$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, Ge, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $Db^{3+}$, $Db^{2+}$, $Ho^{3+}$, $Er^{3+}$, $Tm^{4+}$, $Tm^{3+}$, $Tm^{2+}$, $Yb^{3+}$, $Yb^{2+}$, $Lu^{3+}$, and any combination thereof, including any complexes which contain the metals or metal ions listed above, as well as any corresponding metal salt counter-anions. In yet a further embodiment, the cores of the MOF comprise divalent metal ions. In still a further embodiment, the divalent metal ions are selected from $Mg^{2+}$, $Mn^{2+}$, $Fe^{2+}$, $Co^{2+}$, $Zn^{2+}$ and $Ni^{2+}$. In yet another embodiment, the MOF material imparts chemical stability to the composite membrane. In still yet another embodiment, the MOF imparts adsorptive selectivity to the composite membrane.

The disclosure also provides a method to separate a component gas from a gas mixture comprising contacting the gas mixture with a composite membrane of the disclosure, wherein the component gas is selectively adsorbed to the polymer membrane, and wherein the polymer membrane exhibits resistance to plasticization effects from plasticizing gases. In another embodiment, the method is carried out in the presence of plasticizing gases. In still another embodiment, the plasticizing gases are selected from $CO_2$, $C_2H_4$, $C_2H_6$, $C_3H_6$, $C_3H_8$, and/or butanes. In yet another or further embodiment, the method can be carried out at a pressure of greater than 20 bar. In still yet another or further embodiment, the membrane selectively adsorbs a high density gas. In yet another or further embodiment, the composite membrane can separate $CO_2$ from $CH_4$, $CO_2$ from $N_2$, $CO_2$ from $H_2$, $C_2H_4$ from $C_2H_6$, $C_3H_6$ from $C_3H_8$, $CH_4$ from $C_2H_6$, $H_2$ from hydrocarbons, and/or butenes or longer chain alkenes from alkanes.

DESCRIPTION OF DRAWINGS

FIG. 4 provides activation temperature screening for $Ni_2$(dobdc)/6FDA-DAM and $Co_2$(dobdc)/6FDA-DAM mixed-matrix membranes. Flowing $CO_2$ measured at 40° C. after activation at increasing temperatures and the mass of $CO_2$ adsorbed was measured gravimetrically.

FIG. 5A-D presents cross-sectional images of $M_2$(dobdc)/ 6FDA-DAM membranes. Scanning electron micrographs for (A) $Mg_2$(dobdc), (B) $Mn_2$(dobdc), (C) $Co_2$(dobdc), and (D) $Ni_2$(dobdc). Scale bars represent 10 μm for the top row of images and 1 μm for the bottom row.

DETAILED DESCRIPTION

Figure 1A:
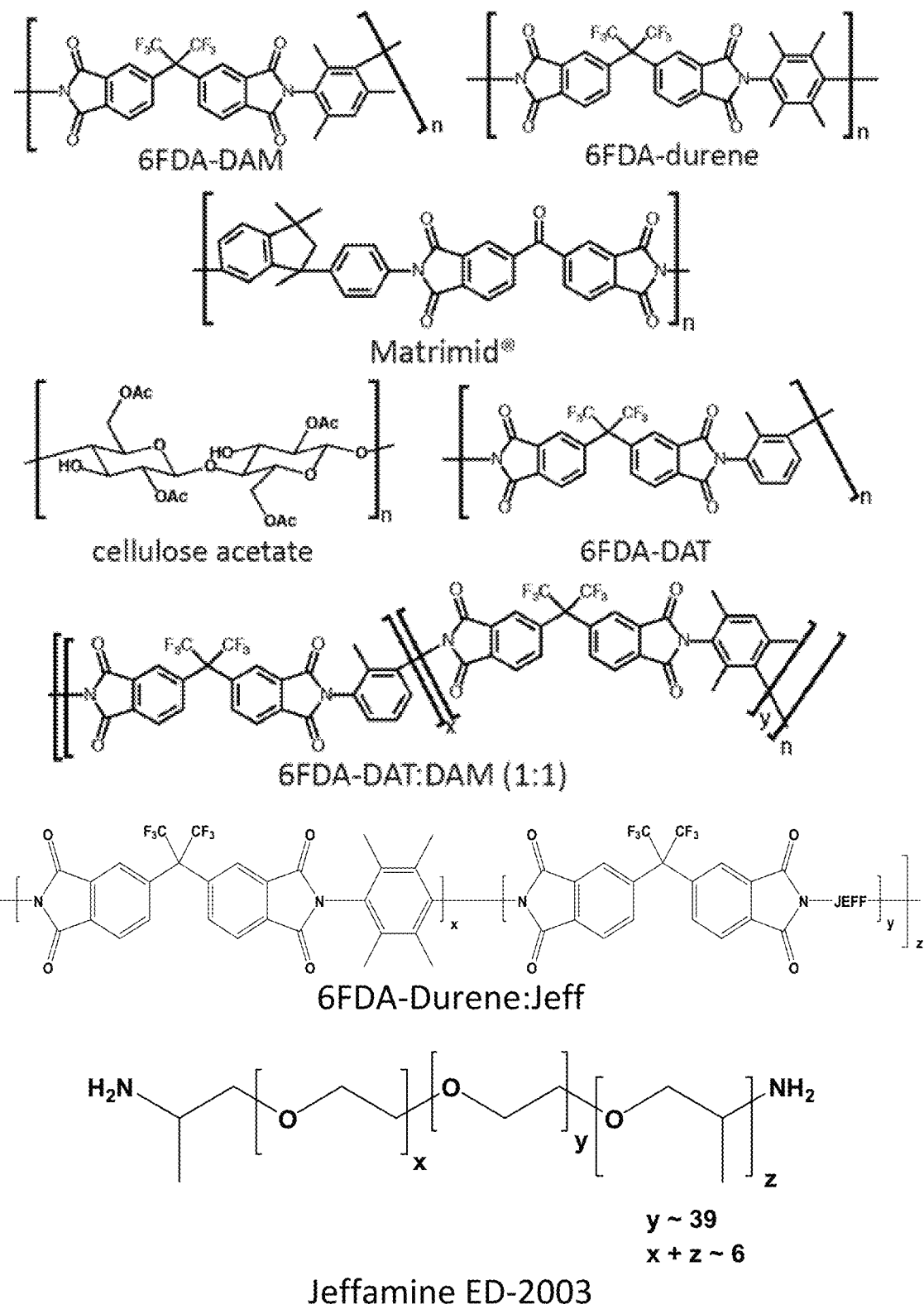
FIG. 1A-B provides structures of polymers used for compositing with MOF. (A) Shows MATRAMID, 6FDA-durene, cellulose acetate, 6FDA-DAT, 6FDA-DAT:DAM(1:1), 6FDA-DAM, and JEFFAMINE. Various amounts of the Jeffamine segment (bottom) were incorporated into 6FDA-Durene to create four different copolymers including J(0) (0 mol % Jeffamine), J(1) (1 mol %, 6.4 wt %), J(5) (5 mol %, 26 wt %), and J(10) (10 mol %, 41 wt %). (B) Shows the structure of PEBAX (poly(amide12-b-tetramethyline oxide) used as a rubbery polymer for $CO_2$ based separations.

As used herein and in the appended claims, the singular forms "a," "an," and "the" include plural referents unless the context clearly dictates otherwise. Thus, for example, reference to "an organic linking ligand" includes a plurality of such linking ligands and reference to "the metal ion" includes reference to one or more metal ions and equivalents thereof known to those skilled in the art, and so forth.

Unless defined otherwise, all technical and scientific terms used herein have the same meaning as commonly understood to one of ordinary skill in the art. Although there are many methods and reagents similar or equivalent to those described herein, the exemplary methods and materials are presented herein.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

Any publications cited herein are provided solely for their disclosure prior to the filing date of the present application. Nothing herein is to be construed as an admission that the inventors are not entitled to antedate such disclosure by virtue of prior disclosure.

The term "alkyl", refers to an organic group that is comprised of carbon and hydrogen atoms that contain single covalent bonds between carbons. Typically, an "alkyl" as used in this disclosure, refers to an organic group that contains 1 to 30 carbon atoms, unless stated otherwise. Where if there is more than 1 carbon, the carbons may be connected in a linear manner, or alternatively if there are more than 2 carbons then the carbons may also be linked in a branched fashion so that the parent chain contains one or more secondary, tertiary, or quaternary carbons. An alkyl may be substituted or unsubstituted, unless stated otherwise.

The term "alkenyl", refers to an organic group that is comprised of carbon and hydrogen atoms that contains at least one double covalent bond between two carbons. Typically, an "alkenyl" as used in this disclosure, refers to organic group that contains 1 to 30 carbon atoms, unless stated otherwise. While a $C_1$-alkenyl can form a double bond to a carbon of a parent chain, an alkenyl group of three or more carbons can contain more than one double bond. It certain instances the alkenyl group will be conjugated, in other cases an alkenyl group will not be conjugated, and yet other cases the alkenyl group may have stretches of conjugation and stretches of nonconjugation. Additionally, if there is more than 1 carbon, the carbons may be connected in a linear manner, or alternatively if there are more than 3 carbons then the carbons may also be linked in a branched fashion so that the parent chain contains one or more secondary, tertiary, or quaternary carbons. An alkenyl may be substituted or unsubstituted, unless stated otherwise.

The term "alkynyl", refers to an organic group that is comprised of carbon and hydrogen atoms that contains a triple covalent bond between two carbons. Typically, an "alkynyl" as used in this disclosure, refers to organic group that contains 1 to 30 carbon atoms, unless stated otherwise. While a $C_1$-alkynyl can form a triple bond to a carbon of a parent chain, an alkynyl group of three or more carbons can contain more than one triple bond. Where if there is more than 1 carbon, the carbons may be connected in a linear manner, or alternatively if there are more than 4 carbons then the carbons may also be linked in a branched fashion so that the parent chain contains one or more secondary, tertiary, or quaternary carbons. An alkynyl may be substituted or unsubstituted, unless stated otherwise.

The term "cycloalkyl", as used in this disclosure, refers to an alkyl that contains at least 3 carbon atoms but no more than 12 carbon atoms connected so that it forms a ring. A "cycloalkyl" for the purposes of this disclosure encompass from 1 to 12 cycloalkyl rings, wherein when the cycloalkyl is greater than 1 ring, then the cycloalkyl rings are joined so that they are linked, fused, or a combination thereof. A cycloalkyl may be substituted or unsubstituted, or in the case of more than one cycloalkyl ring, one or more rings may be unsubstituted, one or more rings may be substituted, or a combination thereof.

The term "cycloalkenyl", as used in this disclosure, refers to an alkene that contains at least 3 carbon atoms but no more than 12 carbon atoms connected so that it forms a ring. A "cycloalkenyl" for the purposes of this disclosure encompass from 1 to 12 cycloalkenyl rings, wherein when the cycloalkenyl is greater than 1 ring, then the cycloalkenyl rings are joined so that they are linked, fused, or a combination thereof. A cycloalkenyl may be substituted or unsubstituted, or in the case of more than one cycloalkenyl ring, one or more rings may be unsubstituted, one or more rings may be substituted, or a combination thereof.

The term "aryl", as used in this disclosure, refers to a conjugated planar ring system with delocalized pi electron clouds that contain only carbon as ring atoms. An "aryl" for the purposes of this disclosure encompass from 1 to 12 aryl rings wherein when the aryl is greater than 1 ring the aryl rings are joined so that they are linked, fused, or a combination thereof. An aryl may be substituted or unsubstituted, or in the case of more than one aryl ring, one or more rings may be unsubstituted, one or more rings may be substituted, or a combination thereof.

The term "heterocycle", as used in this disclosure, refers to ring structures that contain at least 1 noncarbon ring atom. A "heterocycle" for the purposes of this disclosure encompass from 1 to 12 heterocycle rings wherein when the heterocycle is greater than 1 ring the heterocycle rings are joined so that they are linked, fused, or a combination thereof. A heterocycle may be a hetero-aryl or nonaromatic, or in the case of more than one heterocycle ring, one or more rings may be nonaromatic, one or more rings may be hetero-aryls, or a combination thereof. A heterocycle may be substituted or unsubstituted, or in the case of more than one heterocycle ring one or more rings may be unsubstituted, one or more rings may be substituted, or a combination thereof. Typically, the noncarbon ring atom is N, O, S, Si, Al, B, or P. In case where there is more than one noncarbon ring atom, these noncarbon ring atoms can either be the same element, or combination of different elements, such as N and O. Examples of heterocycles include, but are not limited to: a monocyclic heterocycle such as, aziridine, oxirane, thiirane, azetidine, oxetane, thietane, pyrrolidine, pyrroline, imidazolidine, pyrazolidine, pyrazoline, dioxolane, sulfolane 2,3-dihydrofuran, 2,5-dihydrofuran tetrahydrofuran, thiophane, piperidine, 1,2,3,6-tetrahydro-pyridine, piperazine, morpholine, thiomorpholine, pyran, thiopyran, 2,3-dihydropyran, tetrahydropyran, 1,4-dihydropyridine, 1,4-dioxane, 1,3-dioxane, dioxane, homopiperidine, 2,3,4,7-tetrahydro-1H-azepine homopiperazine, 1,3-dioxepane, 4,7-dihydro-1,3-dioxepin, and hexamethylene oxide; and polycyclic heterocycles such as, indole, indoline, isoindoline, quinoline, tetrahydroquinoline, isoquinoline, tetrahydroisoquinoline, 1,4-benzodioxan, coumarin, dihydrocoumarin, benzofuran, 2,3-dihydrobenzofuran, isobenzofuran, chromene, chroman, isochroman, xanthene, phenoxathiin, thianthrene, indolizine, isoindole, indazole, purine, phthalazine, naphthyridine, quinoxaline, quinazoline, cinnoline, pteridine, phenanthridine, perimidine, phenanthroline, phenazine, phenothiazine, phenoxazine, 1,2-benzisoxazole, benzothiophene, benzoxazole, benzthiazole, benzimidazole, benztriazole, thioxanthine, carbazole, carboline, acridine, pyrolizidine, and quinolizidine. In addition to the polycyclic heterocycles described above, heterocycle includes polycyclic heterocycles wherein the ring fusion between two or more rings includes more than one bond common to both rings and more than two atoms common to both rings. Examples of such bridged heterocycles include quinuclidine, diazabicyclo[2.2.1]heptane and 7-oxabicyclo[2.2.1]heptane.

The terms "heterocyclic group", "heterocyclic moiety", "heterocyclic", or "heterocyclo" used alone or as a suffix or prefix, refers to a heterocycle that has had one or more hydrogens removed therefrom.

The term "hetero-" when used as a prefix, such as, hetero-alkyl, hetero-alkenyl, hetero-alkynyl, or hetero-hydrocarbon, for the purpose of this disclosure refers to the specified hydrocarbon having one or more carbon atoms replaced by non-carbon atoms as part of the parent chain. Examples of such non-carbon atoms include, but are not limited to, N, O, S, Si, Al, B, and P. If there is more than one non-carbon atom in the hetero-based parent chain then this atom may be the same element or may be a combination of different elements, such as N and O.

The term "mixed ring system" refers to optionally substituted ring structures that contain at least two rings, and wherein the rings are joined together by linking, fusing, or a combination thereof. A mixed ring system comprises a combination of different ring types, including cycloalkyl, cycloalkenyl, aryl, and heterocycle.

The term "unsubstituted" with respect to hydrocarbons, heterocycles, and the like, refers to structures wherein the parent chain contains no substituents.

The term "substituted" with respect to hydrocarbons, heterocycles, and the like, refers to structures wherein the parent chain contains one or more substituents.

The term "substituent" refers to an atom or group of atoms substituted in place of a hydrogen atom. For purposes of this disclosure, a substituent would include deuterium atoms.

The term "hydrocarbons" refers to groups of atoms that contain only carbon and hydrogen. Examples of hydrocarbons that can be used in this disclosure include, but are not limited to, alkanes, alkenes, alkynes, arenes, and benzyls. In a particular embodiment, the hydrocarbon is an aromatic hydrocarbon.

The term "functional group" or "FG" refers to specific groups of atoms within molecules that are responsible for the characteristic chemical reactions of those molecules. While the same functional group will undergo the same or similar chemical reaction(s) regardless of the size of the molecule it is a part of, its relative reactivity can be modified by nearby functional groups. The atoms of functional groups are linked to each other and to the rest of the molecule by covalent bonds. Examples of FGs that can be used in this disclosure, include, but are not limited to, substituted or unsubstituted alkyls, substituted or unsubstituted alkenyls, substituted or unsubstituted alkynyls, substituted or unsubstituted aryls, substituted or unsubstituted hetero-alkyls, substituted or unsubstituted hetero-alkenyls, substituted or unsubstituted hetero-alkynyls, substituted or unsubstituted cycloalkyls, substituted or unsubstituted cycloalkenyls, substituted or unsubstituted hetero-aryls, substituted or unsubstituted heterocycles, halos, hydroxyls, anhydrides, carbonyls, carboxyls, carbonates, carboxylates, aldehydes, haloformyls, esters, hydroperoxy, peroxy, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, $Si(OH)_3$, $Ge(OH)_3$, $Sn(OH)_3$, $Si(SH)_4$, $Ge(SH)_4$, $AsO_3H$, $AsO_4H$, $P(SH)_3$, $As(SH)_3$, $SO_3H$, $Si(OH)_3$, $Ge(OH)_3$, $Sn(OH)_3$, $Si(SH)_4$, $Ge(SH)_4$, $Sn(SH)_4$, $AsO_3H$, $AsO_4H$, $P(SH)_3$, and $As(SH)_3$.

The term "framework" as used herein, refers to a highly ordered structure comprised of secondary building units (SBUs) that can be linked together in defined, repeated and controllable manner, such that the resulting structure is characterized as being porous, periodic and crystalline. Typically, "frameworks" are two dimensional (2D) or three dimensional (3D) structures. Examples of "frameworks" include, but are not limited to, "metal-organic frameworks" or "MOFs", "zeolitic imidazolate frameworks" or "ZIFs", or "covalent organic frameworks" or "COFs". While MOFs and ZIFs comprise SBUs of metals or metal ions linked together by forming covalent bonds with linking clusters on organic linking moieties, COFs are comprised of SBUs of organic linking moieties that are linked together by forming covalent bonds via linking clusters. As used herein, "framework" does not refer to coordination complexes or metal complexes. Coordination complexes or metal complexes are comprised of a relatively few number of centrally coordinated metal ions (i.e., less than 4 central ions) that are coordinately bonded to molecules or ions, also known as ligands or complexing agents. By contrast, "frameworks" are highly ordered and extended structures that are not based upon a centrally coordinated ion, but involve many repeated secondary building units (SBUs) linked together (e.g., >10, >100, >1000, >10,000, etc.). Accordingly, "frameworks" are orders of magnitude much larger than coordination complexes and have different structural and chemical properties due to the framework's open and ordered structure.

A "linking moiety" refers to a parent chain that binds a metal or metal ion or a plurality of metals or metal ions. A linking moiety may be further substituted post synthesis by reacting with one or more post-framework reactants.

The term "linking cluster" refers to one or more atoms capable of forming an association, e.g. covalent bond, polar covalent bond, ionic bond, and Van Der Waal interactions, with one or more atoms of another linking moiety, and/or one or more metal or metal ions. A linking cluster can be part of the parent chain itself and/or additionally can arise from functionalizing the parent chain, e.g. adding carboxylic acid groups to the parent chain. For example, a linking cluster can comprise $NN(H)N$, $N(H)NN$, $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_4$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, $CH(SH)_2$, $C(SH)_3$, $CH(NH_2)_2$, $C(NH_2)_3$, $CH(OH)_2$, $C(OH)_3$, $CH(CN)_2$, and $C(CN)_3$, wherein R is an alkyl group having from 1 to 5 carbon atoms, or an aryl group comprising 1 to 2 phenyl rings and $CH(SH)_2$, $C(SH)_3$, $CH(NH_2)_2$, $C(NH_2)_3$, $CH(OH)_2$, $C(OH)_3$, $CH(CN)_2$, and $C(CN)_3$. Generally, the linking clusters disclosed herein are Lewis bases, and therefore have lone pair electrons available and/or can be deprotonated to form stronger Lewis bases. The deprotonated version of the linking clusters, therefore, are encompassed by the disclosure and anywhere a linking cluster that is depicted in a non-de-protonated form, the de-protonated form should be presumed to be included, unless stated otherwise.

"Metal-organic frameworks" or "MOFs" are porous crystalline materials that are constructed by the linkage of inorganic metal clusters called secondary building units (SBUs) with organic linking moieties via linking clusters. These materials have very large surface areas and pore volumes. Therefore, MOFs are ideally suited for use in gas sorption and/or gas separation. MOFs have been shown to have tremendous utility in the separation of various hydrocarbon mixtures, including ethane/ethylene, propane/propylene, and $C_5$ alkane mixtures, among many others.

A "metal" refers to a solid material that is typically hard, shiny, malleable, fusible, and ductile, with good electrical and thermal conductivity. "Metals" used herein refer to metals selected from alkali metals, alkaline earth metals, lanthanides, actinides, transition metals, and post transition metals.

A "metal ion" refers to an ion of a metal. Metal ions are generally Lewis Acids and can form coordination complexes. Typically, the metal ions used for forming a coordination complex in a framework are ions of transition metals.

"Plasticization" as used herein, refers to swelling of polymer films in the presence of certain penetrants that result in increased permeation rates of all gases, but an unwanted, and often times, unpredictable loss in membrane efficiency. In the petrochemical industry, typical plasticizers include polar gases, e.g. $CO_2$, $C_2H_4$, $C_2H_6$, $C_3H_6$, $C_3H_8$, or butanes. To a first approximation, the pressure at which a species first plasticizes a film can be described by the so-called "plasticization pressure", which, for a glassy polymer at a given temperature, is defined as the pressure at which permeability begins to increase.

The term "polymer" includes any suitable polymeric material into or onto which a metal organic framework can be attached or embedded. Such polymers can include, but are not limited to, thermoplastic polymers, thermoplastic elastomer polymers, and elastomer polymers. As described further herein, the polymer type is only limited by its ability to incorporated metal organic frameworks and interact with a particular medium without substantially degrading in a reasonable period of time. An exemplary polymer is a polyimide or derivative thereof.

The term "post framework reactants" refers to all known substances that are directly involved in a chemical reaction. Post framework reactants typically are substances, either elemental or MOF frameworks, which have not reached the optimum number of electrons in their outer valence levels, and/or have not reached the most favorable energetic state due to ring strain, bond length, low bond dissociation energy, and the like. Some examples of post framework reactants include, but are not limited to:

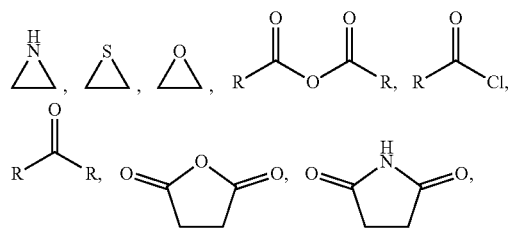

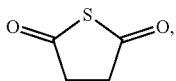

I—R, Br—R, CR$_3$—Mg—Br, CH$_2$R—Li, CR$_3$, Na—R, and K—R; and wherein each R is independently selected from the group comprising: H, sulfonates, tosylates, azides, triflates, ylides, alkyl, aryl, OH, alkoxy, alkenes, alkynes, phenyl and substitutions of the foregoing, sulfur-containing groups (e.g., thioalkoxy, thionyl chloride), silicon-containing groups, nitrogen-containing groups (e.g., amides and amines), oxygen-containing groups (e.g., ketones, carbonates, aldehydes, esters, ethers, and anhydrides), halogen, nitro, nitrile, nitrate, nitroso, amino, cyano, ureas, boron-containing groups (e.g., sodium borohydride, and catecholborane), phosphorus-containing groups (e.g., phosphorous tribromide), and aluminum-containing groups (e.g., lithium aluminum hydride).

The term "substantially" as used to modify a term means that the modified term includes minor variations in size, purity, structure and the like by only a minor amount. Accordingly, "substantially homogenous in size" means that the material does not vary by more than 1%, 5%, 10%, 20% or 30% (or any value there between) in size from an average size. Thus, MOF nanocrystals do not vary in size by more than 30% from an average size.

Separations in the petrochemical industry are extremely energy intensive, and improving process efficiency has the potential to create significant cost and environmental savings. One of the most challenging industrial gas separations is the purification of olefins from olefin/paraffin mixtures, which is accomplished today by cryogenic distillation and accounts for 120 Tbtu/year in energy consumption. Membranes have been proposed as replacements for or supplements to conventional distillation, and although numerous membrane materials have shown promise for olefin/paraffin separation, there are no materials with adequate separation performance under realistic process conditions. Indeed, this materials challenge extends to numerous other gas separations, including the purification of natural gas and the production of other petrochemicals. In particular, the limitation of membrane technology is due to a lack of materials that have a combination of high selectivity, permeability, processability, and stability during operation, all of which are necessary for implementation of a material. Molecular sieve-based membranes can achieve very high selectivities and permeabilities, but are difficult to fabricate on a large scale, or are prone to defects. Similarly, thermally rearranged polymer membranes can exhibit excellent separation performance, but are brittle and susceptible to breaking during operation. Classical polymer membranes are robust and processable, but these generally do not display sufficiently high olefin/paraffin selectivity and permeability, and, perhaps more importantly, their performance rapidly diminishes with use owing to plasticization. Plasticiztion, which involves a dramatic and often unpredictable loss in selectivity as a result of polymer swelling upon exposure to high pressures of polarizable gases, is a major obstacle to the commercial adoption of membranes for refinery separations or natural gas purification. Current strategies for reducing plasticization rely on polymer crosslinking, which is limited to polymers with crosslinkable organic functionalities and often has the deleterious effect of reducing membrane permeability.

Research on polymer membranes for gas separations has, over the last several decades, revealed numerous polymer structures that have excellent promise for purifying various gas mixtures. However, industry currently prefers more traditional separation technologies such as distillation and absorption, but membrane-based processes have the potential to be more economical. Many of these gas separations involve gas pairs that, if tested at low pressures, reveal ideal permeation properties, but these properties are lost under real process conditions.

There are a number of gas separations in which highly polarizable gases can diminish membrane selectivities through the mechanism of plasticization. Because of plasticization, membrane selectivity decreased, often times in dramatic fashion, thereby rendering most separations that involve plasticizing gases unachievable through a membranes process. To avoid these complications, the majority of commercialized membrane technologies in the market today involve gas streams that will not plasticize the membranes. Alternative crosslinking strategies have been explored, including the use of covalent transesterification or ionic crosslinking agents such as Al$^{3+}$. Although transesterification has yielded desirable results, it is limited to carboxylate containing polyimides, and ionic crosslinking does not yield as significant of improvements in plasticization reduction. A more general approach to crosslinking is needed, which can be applied to many polymer types as well as numerous gas pairs.

The approach utilized herein is to create potential cross-links within a polymer (e.g., a high-performance polymer) by incorporating nanocrystals of metal-organic frameworks containing coordinatively-unsaturated metal sites, which are in and of themselves expected to display an improved separation performance. As demonstrated herein, the resulting composites can uniquely and simultaneously satisfy the requirements of high selectivity, permeability, processability, and stability.

Metal-organic frameworks are porous crystalline materials that have shown promise for a variety of gas separations, including for key hydrocarbon separations. There are currently tens of thousands of metal-organic frameworks (~54000) that have been synthesized and characterized.

As described more fully below, various polymers can be used in the methods and compositions of the disclosure so long as they are capable of incorporating or attaching a metal organic framework. In some embodiments the material for use in forming a polymer are materials, particularly oligomers or polymers, which form a mixture with a MOF at processing temperatures. Exemplary polymers include, but are not limited to, MATRIMID®, cellulose acetate, and 6FDA-based polyimides (6FDA=4,4'-(hexafluoroisopropylidene) diphthalic anhydride).

Figure 1B:
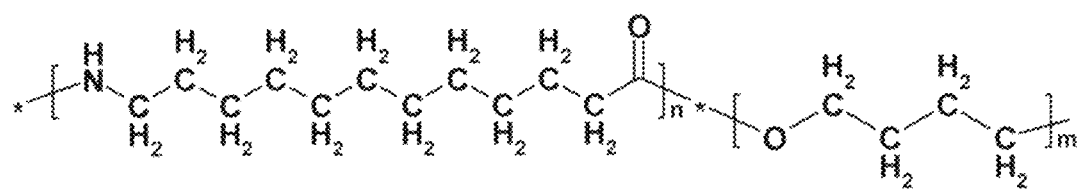

Typical polymers used in the methods and compositions of the disclosure include, but are not limited to, cellulosic polymers, such as cellulose acetate, cellulose triacetate, cellulose acetate-butyrate, cellulose propionate, ethyl cellulose, methyl cellulose, nitrocellulose, and the like; polycarbonates; polystyrenes, including styrene-containing copolymers such as acrylonitrilestyrene copolymers, styrene-butadiene copolymers and styrene-vinylbenzylhalide copolymers; polysulfones; polyimides, polyetherimides, and polyamides, including aryl polyamides, aryl polyamides such as Matrimid® 5218 and P-84, aryl polyetherimides such as Ultem 1000; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), and the like; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly (benzimidazole); polycarbodiimides; polyphosphazines, and the like, and interpolymers, including block interpolymers containing repeating units from the above such as terpolymers of acrylonitrile-vinyl bromide-sodium salt of para-sulfophenylmethallyl ethers; and grafts and blends containing any of the foregoing. FIGS. 1A-1B provide examples of the structures of useful polymers of the disclosure.

In some embodiments, the polymers or materials used to form such polymers can have reactive functional groups that react with a MOF. The material may include a reactive group that includes, for example, thiol, an amine, a benzoxazine, a formaldehyde, an aldehyde, and a combination thereof. The reactive film-forming material may include a compound that can react with, and be bonded to, a MOF. Typical substituents providing substituted polymers include halogens such as fluorine, chlorine and bromine; hydroxyl groups; lower alkyl groups; lower alkoxy groups; monocyclic aryl; lower acyl groups and the like. The presence of one or more functional groups can afford increased processability for the polymers. Examples of such reactive materials include, but are not limited to, amine-terminated butadiene-nitrile (ATBN), hydroxy-terminated butadiene-nitrile (HOTBN), carboxy-terminated butadiene-nitrile CTBN, amine-terminated poly(alkylene oxides) (such as those available under the trade names JEFFAMINE and VERSALINK) and related compounds.

Examples of suitable nonreactive polymer materials include acrylic polymers (e.g., poly(methyl methacrylate-co-ethyl acrylate) and poly(methyl acrylate-co-acrylic acid)); polyurethanes (e.g., reaction products of aliphatic, cycloaliphatic or aromatic diisocyanates with polyester glycols or polyether glycols); polyolefins; polystyrene; copolymers of styrene with acrylate(s) (e.g., poly(styrene-co-butyl acrylate); polyesters, (e.g., polyethylene terephthalate, polyethylene terephthalate isophthalate, and polycaprolactone); polyamides, (e.g., polyhexamethylene adipamide); vinyl polymers, (e.g., poly(vinyl acetate/methyl acrylate) and poly(vinylidene chloride/vinyl acetate); polydienes, (e.g., poly(butadiene/styrene)); cellulosic polymer including cellulose ethers and cellulose esters, (e.g., ethyl cellulose and cellulose acetate/butyrate); polyimides; polysulfones; urethane-acrylate copolymers; and polyethers. Such polymers are available, for example, from commercial sources or may be prepared using methods and starting materials known in the art.

Traditionally developed for adsorption-based separations, metal-organic frameworks are shown herein as promising actives for use in membranes. These materials have been formed into composite films by mixing with polymers to create mixed-matrix membranes and tested as stand-alone membranes in the form of hollow fibers or sheets. The disclosure demonstrates, in one embodiment, the use of membrane-MOF composite to improved ethylene/ethane selectivity and permeability and membrane stability. For polymer membranes, ethane adsorption is nearly identical to that of ethylene, thereby preventing improvements in selectivity based on a sorption-selectivity mechanism. In contrast, adsorbents with coordinatively-unsaturated metal sites have enhanced adsorptive affinity for olefins over paraffins owing to a strong interaction between the metal and the n-system of the alkene. Indeed, these interactions have led to record-high adsorption selectivities and capacities in the metal-organic frameworks $M_2$(dobdc) (M-MOF-74; CPO-27-M; M=Mg, Mn, Fe, Co, Ni, Zn; dobdc$^{4-}$=2,5-dioxido-1,4-benzenedicarboxylate), which feature ~12 Å-wide hexagonal channels lined with a high concentration of exposed divalent metal cations.

The disclosure demonstrates that the incorporation of metal-organic frameworks (MOFs) into polymer membranes can enhance membrane properties, namely increased permeability and selectivity for gas pairs. This enhancement has been attributed to the permeability and selectivity of the MOFs of the disclosure. Therefore, when MOFs are dispersed throughout the polymer matrix, enhancements are observed in the overall membrane performance. It has been further shown herein that the incorporation of MOFs that have strong interactions with polymers can achieve plasticization reduction in addition to enhanced permeation properties. Through a combination of increasing adsorptive selectivity, boosting permeability, and introducing strong framework-polymer interactions, the findings presented herein demonstrate that MOFs, like $Co_2$(dobdc) and $Ni_2$(dobdc), can dramatically enhance the ethylene/ethane separation performance of a polymer membrane, placing these new composite materials well above the polymer upper bound.

The presence of strong and abundant nanocrystal-polymer interactions not only benefits the intrinsic gas separation properties, but also suppresses plasticization by reducing polymer chain mobility. This strategy of enhancing membrane stability to highly polarizable gases through the incorporation of metal-organic framework nanocrystals with appropriate size and surface chemistry should be generally applicable to many other gas separations that involve plasticizing gases, potentially allowing membrane processes to be explored for key separations that were previously out of reach.

Some of the highest performing polymers for numerous membrane-based gas separations including $CO_2/CH_4$, $C_2H_4/C_2H_6$ and $C_3H_6/C_3H_8$ separations, are those of the 6FDA-based polyimides (6FDA=4,4'-(hexafluoroisopropylidene) diphthalic anhydride). Disclosed and exemplified herein are embodiments directed to the employment of various polymers within this structure class, including 6FDADAM, 6FDA-Durene, and a series of 6FDA-Durene:Jeffamine copolymers (see FIG. 1). Other examples of 6FDA-based polyimides that can be used with the methods and compositions disclosed herein, include but are not limited to, diamines of oxydianiline (ODA); phenylenediamine(PDA); 2,2-bis-(aminophenoxyphenyl)hexafluoropropane (BDAF); methylenedianiline (MDA); 2,7-diaminofluorene (DAF); 3,6-diaminocarbazole (CDA); 2,7-diaminofluorenone (DAFO); 3,5-diaminobenzotrifluoride (DBTF); 2,4,6-trimethyl-1,3-phenylenediamine (TrMPD); and 2,3,5,6-tetramethyl-1,4-phenylenediamine (TeMPD); and ferrocenyl diamine. Other polymers that can be used are identified herein.

In a certain embodiment, the disclosure provides MOFs which comprise a plurality of linked M-X-L secondary binding units (SBUs), wherein M is a metal, metal ion, or metal containing complex; X is an atom or cluster from an organic linking ligand that can form one or more bonds with M; and L is an organic linking ligand comprising an optionally substituted ($C_1$-$C_{20}$) alkyl, optionally substituted ($C_1$-$C_{20}$) alkenyl, optionally substituted ($C_1$-$C_{20}$) alkynyl, optionally substituted ($C_1$-$C_{20}$) hetero-alkyl, optionally substituted ($C_1$-$C_{20}$) hetero-alkenyl, optionally substituted ($C_1$-$C_{20}$) hetero-alkynyl, optionally substituted ($C_3$-$C_{12}$) cycloalkyl, optionally substituted ($C_3$-$C_{12}$) cycloalkenyl, optionally substituted aryl, optionally substituted heterocycle or optionally substituted mixed ring system, (in some embodiments, the linking ligand comprises at least two or more carboxylate linking clusters).

In a certain embodiment, a MOF of the disclosure comprises one or more cores comprising one or more linking moieties of structural Formula I-X:

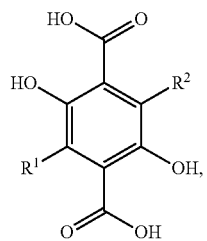

(I)

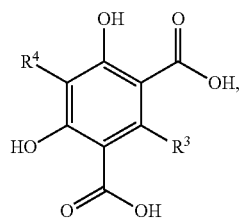

(II)

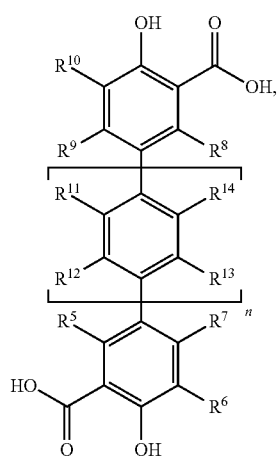

(III)

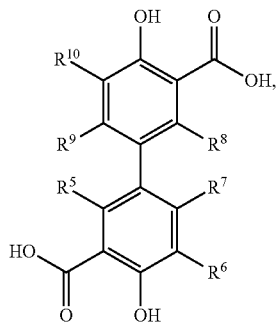

(IV)

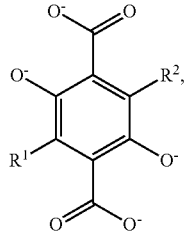

(V)

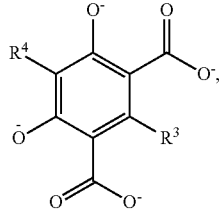

(VI)

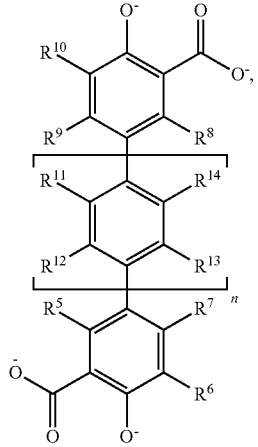

(VII)

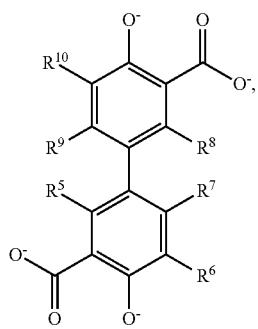

(VIII)

-continued

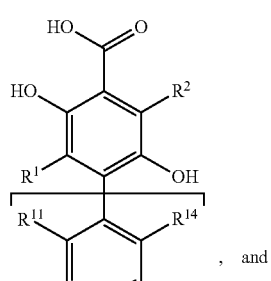, and

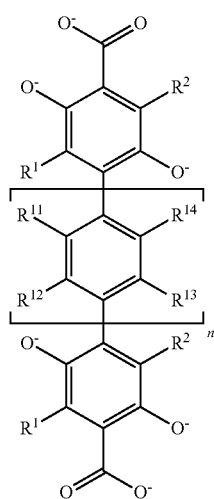;

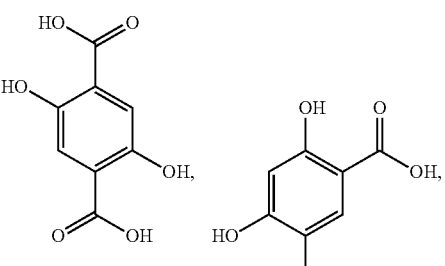

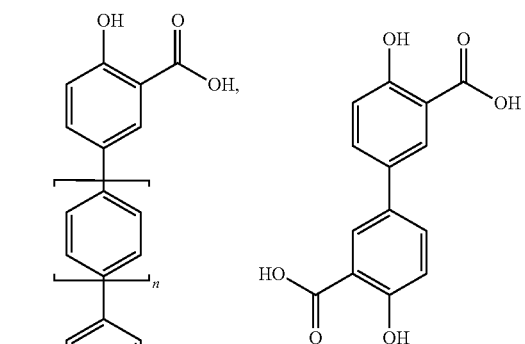

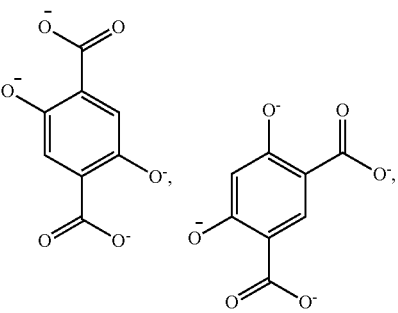

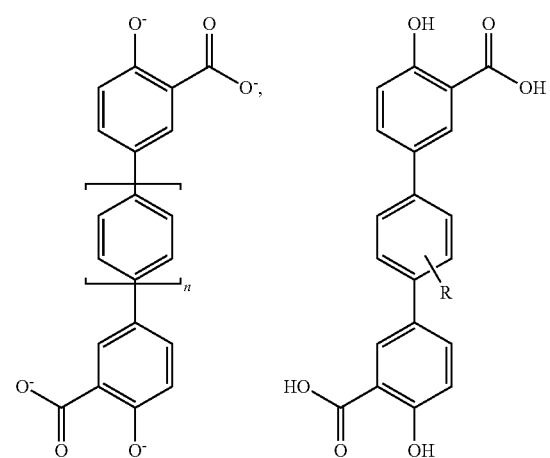

wherein $R^1$-$R^{14}$ are independently selected from H, D, optionally substituted FG, optionally substituted ($C_1$-$C_{20}$) alkyl, optionally substituted ($C_1$-$C_{19}$)heteroalkyl, optionally substituted ($C_1$-$C_{20}$)alkenyl, optionally substituted ($C_1$-$C_{19}$) heteroalkenyl, optionally substituted ($C_1$-$C_{19}$)alkynyl, optionally substituted ($C_1$-$C_{19}$)heteroalkynyl, optionally substituted ($C_1$-$C_{19}$) cycloalkyl, optionally substituted ($C_1$-$C_{19}$)cycloalkenyl, optionally substituted aryl, optionally substituted heterocycle, optionally substituted mixed ring system, wherein one or more adjacent R groups can be linked together to form one or more substituted rings selected from the group comprising cycloalkyl, cycloalkenyl, heterocycle, aryl, and mixed ring system and wherein n=0 to 3.

In one embodiment, the organic linking ligand comprises a structure selected from the group consisting of:

-continued

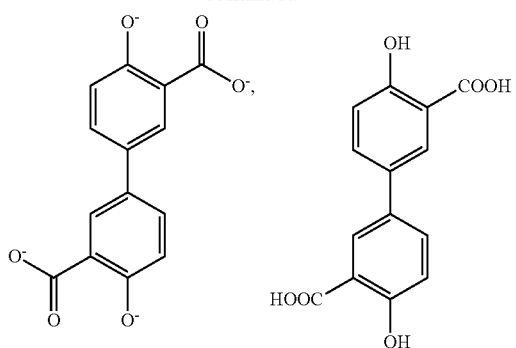

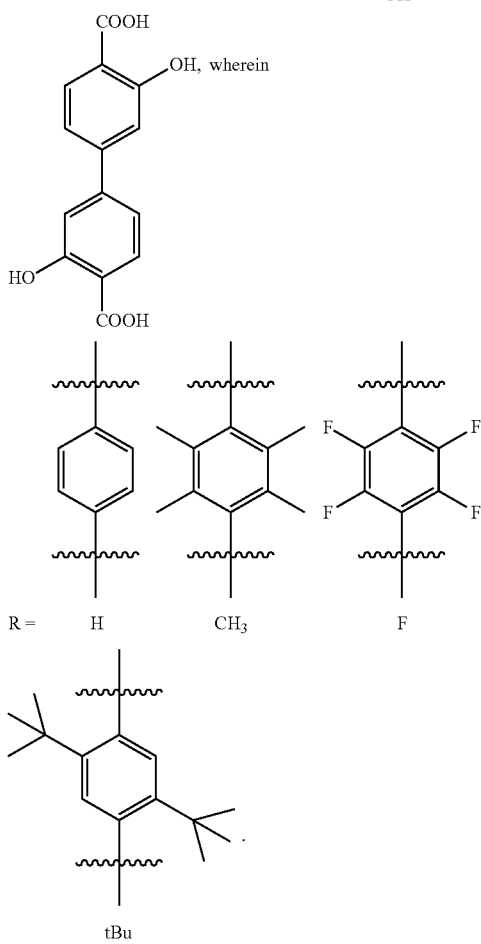

In a certain embodiment, a MOF of the disclosure comprises one or more cores comprising one or more linking moieties of structural Formula I or Formula II:

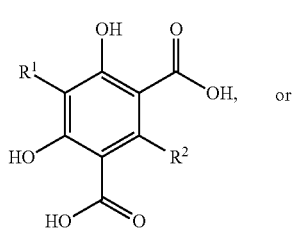

Formula (I)

-continued

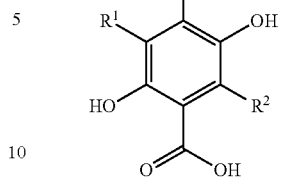

Formula (II)

wherein, $R^1$-$R^2$ are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, and optionally substituted mixed ring system. The MOFs comprising any of Formulas I-X (including any of the metal or metal ions described herein) can be used in combination with or incorporated into a polymer selected from the group consisting of polyimides, polyetherimides, and polyamides, including aryl polyamides, aryl polyimides such as Matrimid® 5218 and P-84, aryl polyetherimides such as Ultem 1000, 6FDA-based polyimides such as 6FDADAM, 6FDA-Durene and 6FDA-Durene:Jeffamine co polymers; cellulosic polymers, such as cellulose acetate, cellulose triacetate, cellulose acetate-butyrate, cellulose propionate, ethyl cellulose, methyl cellulose, nitrocellulose, and the like; polycarbonates; polystyrenes, including styrene-containing copolymers such as acrylonitrilestyrene copolymers, styrene-butadiene copolymers and styrene-vinylbenzylhalide copolymers; polysulfones; polyethers; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), and the like; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly (benzimidazole); polycarbodiimides; polyphosphazines, and the like, and interpolymers, including block interpolymers containing repeating units from the above such as terpolymers of acrylonitrile-vinyl bromide-sodium salt of para-sulfophenylmethallyl ethers; and grafts and blends containing any of the foregoing. Examples of suitable nonreactive polymer materials are selected from the group consisting of acrylic polymers (e.g., poly(methyl methacrylate-co-ethyl acrylate) and poly(methyl acrylate-co-acrylic acid)); polyurethanes (e.g., reaction products of aliphatic, cycloaliphatic or aromatic diisocyanates with polyester glycols or polyether glycols); polyolefins; polystyrene; copolymers of styrene with acrylate(s) (e.g., poly(styrene-co-butyl acrylate); polyesters, (e.g., polyethylene terephthalate, polyethylene terephthalate isophthalate, and polycaprolactone); polyamides, (e.g., polyhexamethylene adipamide); vinyl polymers, (e.g., poly(vinyl acetate/methyl acrylate) and poly(vinylidene chloride/vinyl acetate); polydienes, (e.g., poly(butadiene/styrene)); cellulosic polymer including cellulose ethers and cellulose esters, (e.g., ethyl cellulose and cellulose acetate/butyrate); and urethane-acrylate copolymers. Such polymers are available, for example, from commercial sources or may be prepared using methods and starting materials known in the art.

In another embodiment, a MOF of the disclosure comprises one or more cores comprising one or more linking moieties of structural Formula I or Formula II:

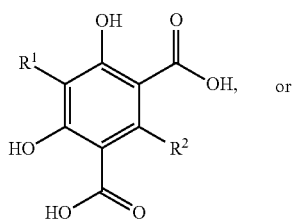

Formula (I)

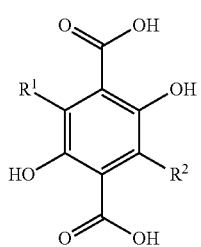

Formula (II)

wherein, $R^1$-$R^2$ are independently selected from the group comprising H, D, optionally substituted FG, optionally substituted ($C_1$-$C_6$)alkyl, optionally substituted ($C_1$-$C_5$)heteroalkyl, optionally substituted ($C_1$-$C_6$) alkenyl, optionally substituted ($C_1$-$C_5$) heteroalkenyl, optionally substituted ($C_1$-$C_6$)alkynyl, and optionally substituted ($C_1$-$C_5$) heteroalkynyl.

In a particular embodiment, a MOF of the disclosure comprises one or more cores comprising one or more linking moieties of structural Formula I(a) or Formula II(a):

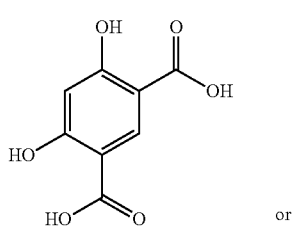

Formula I(a)

or

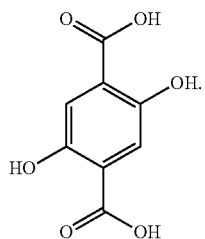

Formula II(a)

The disclosure further provides that a synthesized MOF disclosed herein may be reacted with a post framework reactant. A post framework reactant adds at least one effect to a MOF of the disclosure including, but not limited to, modulating the gas storage ability of the MOF; modulating the sorption properties of the MOF; modulating the pore size of the MOF; modulating the catalytic activity of the MOF; modulating the conductivity of the MOF; and modulating the sensitivity of the MOF to the presence of an analyte of interest.

All the aforementioned linking ligands possess appropriate reactive functionalities can be chemically transformed by a suitable reactant post synthesis of the framework to add further functionalities to the framework. By modifying the organic links within the framework post-synthetically, access to functional groups that were previously inaccessible or accessible only through great difficulty and/or cost is possible and facile.

In a further embodiment, the MOFs of the disclosure may be further modified by reacting with one or more post framework reactants that may or may not have denticity. In another embodiment, a MOF as-synthesized is reacted with at least one, at least two, or at least three post framework reactants. In yet another embodiment, a MOF as-synthesized is reacted with at least two post framework reactants. In a further embodiment, a MOF as-synthesized is reacted with at least one post framework reactant that will result in adding denticity to the framework.

The disclosure also provides that a MOF, as disclosed herein, can be modified by a post framework reactant by using chemical reactions that modify, substitute, or eliminate a functional group post-synthesis. These chemical reactions may use one or more similar or divergent chemical reaction mechanisms depending on the type of functional group and/or post framework reactant used in the reaction. Examples of chemical reaction include, but are not limited to, radical-based, unimolecular nucleophilic substitution (SN1), bimolecular nucleophilic substitution (SN2), unimolecular elimination (E1), bimolecular elimination (E2), E1cB elimination, nucleophilic aromatic substitution (SnAr), nucleophilic internal substitution (SNi), nucleophilic addition, electrophilic addition, oxidation, reduction, cycloaddition, ring closing metathesis (RCM), pericylic, electrocylic, rearrangement, carbene, carbenoid, cross coupling, and degradation. Other agents can be added to increase the rate of the reactions disclosed herein, including adding catalysts, bases, and acids.

In another embodiment, a post framework reactant adds at least one effect to a MOF of the disclosure including, but not limited to, modulating the gas separation ability of the MOF; modulating the crosslinking between the MOF and a polymer; modulating the sorption properties of the MOF; modulating the pore size of the MOF; and modulating the metal-metal separation distance of the MOF.

In a certain embodiment, the one or more metals, metal ions and/or metal containing complexes, that can be used in the (1) synthesis of a MOF of the disclosure, (2) exchanged post synthesis of a MOF disclosed herein, and/or (3) added to a MOF of the disclosure by forming coordination complexes with post framework reactant linking clusters, include, but are not limited to, the following: $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $Nb^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, $Cr$, $Mo^{6+}$, $Mo^{5+}$, $Mo^{4+}$, $Mo^{3+}$, $Mo^{2+}$, $Mo^+$, $Mo$, $W^{6+}$, $W^{5+}$, $W^{4+}$, $W^{3+}$, $W^{2+}$, $W^+$, $W$, $Mn^{7+}$, $Mn^{6+}$, $Mn^{5+}$, $Mn^{4+}$, $Mn^{3+}$, $Mn^{2+}$, $Mn^+$, $Re^+$, $Re^{6+}$, $Re^{5+}$, $Re^{4+}$, $Re^{3+}$, $Re^{2+}$, $Re^+$, $Re$, $Fe^{6+}$, $Fe^{4+}$, $Fe^{3+}$, $Fe^{2+}$, $Fe^+$, $Fe$, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $Os^{4+}$, $Os^{3+}$, $Os^{2+}$, $Os^+$, $Os$, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^+$, $Ir$, $Ni^{3+}$, $Ni^{2+}$, $Ni^+$, $Ni$, $Pd^{6+}$, $Pd^{4+}$, $Pd^{2+}$, $Pd^+$, $Pd$, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au^+$, $Zn^{2+}$, $Zn^+$, $Zn$, $Cd^{2+}$, $Cd^+$, $Hg^{4+}$, $Hg^{2+}$, $Hg^+$, $B^{3+}$, $B^{2+}$, $B^+$, $Al^{3+}$, $Al^{2+}$, $Al^+$, $Ga^{3+}$, $Ga^{2+}$, $Ga^+$, $In^{3+}$, $In^{2+}$, $In^{1+}$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, $Ge$, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $Db^{3+}$, $Db^{2+}$, $Ho^{3+}$, $Er^{3+}$, $Tm^{4+}$, $Tm^{3+}$, $Tm^{2+}$, $Yb^{3+}$, $Yb^{2+}$, $Lu^{3+}$, and any combination thereof, including any complexes which contain the metals or metal ions listed above, as well as any corresponding metal salt counter-anions.

In a further embodiment, one or more metal and/or metal ions that can be used in the (1) synthesis of a MOF of the disclosure, (2) exchanged post synthesis of a MOF disclosed herein, and/or (3) added to a MOF of the disclosure by forming coordination complexes with post framework reactant linking clusters, include, but are not limited to, the following: $L^+$, $Be^+$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $Nb^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, $Cr$, $Mo^{6+}$, $Mo^{5+}$, $Mo^{4+}$, $Mo^{3+}$, $Mo^{2+}$, $Mo^+$, $Mo$, $W^{6+}$, $W^{5+}$, $W^{4+}$, $W^{3+}$, $W^{2+}$, $W^+$, $W$, $Mn^{7+}$, $Mn^{6+}$, $Mn^{5+}$, $Mn^{4+}$, $Mn^{3+}$, $Mn^{2+}$, $Mn^+$, $Re^+$, $Re^{6+}$, $Re^{5+}$, $Re^{4+}$, $Re^{3+}$, $Re^{2+}$, $Re^+$, $Re$, $Fe^{6+}$, $Fe^{4+}$, $Fe^{3+}$, $Fe^{2+}$, $Fe^+$, $Fe$, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $Os^{4+}$, $Os^{3+}$, $Os^{2+}$, $Os^+$, $Os$, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^+$, $Ir$, $Ni^{3+}$, $Ni^{2+}$, $Ni^+$, $Ni$, $Pd^{6+}$, $Pd^{4+}$, $Pd^{2+}$, $Pd^+$, $Pd$, $Ce^{4+}$, $Ce^{3+}$, $Ce^{2+}$, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au^+$, $Zn^{2+}$, $Zn^+$, $Zn$, $Cd^{2+}$, $Cd^+$, $Hg^{4+}$, $Hg^{2+}$, $Hg^+$, $B^{3+}$, $B^{2+}$, $B^+$, $Al^{3+}$, $Al^{2+}$, $Al^+$, $Ga^{3+}$, $Ga^{2+}$, $Ga^+$, $In^{3+}$, $In^{2+}$, $In^{1+}$, and combinations thereof, including any complexes which contain the metals or metal ions listed above, as well as any corresponding metal salt counter-anions.

In yet a further embodiment, one or more metal ions that can be used in the (1) synthesis of a MOF of the disclosure, (2) exchanged post synthesis of a MOF disclosed herein, and/or (3) added to a MOF of the disclosure by forming coordination complexes with post framework reactant linking clusters, include, but are not limited to, the following: $Li^+$, $Mg^{2+}$, $Ca^{2+}$, $Ba^{2+}$, $Zr^{4+}$, $Zr^{3+}$, $Zr^{2+}$, $Cr^{6+}$, $Cr^{5+}$, $Cr^{4+}$, $Cr^{3+}$, $Cr^{2+}$, $Cr^+$, $Cr$, $Mo^{6+}$, $Mo^{5+}$, $Mo^{4+}$, $Mo^{3+}$, $Mo^{2+}$, $Mo^+$, $Mo$, $W^{6+}$, $W^{5+}$, $W^{4+}$, $W^{3+}$, $W^{2+}$, $W^+$, $V^{5+}$, $V^{4+}$, $V^{3+}$, $V^{2+}$, $Mn^{6+}$, $Mn^{5+}$, $Mn^{4+}$, $Mn^{3+}$, $Mn^{2+}$, $Mn^+$, $Fe^{6+}$, $Fe^{4+}$, $Fe^{3+}$, $Fe^{2+}$, $Fe^+$, $Fe$, $Co^{5+}$, $Co^{4+}$, $Co^{3+}$, $Co^{2+}$, $Co^+$, $Ni^{3+}$, $Ni^{2+}$, $Ni^+$, $Ni$, $Cu^{4+}$, $Cu^{3+}$, $Cu^{2+}$, $Cu^+$, $Zn^{2+}$, $Zn^+$, $Zn$, $Pd^{6+}$, $Pd^{4+}$, $Pd^{2+}$, $Pd^+$, $Cd^{2+}$, $Cd^+$, $Ce^{4+}$, $Ce^{3+}$, $Ce^{2+}$, and any combination thereof, including any complexes which contain the metal ions listed above, as well as any corresponding metal salt counter-anions.

In another embodiment, one or more metal ions in (1) synthesis of a MOF of the disclosure, (2) exchanged post synthesis of a MOF disclosed herein, and/or (3) added to a MOF of the disclosure by forming coordination complexes with post framework reactant linking clusters, is a divalent metal ion selected from the group comprising $Be^{2+}$, $Mg^{2+}$, $Ca^{2+}$, $Sr^{2+}$, $Ba^{2+}$, $Sc^{2+}$, $Y^{2+}$, $Ti^{2+}$, $Zr^{2+}$, $V^{2+}$, $Nb^{2+}$, $Ta^{2+}$, $Cr^{2+}$, $Mo^{2+}$, $W^{2+}$, $Mn^{2+}$, $Re^{2+}$, $Fe^{2+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Ag^{2+}$, $Au^{2+}$, $Zn^{2+}$, $Cd^{2+}$, $B^{2+}$, $Al^{2+}$, $Ga^{2+}$, $Si^{2+}$, $Sn^{2+}$, $Pb^{2+}$, $Hg^{2+}$, $As^{2+}$, $Te^{2+}$, $La^{2+}$, $Ce^{2+}$, $Pr^{2+}$, $Sm^{2+}$, $Gd^{2+}$, $Nd^{2+}$, $Db^{2+}$, $Tb^{2+}$, $Tm^{2+}$ and $Yb^{2+}$. In yet a further embodiment, the divalent metal ion selected from the group comprising $Mg^{2+}$, $Mn^{2+}$, $Fe^{2+}$, $Co^{2+}$, $Zn^{2+}$ and $Ni'$.

The MOFs disclosed herein include a plurality of pores, which can be used for gas adsorption and separation. In one variation, the plurality of pores has a unimodal size distribution. In another variation, the plurality of pores have a multimodal (e.g., bimodal) size distribution.

The disclosure further provides for the crosslinking between a polymer and a MOF. The main advantage to MOF-polymer crosslinking is the retention of both permeability and selectivity. Typically, polymer crosslinking strategies result in a decrease in permeability and an increase in selectivity. However, because of the inherent permeability and selectivity of MOFs, dispersing MOFs into polymers can simultaneously increase the composite permeability and selectivity of a mixed-matrix membrane while also providing plasticization resistance. Through modulation of the MOF and the MOF/polymer interaction, high performance membranes under real process conditions may be achieved. Unlike other crosslinking strategies, incorporating MOF nanocrystals into polymers can provide a simple and general approach to crosslinking a variety of polymer systems. This approach can be applied generally to polymers that interact with the MOF. The main disadvantage to this approach is the negative effect the MOF has on membrane mechanical properties. Generally, the film becomes more brittle upon MOF incorporation. This drawback, however, can be moderated either through alternate polymer choice, for example by incorporating more flexible units into the polyimide backbone, or potentially by reducing the MOF nanocrystal size.

In a particular embodiment of the disclosure, a gas separation material comprises a polymer membrane comprising a MOF disclosed herein. Advantageously, the MOF includes one or more sites for separating gas molecules. Suitable examples of such gases that can be separated include, but are not limited to, the gases comprising $CO_2/CH_4$, $C_2H_4/C_2H_6$, $C_3H_6/C_3H_8$, $CH_4/C_2H_6$, butenes or longer chain alkenes or olefins. Sorption is a general term that refers to a process resulting in the association of atoms or molecules with a target material. Sorption includes both adsorption and absorption. Absorption refers to a process in which atoms or molecules move into the bulk of a porous material, such as the absorption of water by a sponge. Adsorption refers to a process in which atoms or molecules move from a bulk phase (that is, solid, liquid, or gas) onto a solid or liquid surface. The term adsorption may be used in the context of solid surfaces in contact with liquids and gases. Molecules that have been adsorbed onto solid surfaces are referred to generically as adsorbates, and the surface to which they are adsorbed as the substrate or adsorbent. Adsorption is usually described through isotherms, that is, functions which connect the amount of adsorbate on the adsorbent, with its pressure (if gas) or concentration (if liquid). In general, desorption refers to the reverse of adsorption, and is a process in which molecules adsorbed on a surface are transferred back into a bulk phase. The MOFs of the disclosure can therefore be used as selective adsorbents of a particular gas. Furthermore, the MOFs of the disclosure can be used to separate one or more component gases from mixture of gases.

The disclosure further provides an apparatus and method for separating one or more components from a multi-component gas using a polymer membrane comprising one or more MOFs disclosed herein. For example, the methods and compositions of the disclosure and be used to separated saturated vs. unsaturated small hydrocarbons (ethane vs. ethylene vs. acetylene, propane vs. propylene, etc.), as well as separations like $CO_2$ from a mixture of gases (for applications like removing $CO_2$ from the flue gas in power plants). Other examples include separating $CO_2/CH_4$, $C_2H_4/C_2H_6$, $C_3H_6/C_3H_8$, $CH_4/C_2H_6$, butenes or longer chain alkenes or olefins.

In a particular embodiment, a polymer membrane comprising one or more MOFs disclosed herein is part of a device. In another embodiment, a gas separation device comprises a polymer membrane of the disclosure. In a further embodiment, a gas separation device used to separate one or more component gases from a multi-component gas mixture comprises a polymer membrane disclosed herein. In a certain embodiment, a gas separation device used to separate one or more hydrocarbon gases or $CO_2$ from gas mixture comprises a polymer membrane disclosed herein. Examples of gas separation devices include, but are not limited to, purifiers, filters, scrubbers, pressure swing adsorption devices, molecular sieves, hollow fiber membranes, ceramic membranes, cryogenic air separation devices, and hybrid gas separation devices. In a particular embodiment, gas separation device comprising a polymer membrane of the disclosure can be used to purify fuel gas streams, air, flue-gas emissions, and/or waste emissions from combustion engines.

The MOF containing membranes disclosed herein are particularly well suited for natural gas purification and hydrocarbon separations where many membranes plasticize in the presence of high pressures of $CO_2$, $C_2H_4$, $C_2H_6$, $C_3H_6$, $C_3H_8$ or butanes. Moreover, plasticization-resistant membranes are sought for stability to aggressive contaminants such as benzene, toluene, ethyl benzene, and xylenes that are often found in industrial gas streams and may come in contact with membrane systems. In certain instances, stronger plasticization resistance could potentially result in fewer pretreatment steps for complicated separations of gas mixtures, thereby providing a tremendous economic advantage by simplifying a process.

In particular embodiment, the disclosure provides for any membrane separation in which the pure polymer exhibits a plasticization response. Example gas separations include any that contain a plasticizing gas such as $CO_2/CH_4$, $C_2H_4/C_2H_6$, $C_3H_6/C_3H_8$, $CH_4/C_2H_6$, butenes or longer chain alkenes or olefins. One gas separation that can be readily improved through reducing plasticization effects is the separation of olefins from paraffin. Although 6FDA-DAM and 6FDA-Durene are among the highest performing polymers for $C_2$ gases (i.e., $C_2H_4/C_2H_6$) and $C_3$ gases (i.e., $C_3H_6/C_3H_8$) separations, they lose their selectivities under real process conditions, namely high feed pressures of mixed composition. By contrast, the MOF containing membranes of the disclosure exhibit high selectivities at high feed pressures.

The following examples are intended to illustrate but not limit the disclosure. While they are typical of those that might be used, other procedures known to those skilled in the art may alternatively be used.

EXAMPLES

Synthesis of $M_2$(dobdc) nanocrystals. All nanocrystal syntheses were conducted at room temperature. Solid 2,5-dihydroxyterephthalic acid (1.0 g, 5.0 mmol; $H_4$(dobdc)) and 16 mmol of $M(NO_3)_2 \cdot 6H_2O$ (M=Mg, Co, Ni) or $MnCl_2 \cdot 4H_2O$ were added to a mixture of 400 mL of DMF, 27 mL of ethanol, and 27 mL of water in a 500-mL round bottom flask. After sparging the mixture with $N_2$, 5 mL of triethylamine was added rapidly while stirring under an $N_2$ atmosphere. The $M_2$(dobdc) nanocrystals precipitated within minutes, but all reaction mixtures were stirred for 2 h. The suspended $M_2$(dobdc) nanoparticles were immediately collected by centrifugation, and the solid was re-dispersed in 250 mL of DMF and the suspension was heated at 120° C. for 6 h. The centrifugation and DMF washing steps were repeated five times in order to remove unreacted ligand. The nanocrystals were then collected by centrifugation and re-dispersed in 250 mL of methanol and the suspension was heated at 60° C. for 2 h. The centrifugation and methanol washing steps were repeated five times in order to exchange all of the DMF for methanol, including those molecules coordinated to the metal sites. Full removal of DMF was confirmed by infrared spectroscopy. Nanocrystals were then stored in methanol until membrane casting, or dried under reduced pressure at 180° C. for 24 h prior to gas adsorption measurements. Mean crystal domain sizes for the nanocrystals are presented in Table 1.

TABLE 1

Mean crystal domain sizes for $M_2$(dobdc) as calculated by the Scherrer equation. The first Bragg peak was used for calculations.

|  | τ (nm) |
| --- | --- |
| $Mg_2$(dobdc) | 13.1 |
| $Mn_2$(dobdc) | 14.7 |
| $Co_2$(dobdc) | 11.8 |
| $Ni_2$(dobdc) | 10.3 |

Figure 2A:
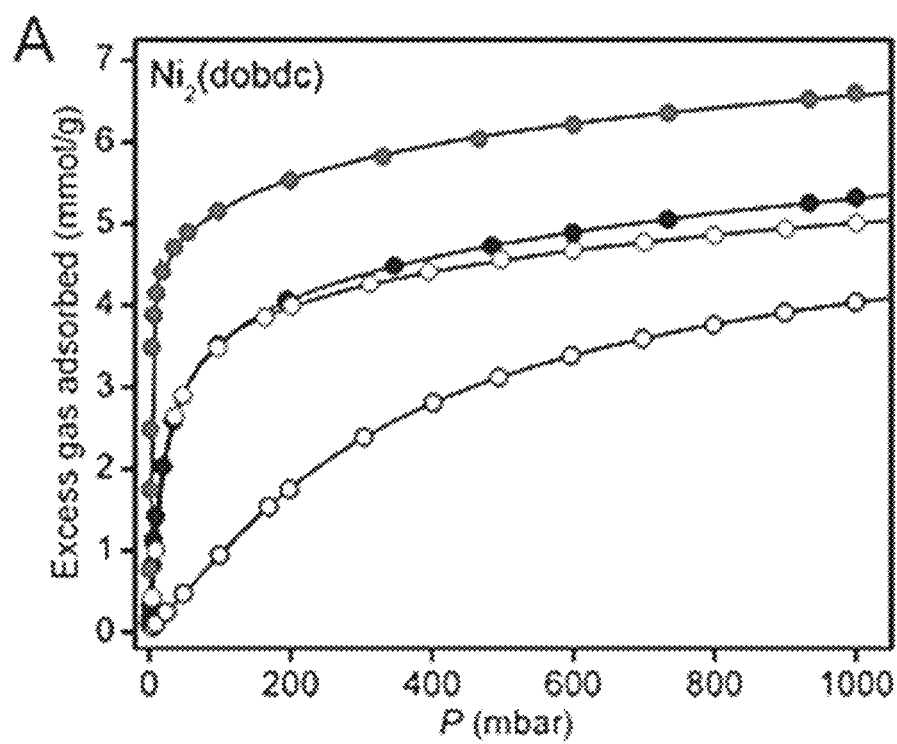
FIG. 2A-F provides adsorptive, crystallographic and particle characteristics of $M_2$(dobdc) nanocrystals. Adsorption isotherms for $C_2H_4$ (closed blue circles), $C_2H_6$ (open circles), $C_3H_6$ (closed red circles), and $C_3H_8$ (open circles) in (A) $Ni_2$(dobdc), (B) $Mn_2$(dobdc), (C) $Co_2$(dobdc), and (D) $Mg_2$(dobdc). (E) Dynamic light scattering plots and (F) powder X-ray diffraction patterns for $M_2$(dobdc) nanocrystals.
Figure 2B:
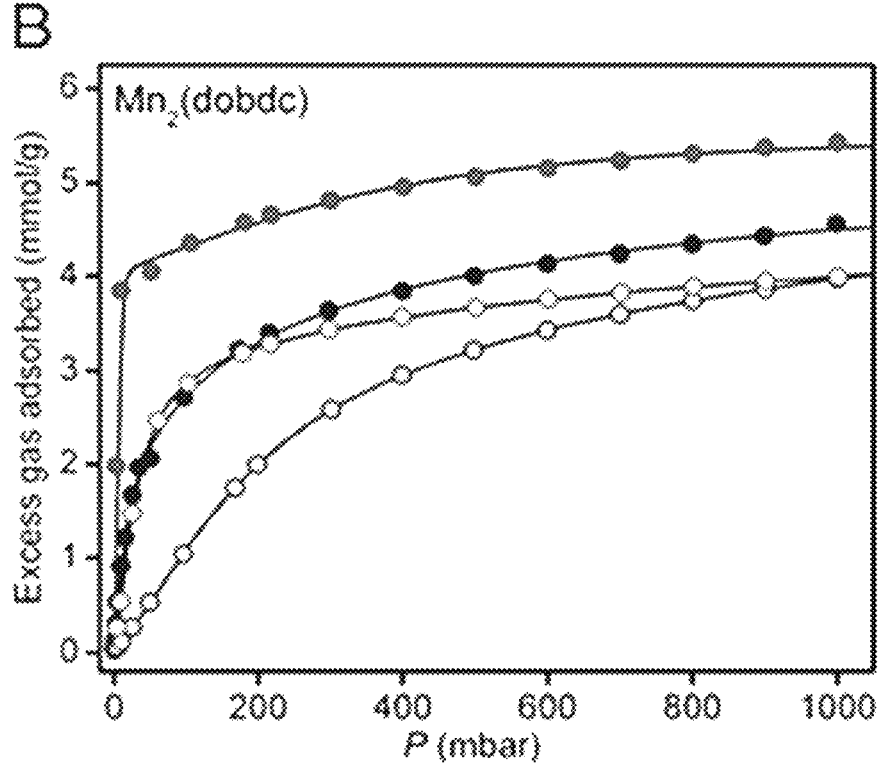
Figure 2C:
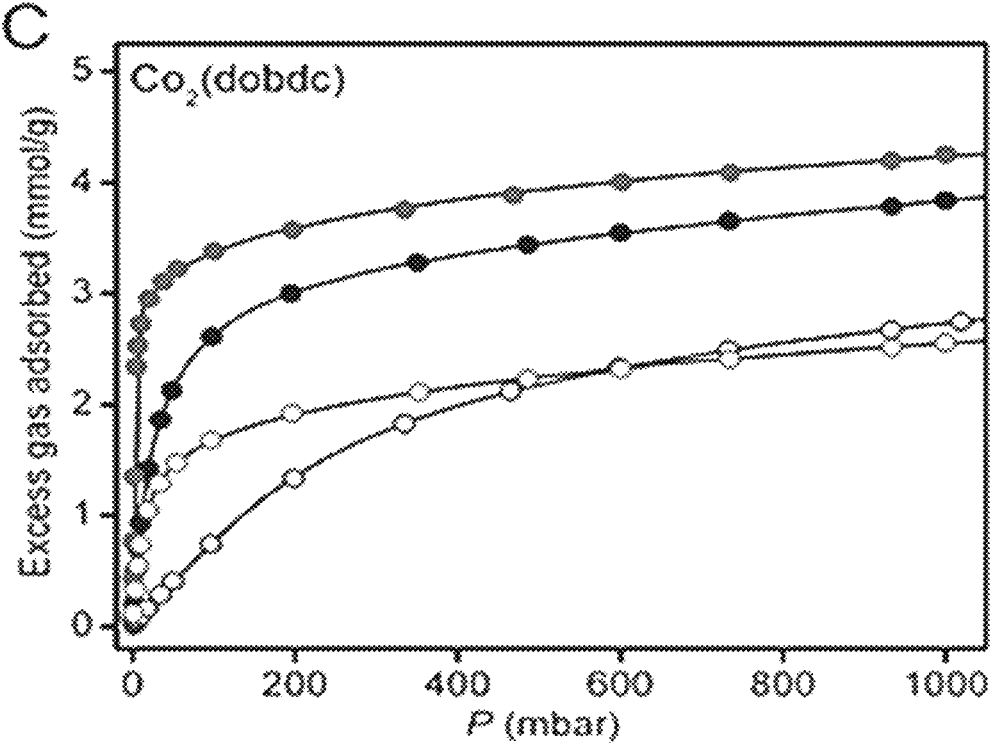
Figure 2D:
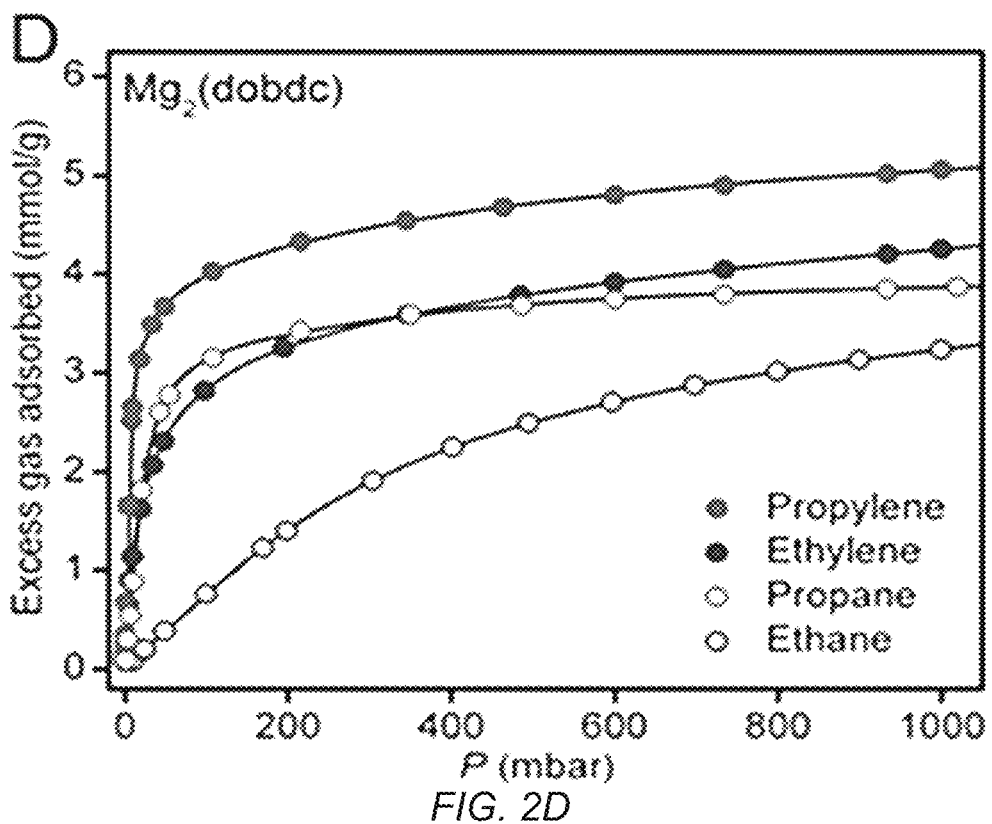
Figure 2E:
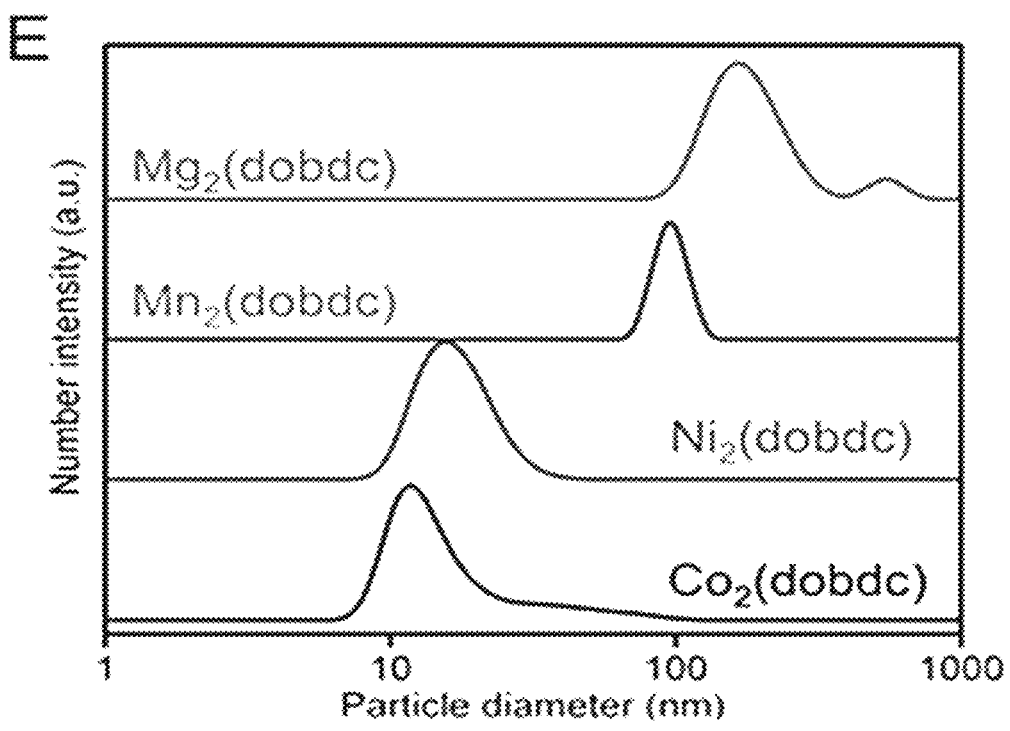
Figure 2F:
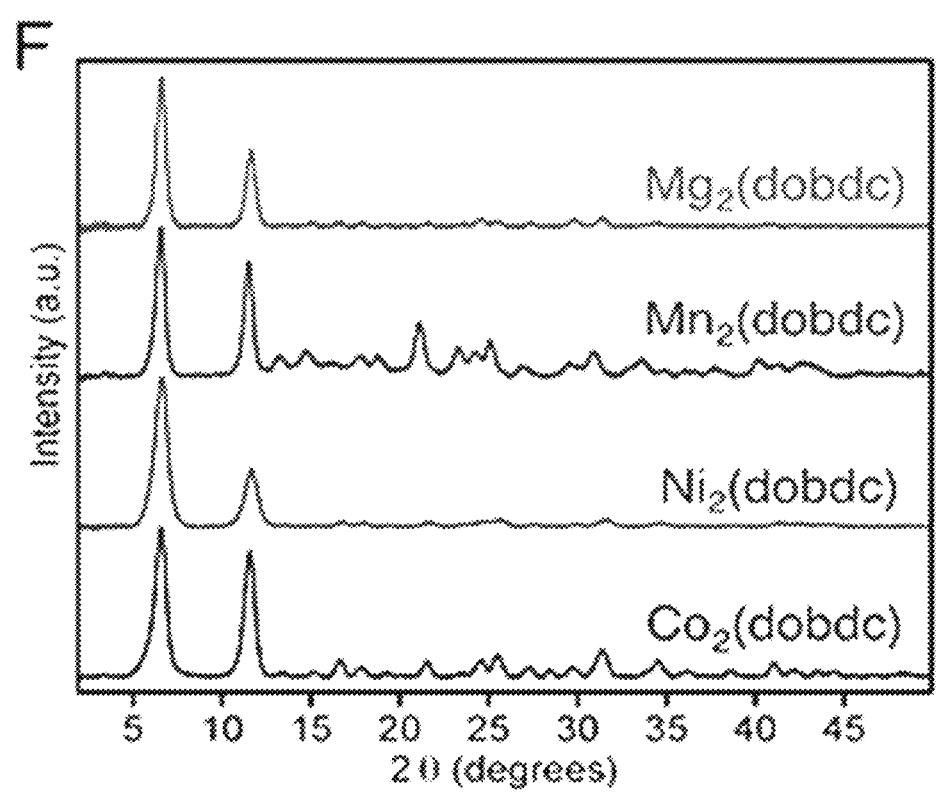

The following experiments utilize $M_2$(dobdc) (M=Mg, Mn, Co, Ni) based nanocrystals, as these MOFs have been shown to have among the highest adsorptive selectivities for olefin/paraffin separations. Nano-sized particles were confirmed by dynamic light scattering (see FIG. 2E) and structure was characterized by powder x-ray diffraction (see FIG. 2F). The $C_2H_4$, $C_2H_6$, $C_3H_6$, and $C_3H_8$ adsorption show that nanocrystals retain high capacity for olefins and selectivity for olefins over paraffins (see FIG. 2A-D).

Membrane Casting and Activation.

To prevent agglomeration, nanocrystals were not dried before film casting and formation. Concentrations of $M_2$(dobdc) in methanol were determined by sonicating a stock solution and reducing a 1-mL aliquot to dryness to find the mass of activated nanocrystals The resulting stock solutions were found to be ~50 mg/ml. For $M_2$(dobdc)/6FDA-DAM mixed-matrix membranes, an aliquot from the $M_2$(dobdc) stock solution in methanol was taken and redispersed in 10 mL of dichloromethane. The nanocrystal suspension was then sonicated using a horn sonicator for 2 min, adding additional dichloromethane in order to maintain a total volume of 10 mL. 6FDA-DAM was then dissolved into the $M_2$(dobdc) suspension and the mixture was sonicated for another 1 min. The mixture was cast onto a glass plate and the dichloromethane was allowed to evaporate over the course of ~24 h. The resulting films were found to be 40-70 μm thick. The freestanding film was then dried in a vacuum oven at 120° C. for 24 h in order to remove residual dichloromethane.

Thermogravimetric Analysis of the Membranes.

Figure 3:
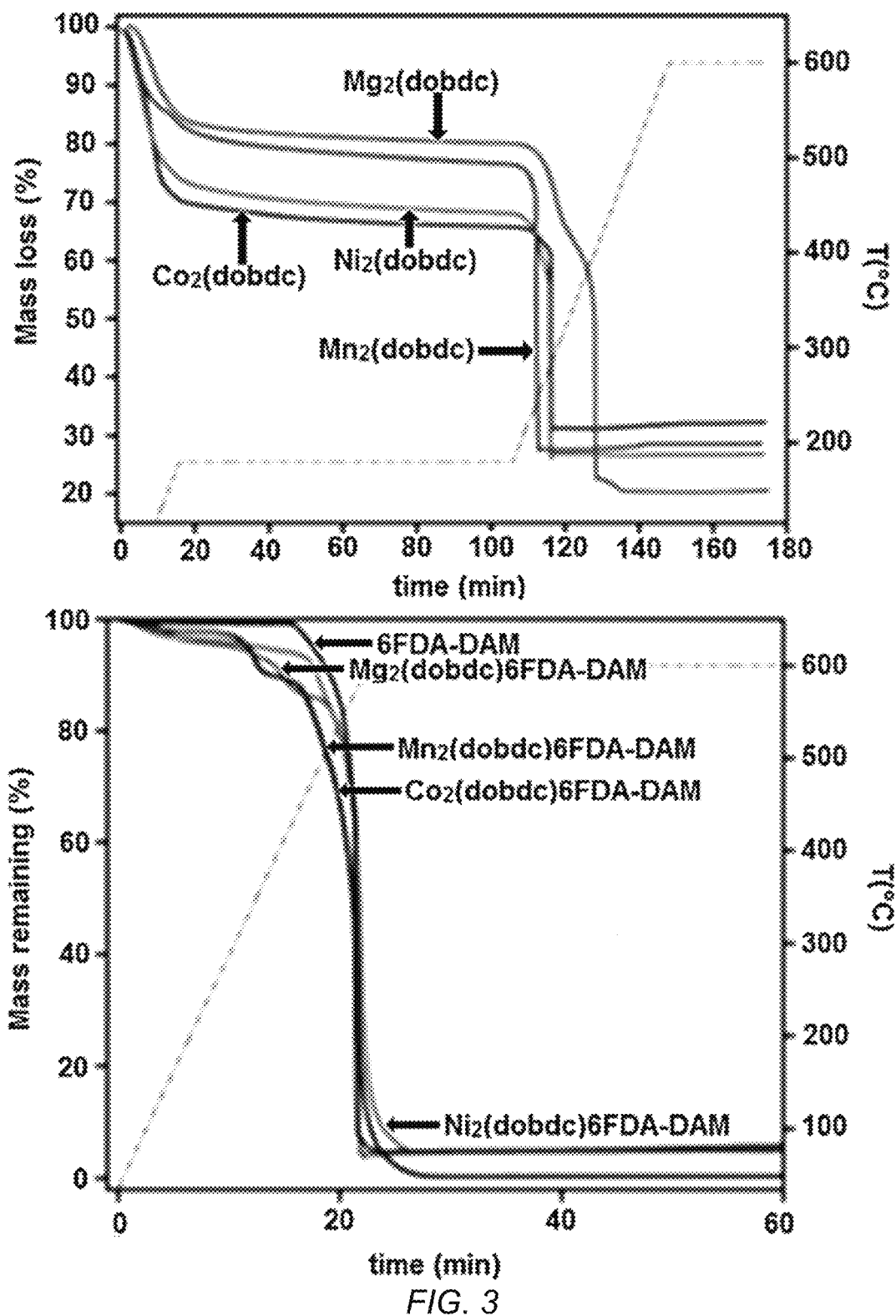
FIG. 3 provides thermogravimetric analysis of $M_2$(dobdc) nanocrystals (left) and $M_2$(dobdc)/6FDA-DAM mixed matrix membranes (right) under flowing $O_2$.

The loading of $M_2$(dobdc) nanocrystals in 6FDA-DAM was determined by a thermogravimetric analysis method. For reference, the $M_2$(dobdc) powder was first activated under flowing $N_2$ at 180° C. for 1.5 h to ensure activation, and then the samples were heated to 600° C. under flowing $O_2$. The remaining oxide mass was compared to the initial activated mass of the metal-organic framework (see FIG. 3). The same procedure was conducted for the $M_2$(dobdc)/6FDA-DAM films. The percentage of mass remaining after the ramp to 600° C. under $O_2$ is attributable to metal oxide, and from this the amount of activated $M_2$(dobdc) present in the film was obtained.

In order to create gas-accessible metal sites within the $M_2$(dobdc), the mixed-matrix membranes needed to be heated under vacuum or flowing $N_2$. The activation conditions were screened for $Co_2$(dobdc) and $Ni_2$(dobdc) by thermogravimetric analysis (see FIG. 4), and it was found that 180° C. maximized $CO_2$ uptake. Moving forward, all membranes were activated at 180° C. under vacuum prior to permeation testing. In order to visualize the dispersion of $M_2$(dobdc) nanocrystals throughout the membrane, scanning electron micrographs of the membrane cross-sections were taken (see FIG. 5). It appears that there is some MOF aggregation, for $Mg_2$(dobdc) and $Mn_2$(dobdc), while $Co_2$(dobdc) and $Ni_2$(dobdc) are much more dispersed throughout the film. This higher dispersity is likely due to stronger polymer-MOF interactions for Co and Ni, in addition to their smaller particle size.

Surprisingly, certain nanocrystalline MOFs employed here show the ability to crosslink with the polymer. Originally, these crosslinking effects were recognized by visual inspection of solubility of the membranes in dichloromethane. When initially forming the membrane, the polymer is rapidly dissolved in dichloromethane and the $M_2$(dobdc) is added to create a stable suspension. Upon drying and membrane, it was observed that some $M_2$(dobdc)/polymer membranes do not redissolve in their casting solvent. After 24 hours, it was found that $Ni_2$(dobdc)/6FDA-DAM, $Ni_2$(dobdc)/6FDA-Durene:Jeffamine (J10), and Co2(dobdc)/6FDA-DAM are stable in dichloromethane, whereas neat 6FDADAM and 6FDA-Durene:Jeffamine (J10) readily redissolves completely. This observation indicates an increased chemical stability imparted on the polymer upon the incorporation of $Ni_2$(dobdc) and $Co_2$(dobdc).

Analyzing the Crosslinking Effect with Different MOFs.

Figure 6:
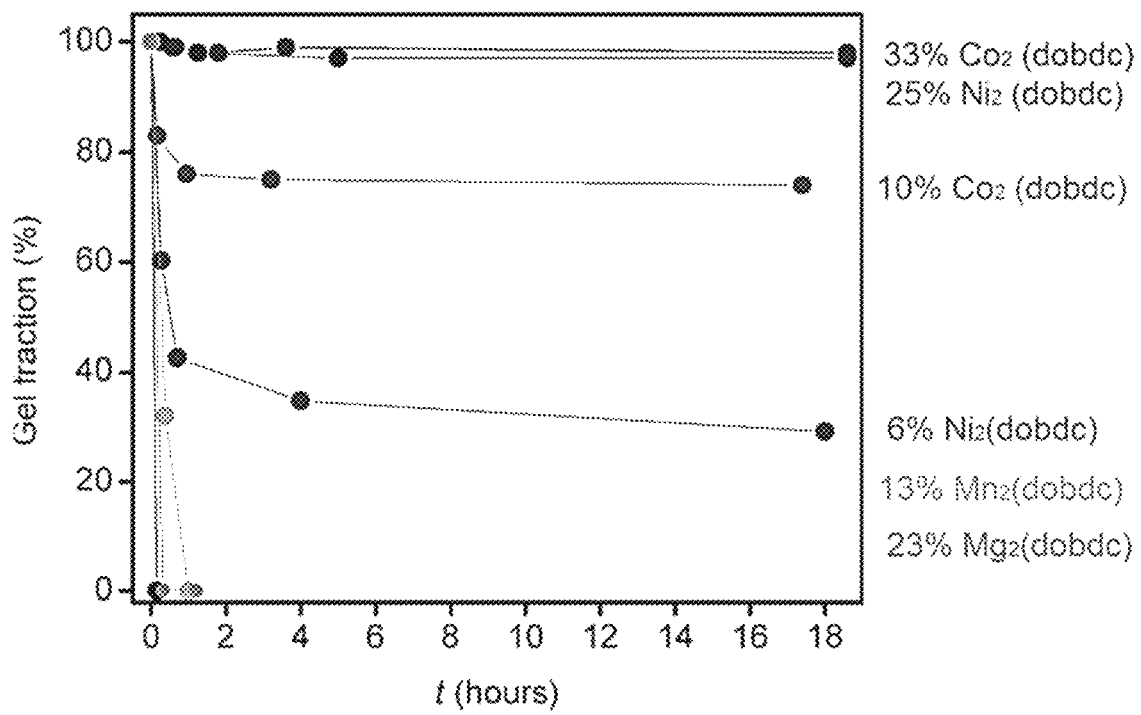
FIG. 6 presents soxhlet extraction dissolution kinetics for various M2(dobdc)/6FDA-DAM polyimides and neat 6FDA-DAM.
Figure 7:
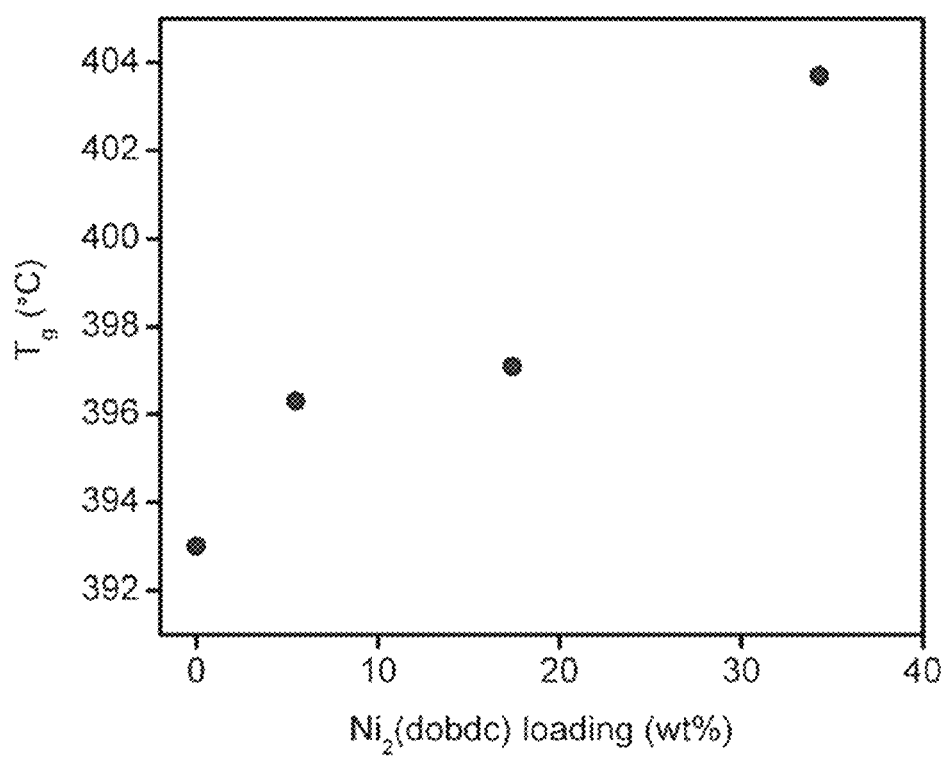
FIG. 7 shows the monitoring glass transition temperature as a function of $Ni_2$(dobdc) loading in 6FDA-DAM by differential scanning calorimetry.

Quantification of this crosslinking effect was carried out by Soxhlet extraction. In these experiments, the gel fraction is defined as the percentage of polymer or composite film that will not redissolve in a refluxing solution of dichloromethane. Kinetics of dissolution for various $M_2$(dobdc)/6FDA-DAM and neat 6FDA-DAM reveal that increasing $Ni_2$(dobdc) and $Co_2$(dobdc) in 6FDA-DAM increases the gel fraction, whereas Mn2(dobdc) and Mg2(dobdc) do not contribute to crosslinking (see FIG. 6). There are two potential reasons why films containing $Ni_2$(dobdc) and $Co_2$(dobdc) differ from $Mg_2$(dobdc) and $Mn_2$(dobdc). First, Mg and Mn make weaker bonds with the polymer as compared with Ni and Co, in accordance with the Irving-Williams series. Alternatively, because $Ni_2$(dobdc) and $Co_2$(dobdc) nanocrystals are smaller, their larger external surface area may relate to a greater number of stabilizing MOF/polymer interactions. Similarly, in the case of 6FDA-Durene and 6FDADurene: Jeffamine J(10) samples, Ni2(dobdc) causes enhanced stability in dichloromethane under 24 h of Soxhlet extraction, whereas $Mg_2$(dobdc) does not increase the stability (Table 2).

TABLE 2

Soxhlet extraction results for 6FDA-Durene and J(10) polymers containing $Ni_2$(dobdc) and $Mg_2$(dobdc)

| Polymer | MOF | Loading (wt. %) | Gel Fraction |
| --- | --- | --- | --- |
| 6FDADurene | n/a | 0 | 0% |
| 6FDADurene | $Ni_2$(dobdc) | 24 | 50% |
| J(10) | n/a | 0 | 0% |
| J(10) | $Ni_2$(dobdc) | 21 | 83% |
| J(10) | $Ni_2$(dobdc) | 41 | 95% |
| J(10) | $Mg_2$(dobdc) | ~20 | trace |

Interestingly, in the case of $Ni_2$(dobdc), incorporation of Jeffamine into 6FDA-Durene resulted in higher gel fractions. Jeffamine is a hydrophilic subunit that contains high quantities of ethylene glycol and propylene glycol, which may more strongly interact with the MOF nanoparticles. Differential scanning calorimetry showed a weak correlation between glass transition temperature and the amount of $Ni_2$(dobdc) in 6FDA-DAM. An increase in glass transition temperature may reflect a strong interaction between the polymer and the MOF, potentially indicating some degree of crosslinking.

Gas Permeability Measurements.

Figure 20:
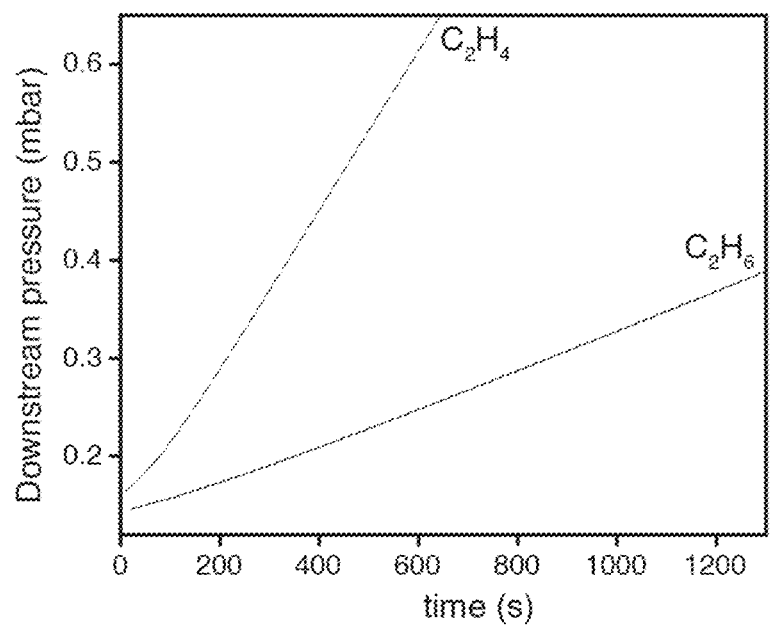
FIG. 20 presents example permeation curves for 10% $Co_2$(dobdc) in 6FDA-DAM. The steady state permeation was taken at six times the time lag.
Figure 21:
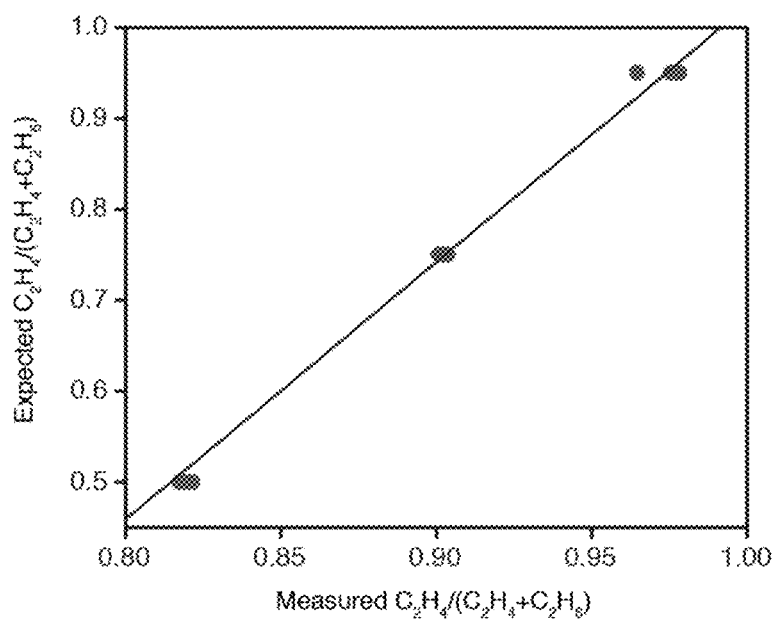
FIG. 21 provides mass spectrometer calibration to analyze the composition of $C_2H_4/C_2H_6$ mixtures. Gas cylinders of known composition (50.0%, 75.0%, 95.0% $C_2H_4$ in $C_2H_6$) were used to measure the mass fraction of (mass 27)/[(mass 27)+(mass 30)] in the mass spectrometer.
Figure 22A:
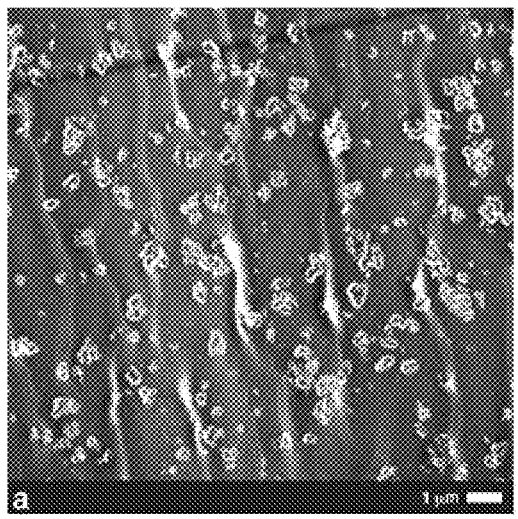
FIG. 22A-D presents transmission electron micrographs of $M_2$(dobdc)/6FDA-DAM membrane cross-sections. Micrographs of ~100 nm thick (A) $Mg_2$(dobdc), (B) $Mn_2$(dobdc), (C) $Co_2$(dobdc), and (D) $Ni_2$(dobdc) membrane cross-sections. White edges around $Mg_2$(dobdc) and $Mn_2$(dobdc) agglomerates are tears in the polymer cross-section because of poor adhesion between the agglomerate and the particle, and may be created during the microtome process. This effect is not observed in the case of $Ni_2(dobdc)$ and $Co_2(dobdc)$ membranes.
Figure 22B:
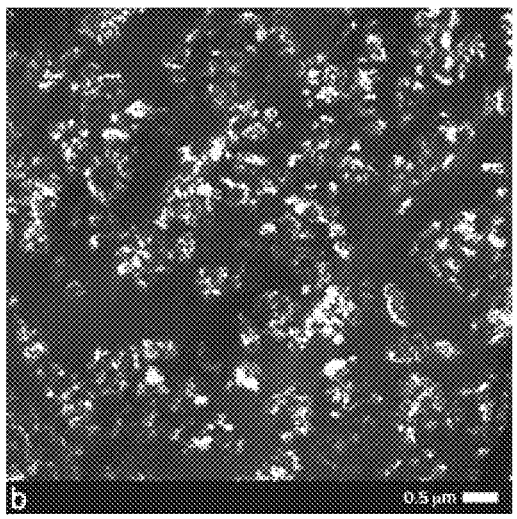
Figure 22C:
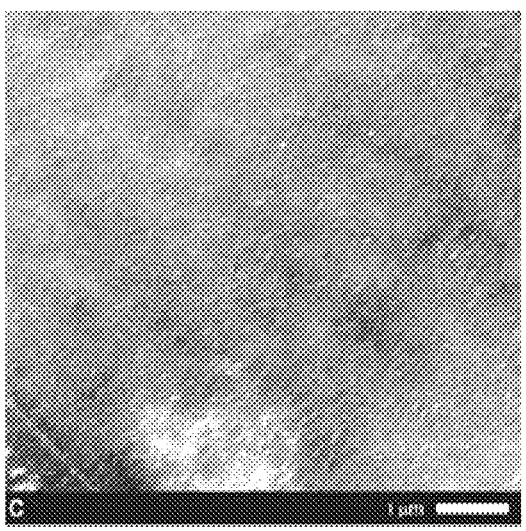
Figure 22D:
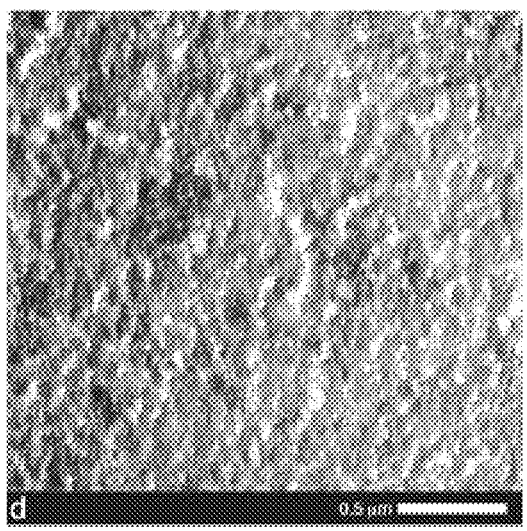
Figure 23A:
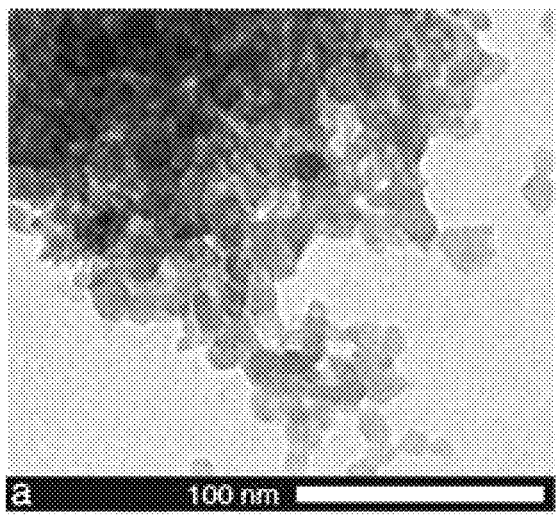
FIG. 23A-D provides images of $M_2(dobdc)$ nanocrystals. (A, C) Transmission electron micrographs, and (B, D) scanning electron micrographs of $M_2(dobdc)$ nanocrystals. Images confirm particle sizes as measured by dynamic light scattering.
Figure 23B:
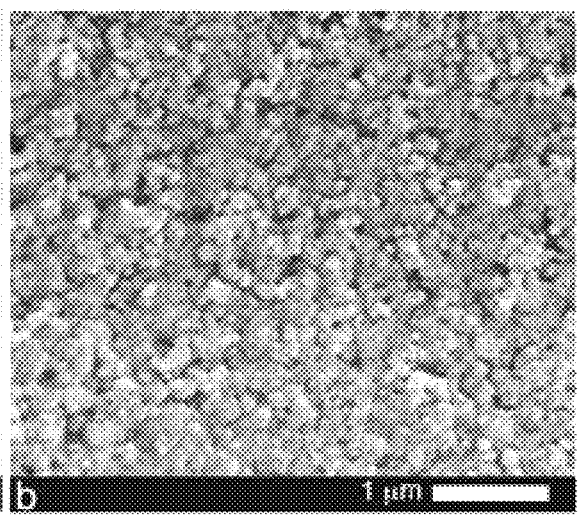
Figure 23C:
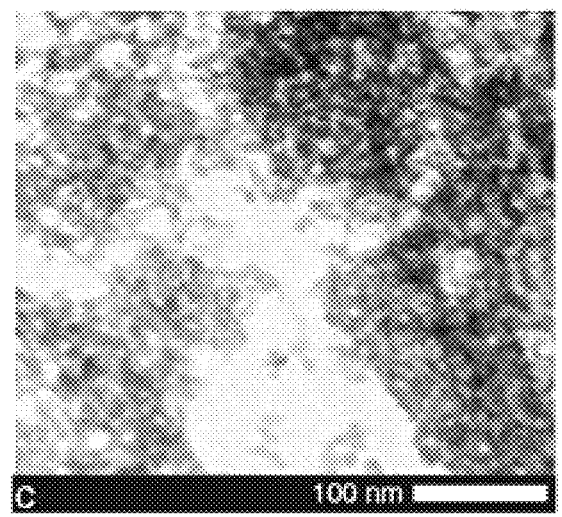
Figure 23D:
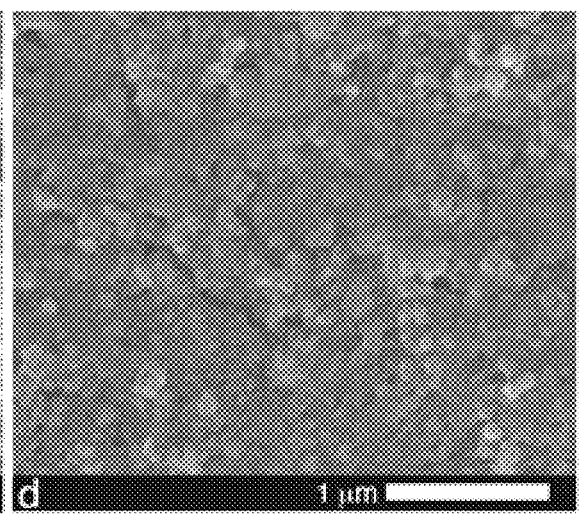
Figure 24A:
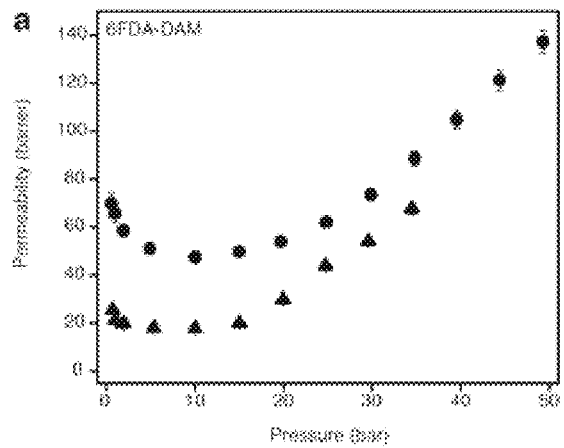
FIG. 24A-D presents $C_2H_4$ and $C_2H_6$ permeability Isotherms for 6FDA-DAM and $M_2(dobdc)$. (A) $C_2H_4$ (circles) and $C_2H_6$ (triangles) permeability isotherms in neat 6FDA-DAM, (B) 25% $Ni_2(dobdc)$, (C) 33% $Co_2(dobdc)$. (D) Comparison of ethylene permeability isotherms for 25% $Ni_2(dobdc)$ (purple circles), 33% $Co_2(dobdc)$ (navy circles), and neat 6FDA-DAM (black circles).
Figure 24B:
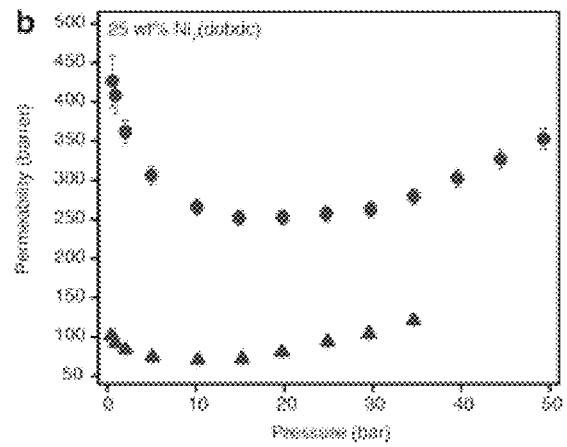
Figure 24C:
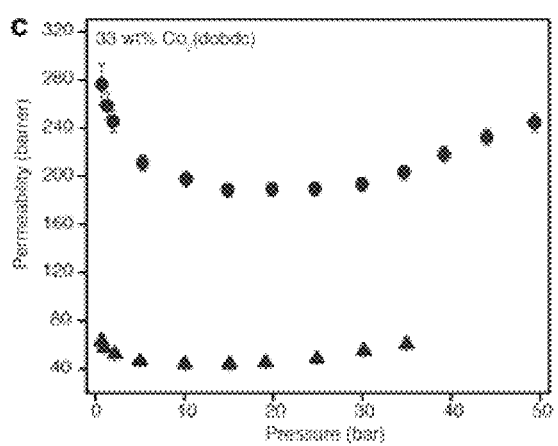
Figure 24D:
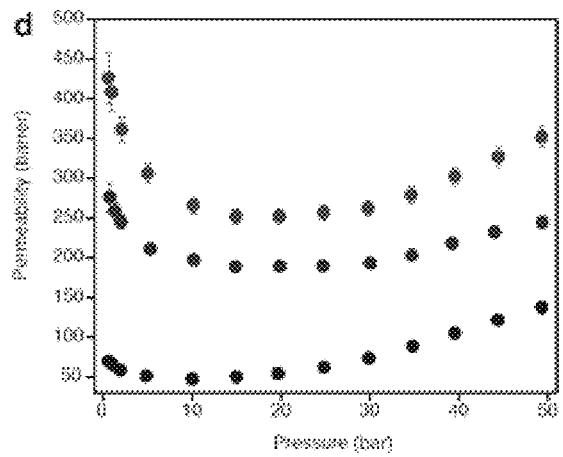

Gas permeation was determined using permeation systems that were constructed in-house. To prepare samples, films were supported on brass shim stock disks. These disks were machined to fit tightly into the permeation cells, and they contained a hole bored directly through their center. Films were placed over the hole, and a seal was formed between the brass disk and film by affixing samples to the disk with impermeable PDMS glue. Upon curing, a small area of film remained exposed, and the area of film accessible to gas transport was determined using a scanner. Membrane thicknesses were measured with a depth gauge. The membrane support was loaded into a stainless steel filter holder (Millipore™ XX4502500 for single low pressure measurements, (Millipore™ XX4504700 for multiple high pressure single component measurements, and Millipore™ XX4404700 for high pressure mixed-gas measurements). In order to activate the $M_2$(dobdc) nanocrystals contained within the polymer membrane, the film was heated at 180° C. in situ under dynamic vacuum for ~12 h using a custom built heating mantle. Prior to gas permeation tests, the system was held under static vacuum and the leak rate into the downstream volume was determined. This leak rate was then subtracted from subsequent permeation rates; however, it was noted that the leak rate was <1% of the permeation rate for each of the gases tested. For single point, low pressure measurements, ethane permeation tests were run before ethylene. The samples were reactivated at 180° C. for 30 min in between measurements. The same film was used for each gas in order to prevent errors in membrane thickness or exposed area from translating into errors in selectivity. To ensure that the results were independent of thermal annealing history and plasticization and conditioning effects, permeation experiments were repeated on films that were previously exposed to ethane and ethylene, and within the uncertainty of the measurements, no changes were observed in permeation for the second set of experiments. In the case of high-pressure measurements (where membranes are susceptible to plasticization) a new membrane was loaded so that plasticization of the film by the previous gas did not affect the permeability measurements after each plasticizing gas, i.e. $CO_2$, $C_2H_4$ and $C_2H_6$. Permeation tests were run at least six times the time lag at each pressure point. For permeation tests where a time lag was not detectable, permeation was measured for 3 min at each pressure point. In measuring mixed-gas permeation, a similar procedure to high-pressure single-component measurements was followed. In order to prevent concentration polarization on the feed side of the membrane, the gas mixture (either 50:50 $C_2H_4$ in $C_2H_6$ or 50:50 $CO_2$ in $CH_4$) was flowed across the feed side of the film, through a needle valve and a bubbler. The ratio of the permeation rate to the feed sweep rate, or stage cut, was kept at <1%. The gas mixture was allowed to permeate the membrane until a steady state permeation rate was reached (<6 time lags). The permeate volume was then evacuated and allowed to accumulate under steady state conditions. The permeate gas was then expanded into an evacuated volume and analyzed with a mass spectrometer (MKS Microvision 2). To determine the fraction: $pC_2H_4/(pC_2H_4+pC_2H_6)$, the mass fraction of (mass·27)/[mass·27)+(mass·30)] was calibrated to cylinder mixtures of known composition. Similarly, to determine: $pCO_2/(pCO_2+pCH_4)$, the mass fraction of (mass·44)/[mass·44)+(mass·15)] as used. Calibration curves for these mixtures are given in FIG. 20 and FIG. 21.

Gas Adsorption Measurements.

Low-pressure gas adsorption data between 0 and 1.1 bar were measured using a Micromeritics ASAP 2020 instrument. Samples consisting of 50-100 mg of $M_2$(dobdc) powder, polymer film, or mixed-matrix film were loaded into a preweighed tube, and heated at 180° C. for 24 h. The mass of the activated sample was then used as the basis for the adsorption measurements. After an adsorption isotherm was measured, the sample was reactivated at 180° C. for 3 h before measuring a subsequent adsorption isotherm. Langmuir surface areas for M2(dobdc)nanocrystals were determined from gas adsorption measurements with $N_2$ (see Table 3).

TABLE 3

$N_2$ 77 K Langmuir surface areas for $M_2$(dobdc) nanocrystals

| | Surface Area (m²/g) |
|---|---|
| $Mg_2$(dobdc) | 1973 |
| $Mn_2$(dobdc) | 1082 |
| $Co_2$(dobdc) | 1549 |
| $Ni_2$(dobdc) | 1562 |

Imaging of $M_2$(dobdc)/6FDA-DAM Mixed-Matrix Membranes and $M_2$(dobdc) Nanocrystals.

For cross-sectional transmission electron microscopy (TEM) samples, the mixed-matrix membranes were imbedded in epoxy resin (Araldite 502, Electron Microscopy Sciences) and cured at 60° C. for 12 h. The sample was then cut into ~100-nm thick sections using an RMC MT-X Ultramicrotome (Boeckler Instruments) and collected on copper TEM grids. TEM images were obtained on a JEOL 1200 EX TEM instrument operating at an accelerating voltage of 120 kV. Scanning electron microscopy (SEM) images were collected at 5 keV/12 µA using a field emission SEM instrument (JEOL FSM6430). Membrane cross-sections were exposed by fracturing in liquid nitrogen. For imaging $M_2$(dobdc) powders, SEM samples were prepared by dispersing the nanocrystals in dichloromethane and drop casting onto a silicon chip. In order to dissipate charge, the samples were sputter coated with ~3 nm of Au (Denton Vacuum, LLC). TEM samples of $M_2$(dobdc) powders were prepared by dispersing nanocrystals into methanol and drop casting onto copper TEM grids.

Determination of Glass Transition Temperatures.

The glass transition temperature ($T_g$) for 6FDA-DAM, 6 wt % $Ni_2$(dobdc) and 25 wt % $Ni_2$(dobdc) were determined by differential scanning calorimetry using a TA Q200 instrument. Temperature scans were conducted at 10° C./min between 40 and 410° C., and the exotherm on the second temperature scan was taken for the $T_g$.

Dynamic Light Scattering Measurements.

Number-averaged particle size distributions were collected by dynamic light scattering. After synthesis, including washing in methanol, a 1-mg sample of the $M_2$(dobdc) nanocrystals was suspended in 20 mL of methanol and sonicated using a horn sonicator for 2 min. Measurements were performed at 35° C. on a Brookhaven BI-200sm instrument, using samples suspended in methanol and assuming a refractive index of 1.7 for the $M_2$(dobdc) nanocrystals.

Calculating Permeability.

In order to ensure steady-state permeation rates are attained, permeability measurements were run for at least six times the time lag, where the time lag is defined as the intercept on the time-axis on the pressure vs. time plot where a line is drawn fitting the linear region. t=0 corresponds to when the downstream volume is closed to vacuum and the gas is allowed to begin accumulating. At the end of six times the time lag, the slope of the line fitting the last 20% of the data was used to determine the steady-state permeation rate. In the case that the time lag was not detectable, i.e., for $CO_2$ permeation, the permeation at each pressure point was allowed to proceed for three minutes.

The pressure-based permeability is calculated using Equation 1, where P is the permeability, l is the thickness of the film, $V_{cell}$ is the volume downstream of the membrane where gas is allowed to accumulate during a permeation test, A is the area of the membrane exposed to permeation, $P_f$ is the upstream pressure, R is the gas constant, T is the temperature in K, $$\left(\frac{dp}{dt}\right)_{ss}$$

is the steady-state permeation rate, and $$\left(\frac{dp}{dt}\right)_{leak}$$

is the leak rate. We report permeabilities in the unit of Barrer $$\left(1 \text{ Barrer} = 10^{-10} \frac{\text{cm}^3(STP)*\text{cm}}{\text{cm}^2*s*cmHg}\right) \quad (1)$$

$$P = \frac{l*V_{cell}}{A*P_f*R*T}\left[\left(\frac{dp}{dt}\right)_{ss} - \left(\frac{dp}{dt}\right)_{leak}\right]$$

Error in the permeability was propagated from errors in the film thickness, film area, upstream pressure transducer, temperature, and downstream volume.

Calculation of Permeability Based on Upstream Fugacity.

The true driving force for the permeation of gas is the gradient in the chemical potential across the membrane. Normally, pressure is used as a proxy for the chemical potential and is valid in the limit of P→0. At higher pressures, however, the pressure no longer remains a good proxy for the driving force because non-ideal gas behavior becomes important. Instead, the gas fugacity is a more accurate measure of the imposed driving force for permeation.

The fugacity-based permeability can instead be calculated by Equation 2, $$P = \frac{l * V_{cell}}{A * f_f * R * T}[(^{dp}/_{dt})_{ss} - (^{dp}/_{dt})_{leak}] \quad (2)$$

where $f_f$ is the fugacity of the feed.

This treatment is especially relevant for polarizable gases, e.g. $CO_2$, $C_2H_4$, and $C_2H_6$, where the fugacity deviates strongly from the pressure at the conditions tested. Fugacities were estimated from the virial equation using both second and third virial coefficients. Second virial coefficients were taken from the polynomial expressions recommended by Dymond et al. (*The virial coefficients of pure gases and mixtures*. Landolt-Bornstein: Berlin, 2001; Vol. Group IV: Physical chemistry vol 21 subvolumes A and B), and third virial coefficients were estimated from data tables compiled by Dymond et al. by plotting multiple data points around 35° C. The plots were fit to polynomial expressions, and the best fit value was taken at 35° C. Gas density data was taken from REFPROP, which is a database maintained by NIST.

Figure 25A:
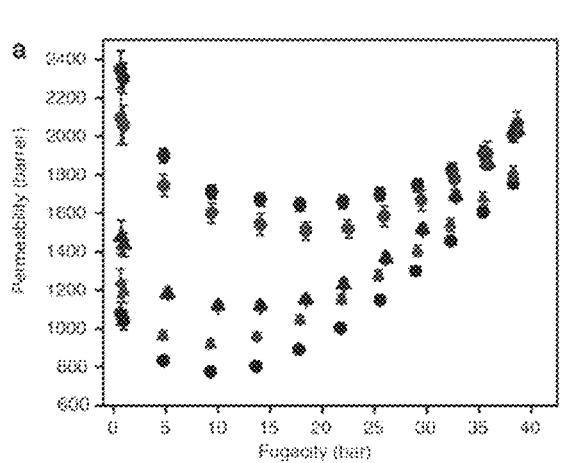
FIG. 25A-B provides $CO_2$ fugacity-based permeability isotherms for 6FDA-DAM and $M_2(dobdc)$ (M=Co, Ni). (A) Absolute permeability and (B) normalized permeability as calculated using Equation 4.
Figure 25B:
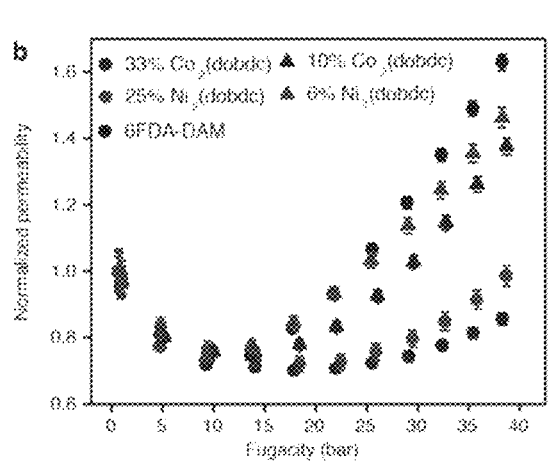

Since pressure overestimates the driving force for permeation, the fugacity-based permeability isotherm tends to turn upward at higher fugacities as compared to the pressure-based permeability isotherm. This trend results in a lower experimental plasticization point compared to the pressure-based permeability data. It is important to note, however, that reduction in the plasticization is still clearly observed for each case (see FIG. 25 and FIG. 26), regardless of the basis for permeability calculations.

Calculation of Permeability Parameters.

In order to further elucidate the mechanism of increased selectivity and permeability, it was useful to determine the relevant parameters contributing to the permeability. Assuming that permeation follows the solution-diffusion model (Equation 3) in these films, $$P = D*S \quad (3)$$

where D is the diffusivity in $cm^2 s^{-1}$ and S is the solubility in $$\left(\frac{cm^3 (STP)}{cm^3 * mbar}\right)$$

The solubility is also related to the equilibrium adsorption isotherm (Equation 4), $$S = \frac{p(n_0)}{P_0} \quad (4)$$

where ρ is the density of the membrane in $g \cdot cm^{-3}$, $n_o$ is the amount adsorbed in equilibrium with the feed pressure in $cm^3$ (STP)$\cdot g^{-1}$, and measured from the adsorption isotherm, and $p_o$ is the feed pressure in mbar. The density of the membrane was calculated using the crystallographic density of framework, the density of the polymer, and the mass loading of $M_2$(dobdc) in the polymer as measured by TGA. The diffusivity can then by calculated by D=P/S.

Alternatively, the diffusivity can be calculated using the time-lag method (Equation 5), $$D = \frac{l^2}{6\theta} \quad (5)$$

where θ is the time lag. These diffusivities are presented in Table 4.

TABLE 4

Analysis of diffusivities based on the time-lag method.

| | $D_{C_2H_4}\left(\frac{cm^2}{s}\right) \cdot 10^8$ | $D_{C_2H_6}\left(\frac{cm^2}{s}\right) \cdot 10^8$ | $D_{C_2H_4}/D_{C_2H_6}$ |
|---|---|---|---|
| 6FDA-DAM | 1.62 | 0.49 | 3.3 |
| 33% Co$_2$(dobdc) | 0.75 | 0.22 | 3.4 |
| 25% Ni$_2$(dobdc) | 0.29 | 0.08 | 3.6 |

Time lags were measured from permeation at a feed pressure of 0.75 bar at a temperature of 35° C., and the diffusivity is calculated by D = l$^2$/6θ, where l is the thickness of the film and θ is the time lag.

Interestingly, the diffusivities as calculated from the time-lag method are lower than for the static, solution-diffusion calculation. This result can be explained by the much higher adsorption enthalpy on the open metal sites of the framework causing partial immobilization of the penetrant during non-steady state permeation.

Polymer Synthesis.

Polyimides were formed from 2,2'-bis-(3,4-dicarboxyphenyl) hexafluoropropane dianhydride (6FDA) and diaminomesitylene (DAM) using standard chemical imidization techniques. The dianhydride, 6FDA (P/N H0771, CAS #1107-00-2), and diamine, DAM (P/N T1275, CAS #3102-70-3), were purchased from TCI. Before use, 6FDA was purified once by vacuum sublimation and DAM was purified three times by vacuum sublimation. N-methyl-2-pyrrolidone (NMP) was purchased from Spectrum Chemicals (P/N M1557) and vacuum distilled immediately before use. Triethylamine (P/N TX1200-5) and acetic anhydride (P/N 320102) were purchased from EMD and Sigma-Aldrich, respectively, and were used as received. A dry atmosphere was maintained within the reaction glassware by flowing house nitrogen through a Drierite column (W. A. Hammond Drierite Co., Ltd., Xenia, Ohio) upstream of the reaction vessel. All glassware was attached to flowing, dry nitrogen before being flame dried.

To a three neck flask equipped with overhead mechanical stirrer, 2.152 g (14.33 mmol) of DAM was added and dissolved in 15 mL of NMP. Following dissolution of the diamine, the three neck flask was cooled to 0° C. using an ice bath before slowly adding 6.364 g (14.33 mmol) of 6FDA and an additional 15 mL of NMP. The sample was stirred for approximately 24 h to form a viscous poly(amic acid). Next, approximately 2 mL of triethylamine and 5.4 mL of acetic anhydride were added as the activating and dehydrating agents, respectively, for chemical imidization.

The solution was diluted with an additional 6 mL of NMP and allowed to stir for an additional 20 h to form the polyimide.

Following imidization, the viscous polymer solution was precipitated by pouring the reaction solution slowly into approximately 1 L of methanol (MeOH), which was stirring at intermediate speeds on a stir plate. The polymer fibers were rinsed thoroughly with MeOH, placed in a fresh batch of MeOH, and stirred to extract residual reaction solvent for approximately 18 h. Next, the fibers were again thoroughly rinsed in fresh MeOH before stirring the sample in fresh MeOH for an additional 18 h. After a final filtration and drying step, the polymer fibers were heated at 225° C. for approximately 24 h under vacuum. Following these rinsing and drying steps, no solvent was observed in the polymer film as determined from thermogravimetric analysis.

NMR Polymer Characterization.

Figure 27:
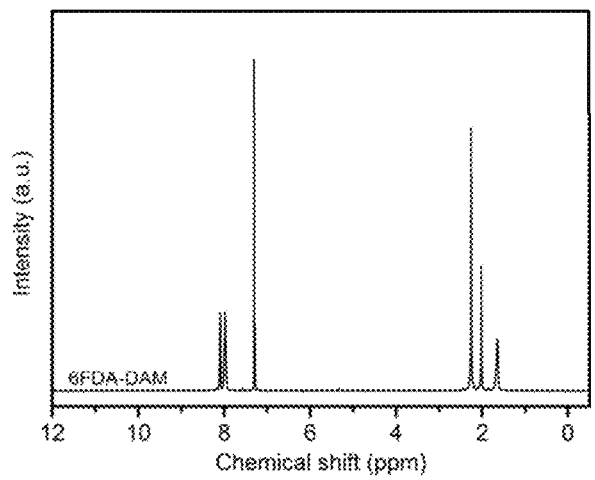
FIG. 27 presents $^1H$ NMR spectra for 6FDA-DAM. Peaks unassociated with the polymer structure at 7.30 and 2.14 ppm correspond to $CDCl_3$ and water, respectively. $^1H$ NMR (400 MHz, $CDCl_3$), δ 8.10 (d, 2H), 7.96-8.01 (m, 4H, overlapping signals), 7.28 (s, 1H), 2.25 (s, 6H), 2.01 (s, 3H).
Figure 28:
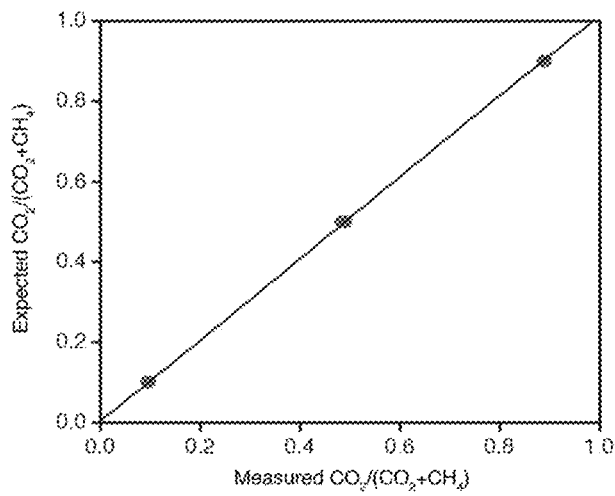
FIG. 28 presents mass spectrometer calibration to analyze the composition of $CO_2/CH_4$ mixtures. Tanks of known composition (10.0%, 50.0%, 90.0% $CO_2$ in $CH_4$) were used to measure the mass fraction of (mass 44)/[(mass 44)+(mass 15)] in the mass spectrometer.
Figure 29:
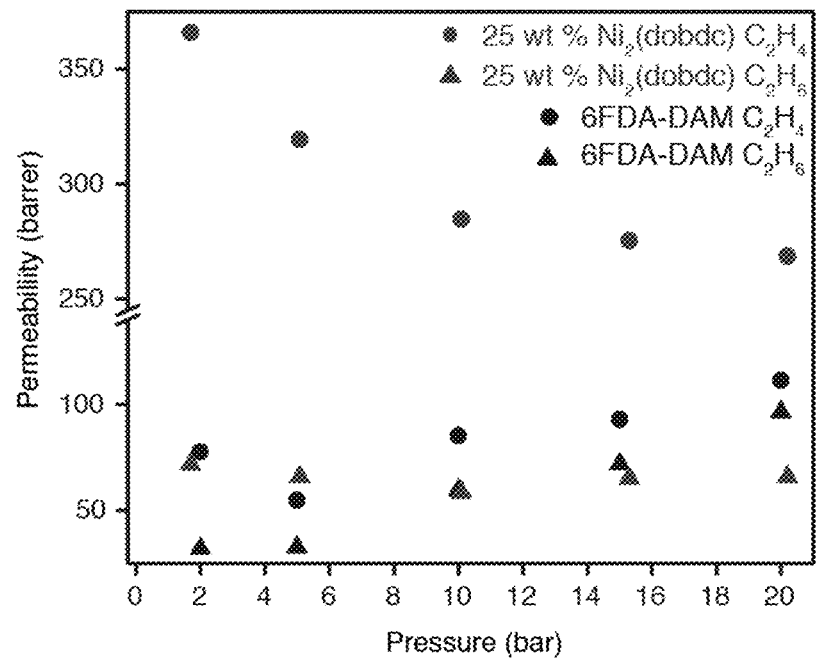
FIG. 29 provides mixed-gas permeabilities for $C_2H_4$ and $C_2H_6$ at 35° C. Permeabilities were calculated based on the partial pressure of each component in the feed (50% of the total feed pressure), the total permeation rate across the film, and the selectivity as measured by the mass spectrometer.
Figure 30:
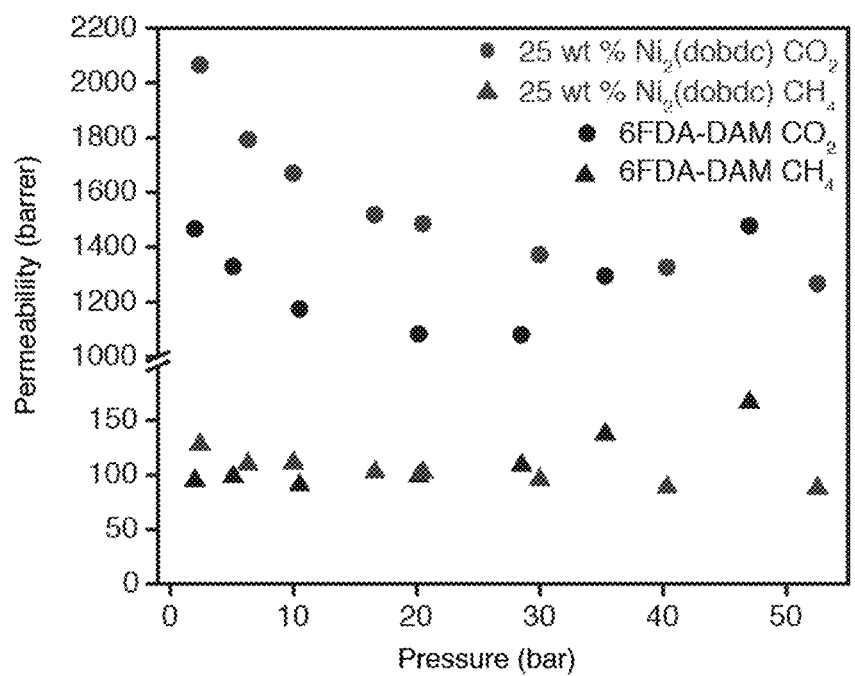
FIG. 30 provides mixed-gas permeabilities for $CO_2$ and $CH_4$. Permeabilities were calculated based on the partial pressure of each component in the feed (50% of the total feed pressure), the total permeation rate across the film, and the selectivity as measured by the mass spectrometer.
Figure 31:
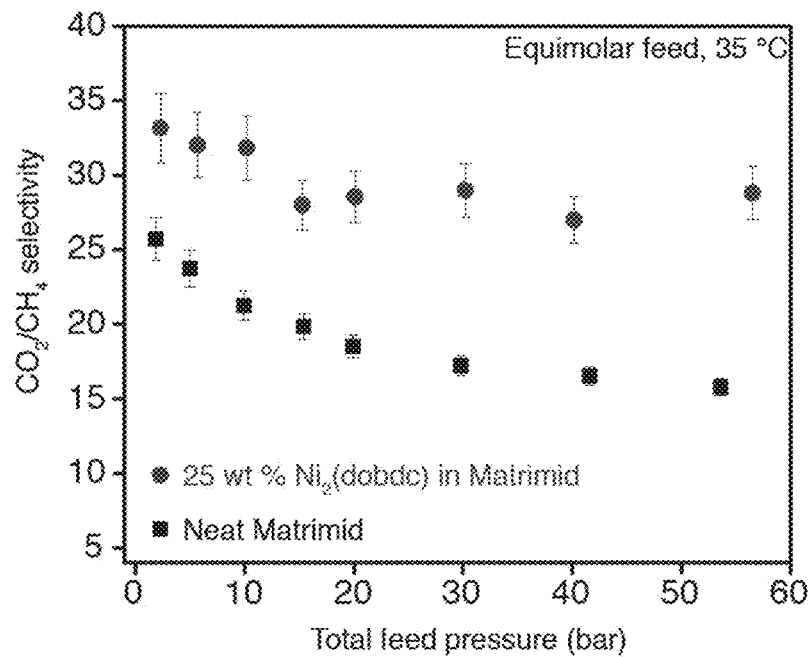
FIG. 31 demonstrates mixed-gas selectivity for neat Matrimid® and $Ni_2(dobdc)$ loaded films at increasing feed pressures of an equimolar $CO_2/CH_4$ mixture. Retention of high selectivity under high partial pressures of $CO_2$ are indicative of plasticization suppression.
Figure 32:
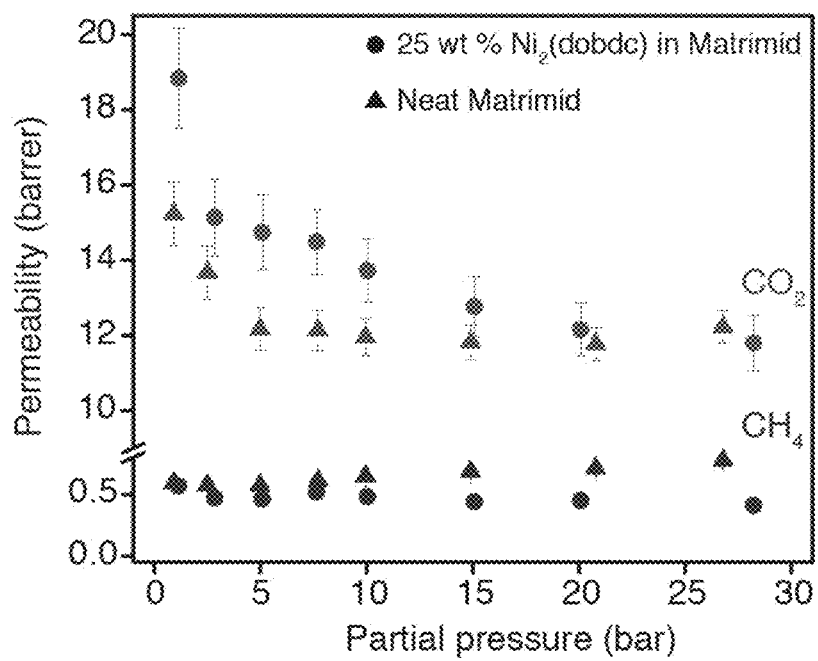
FIG. 32 presents permeability-pressure curves for $CO_2$ and $CH_4$ under mixed-gas conditions for neat Matrimid® and $Ni_2(dobdc)$ loaded films. No increase in $CH_4$ permeability was observed for $Ni_2(dobdc)$ loaded film, even in the presence of high partial pressures of $CO_2$. This further supports the reduction in plasticization upon incorporation of $Ni_2(dobdc)$ nanocrystals.
Figure 33:
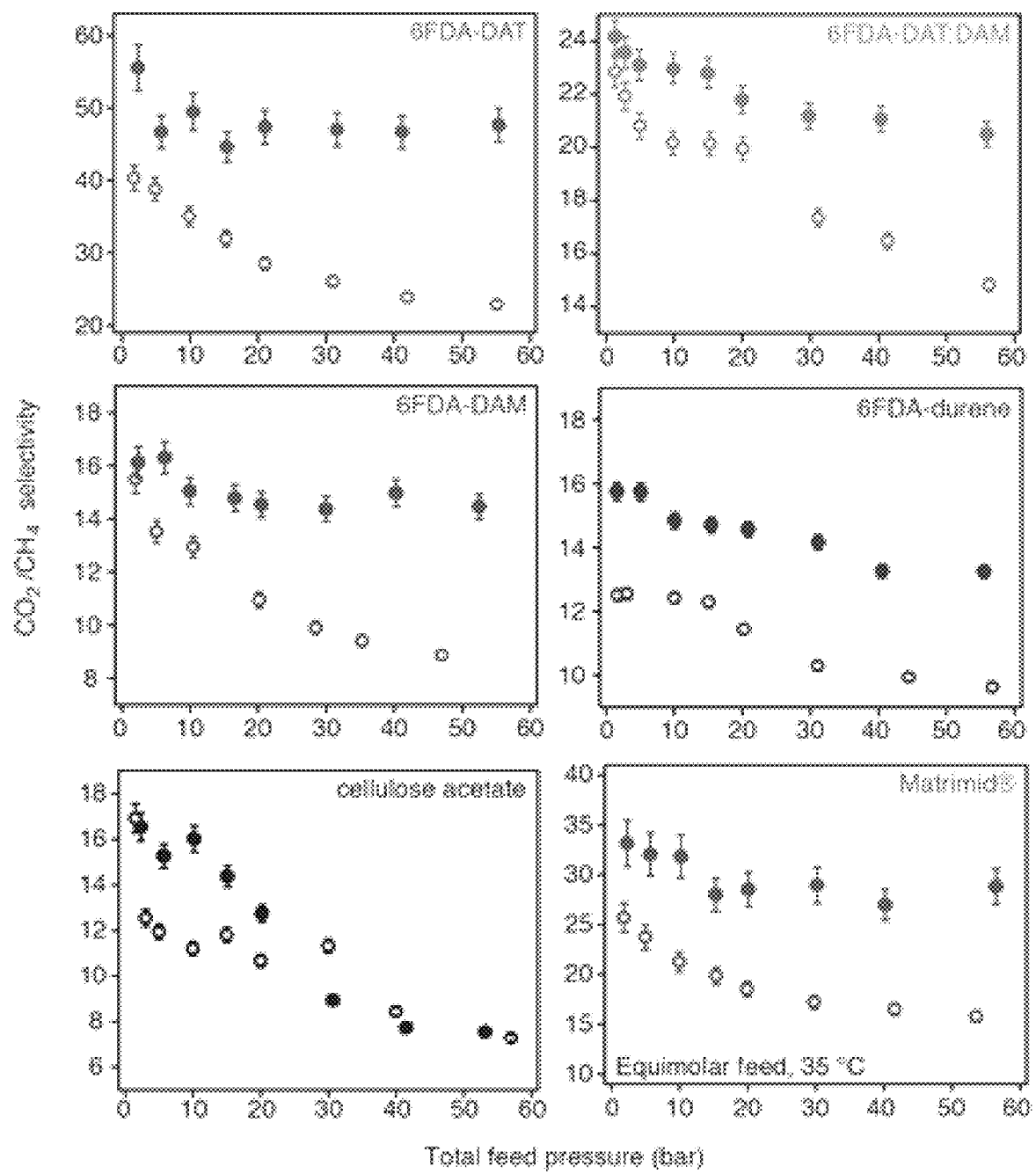
FIG. 33 shows data for mixed-gas $CO_2/CH_4$ selectivities using the neat polymers from FIG. 1 (open circles), and composite membranes including $Ni_2(dobdc)$ corresponding to those polymers (closed circles).
Figure 34:
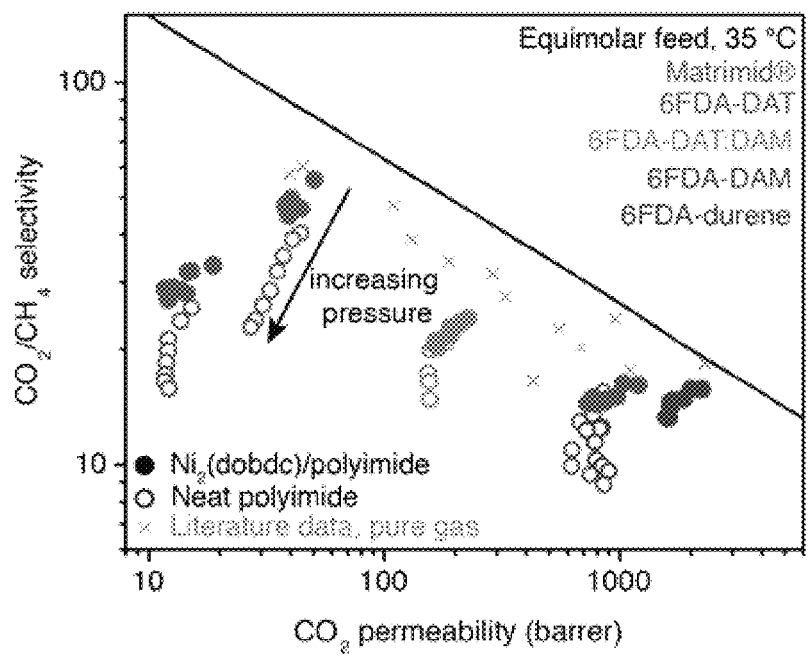
FIG. 34 shows mixed-gas data for neat (open circles) and composite (closed circles) membranes on the pure-gas $CO_2/CH_4$ upper bound. Composites consistently have better separation performance when compared with neat polymers.
Figure 35:
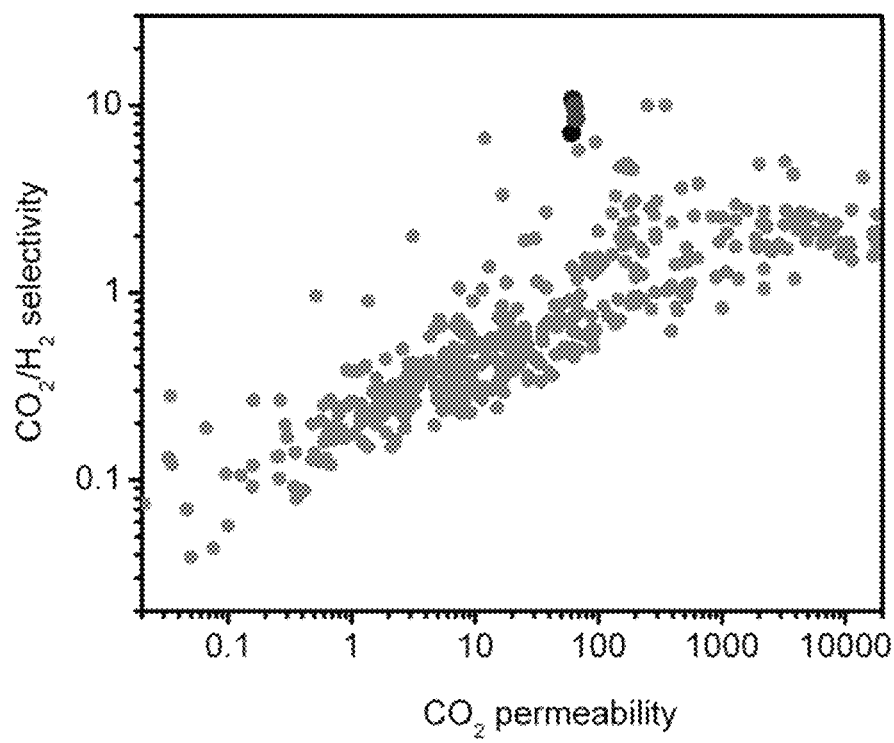
FIG. 35 shows Neat PEBAX® 1657 (black), 10 wt. % $Ni_2(dobdc)$, 20 wt. % $Ni_2(dobdc)$, and 30 wt. % $Ni_2(dobdc)$ in PEBAX® 1657 on the $CO_2/H_2$ upper bound.
Figure 36:
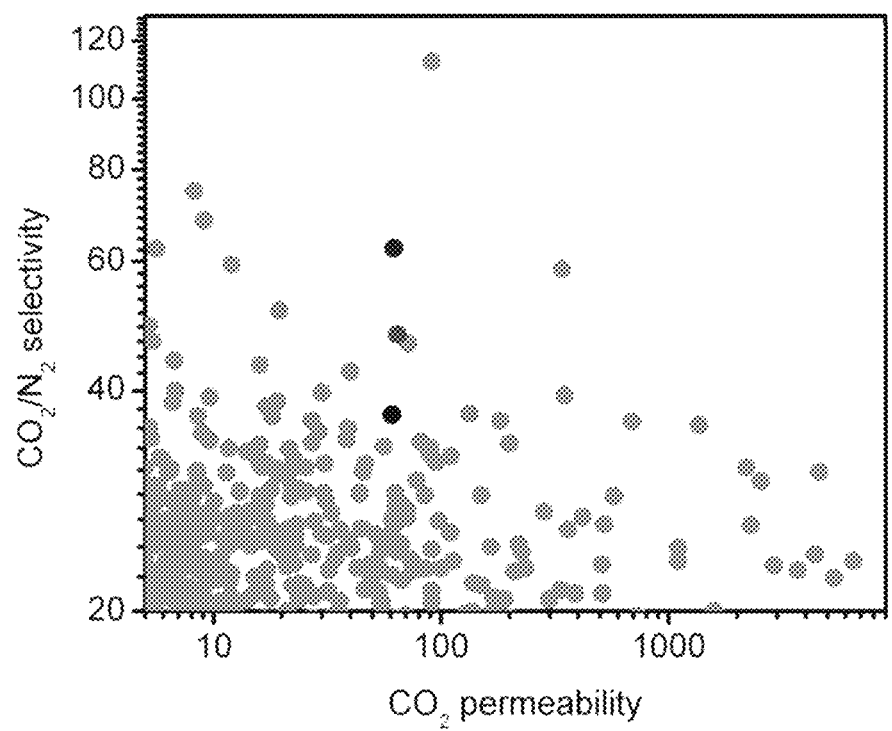
FIG. 36 shows a plot of neat PEBAX® 1657 (black), 20 wt. % $Ni_2(dobdc)$, and 30 wt. % $Ni_2(dobdc)$ in PEBAX® 1657 on the $CO_2/N_2$ upper bound.

$^1$H NMR was run on a 400 MHz instrument using $CDCl_3$ as the solvent. FIG. 27 presents the spectra, and the peak assignments closely match those reported in the literature. In addition to the peak for $CDCl_3$ (7.30 ppm), a peak for water appears at 2.14 ppm. No peaks were observed between 10 and 12 ppm, which indicates that the poly(amic acid) was fully imidized.

GPC Polymer Characterization.

Molecular weight was estimated using a Viscotek TDA 302 size exclusion chromatography (SEC) system calibrated relative to polystyrene and using tetrahydrofuran (THF) as the solvent. Table 5 presents the weight average molecular weight, number average molecular weight, and polydispersity index for the sample considered in this disclosure.

TABLE 5

Analysis of permeation parameters based on the solution-diffusion model.

| | | P (barrer) | $S\left(\dfrac{cm^3(STP)}{cm^3 * mbar}\right)$ | $D\left(\dfrac{cm^2}{s}\right) \cdot 10^8$ |
|---|---|---|---|---|
| $C_2H_4$ | 6FDA-DAM | 76 (2) | 0.0185 | 3.1 (0.0) |
| | 33% $Co_2$ (dobdc) | 276 (17) | 0.0605 | 3.4 (0.2) |
| | 25% $Ni_2$ (dobdc) | 426 (32) | 0.0730 | 4.4 (0.3) |
| $C_2H_6$ | 6FDA-DAM | 26 (1) | 0.0216 | 0.90 (0.03) |
| | 33% $Co_2$ (dobdc) | 71 (2) | 0.0488 | 1.09 (0.03) |
| | 25% $Ni_2$ (dobdc) | 101 (9) | 0.0552 | 1.37 (0.12) |

| | | $P_{C_2H_4}/P_{C_2H_6}$ | $S_{C_2H_4}/S_{C_2H_6}$ | $D_{C_2H_4}/D_{C_2H_6}$ |
|---|---|---|---|---|
| $C_2H_4$/ | 6FDA-DAM | 2.9 (0.0) | 0.86 | 3.4 (0.1) |
| $C_2H_6$ | 33% $Co_2$ (dobdc) | 3.9 (0.2) | 1.24 | 3.1 (0.2) |
| | 25% $Ni_2$ (dobdc) | 4.2 (0.4) | 1.32 | 3.2 (0.3) |

Permeation measurements at 0.75 bar and 35° C. were used to determine permeability (P). Solubilities (S) were determined from equilibrium gas adsorption isotherms. Diffusivities (D) were calculated based on the solution diffusion model, D = P/S.

The molecular weight of 6RDA-DAM was further determined from SEC characterization for 6FDA-DAM (see Table 6)

TABLE 6

Size exclusion chromatography characterization for 6FDA-DAM. Mw and Mn refer to weight average and number average molecular weight, and PDI is the polydispersity index.

| Mn (g/mol) | Mw (g/mol) | PDI |
|---|---|---|
| 69,500 | 166,000 | 2.4 |
| 56,100 | 184,000 | 3.3 |

Applicability of Plasticization Effects to Other Polymer Membranes.

Determining whether incorporation of In order to test whether the incorporation of $M_2$(dobdc) nanocrystals can be a general approach to reducing the plasticization effects in other polymers, a 25 wt % $Ni_2$(dobdc)/Matrimid® film was investigated for its plasticization resistance relative to neat Matrimid®. We have found that there is a similar increase in $T_g$, retention of high $CO_2$/$CH_4$ selectivity under mixed gas conditions, and a decrease in the plasticization pressure point (see Table 7). This indicates that this approach is indeed generally applicable to commercially relevant polymers for gas separations.

TABLE 7

Glass transition temperature measured by differential scanning calorimetry at a scan rate of 20° C. · min$^{-1}$ for neat Matrimid ® and $Ni_2$(dobdc) loaded films, indicating a rigidification of the polymer phase.

| Film | Tg |
|---|---|
| Neat Matrimid ® | 319 |
| 25 wt % $Ni_2$(dobdc)/Matrimid ® | 326 |

Construction of Membranes Comprising $M_2$(Dobdc) and 6FDA-DAM.

Figure 14A:
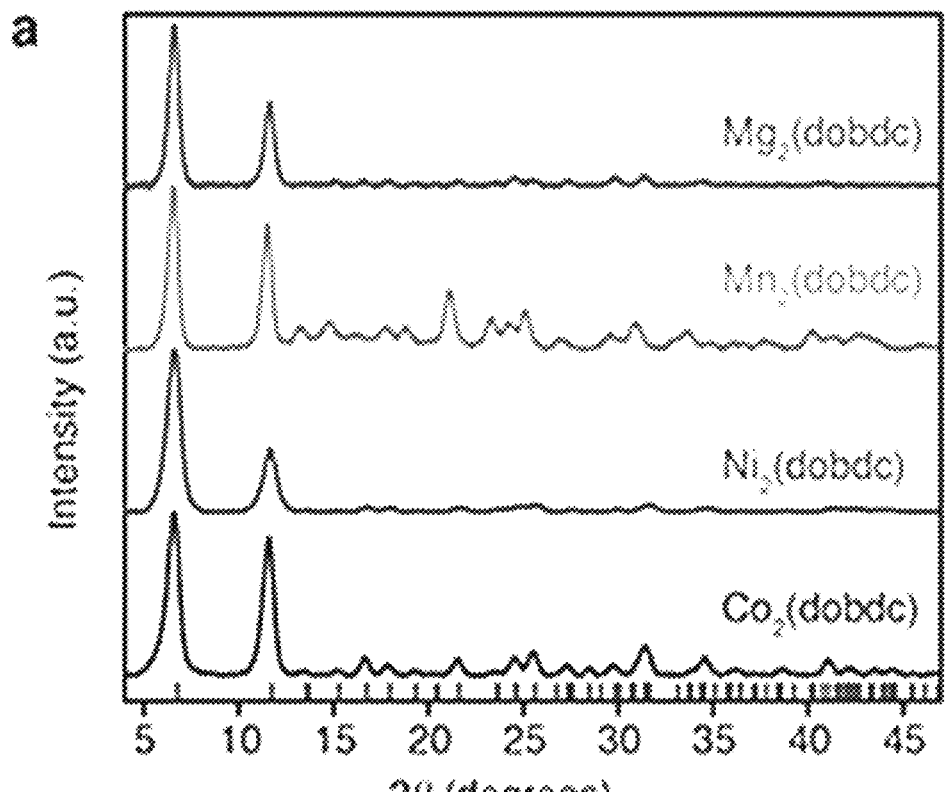
FIG. 14A-D presents physical and adsorptive properties for $M_2$(dobdc) nanocrystals. By rapidly combining $M(NO_3)_2 \cdot 6H_2O$ (M=Mg, Co, Ni) or $MnCl_2 \cdot 4H_2O$ and $H_4$dobdc with triethylamine, $M_2$(dobdc) crystallizes within minutes. (A) X-ray powder diffraction was used to confirm the crystallinity and phase purity of all as-synthesized $M_2$(dobdc) nanocrystals. Vertical lines indicate a simulated pattern for $Co_2$(dobdc). (B) Number-weighted particle size distributions, as measured by dynamic light scattering. Particle sizes were confirmed by scanning electron microscopy and transmission electron microscopy. In contrast to the different particle sizes, all $M_2$(dobdc) nanoparticles have similar average crystallite sizes, between 10 and 15 nm (see Table 1), as determined by analyzing Bragg peak widths in the powder diffraction patterns. These results suggest that $Ni_2$(dobdc) and $Co_2$(dobdc) form as dispersed single crystals, while $Mg_2$(dobdc) and $Mn_2$(dobdc) form as polycrystalline particles or agglomerate into larger particles during synthesis. (C) Ethylene adsorption isotherms and their corresponding dual-site Langmuir fits (black lines) at 35° C. (D) Ethylene (circles) and ethane (triangles) adsorption isotherms at 35° C. for the neat 6FDA-DAM polymer and a film loaded with 25 wt % $Ni_2$(dobdc).
Figure 14B:
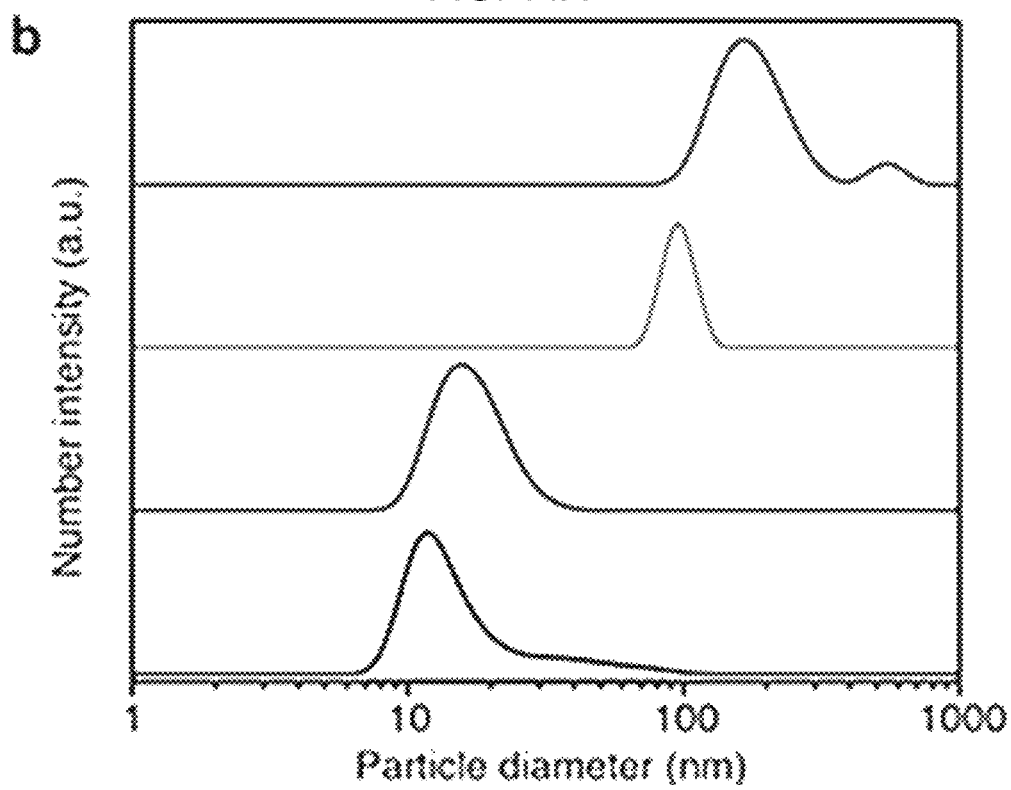
Figure 14C:
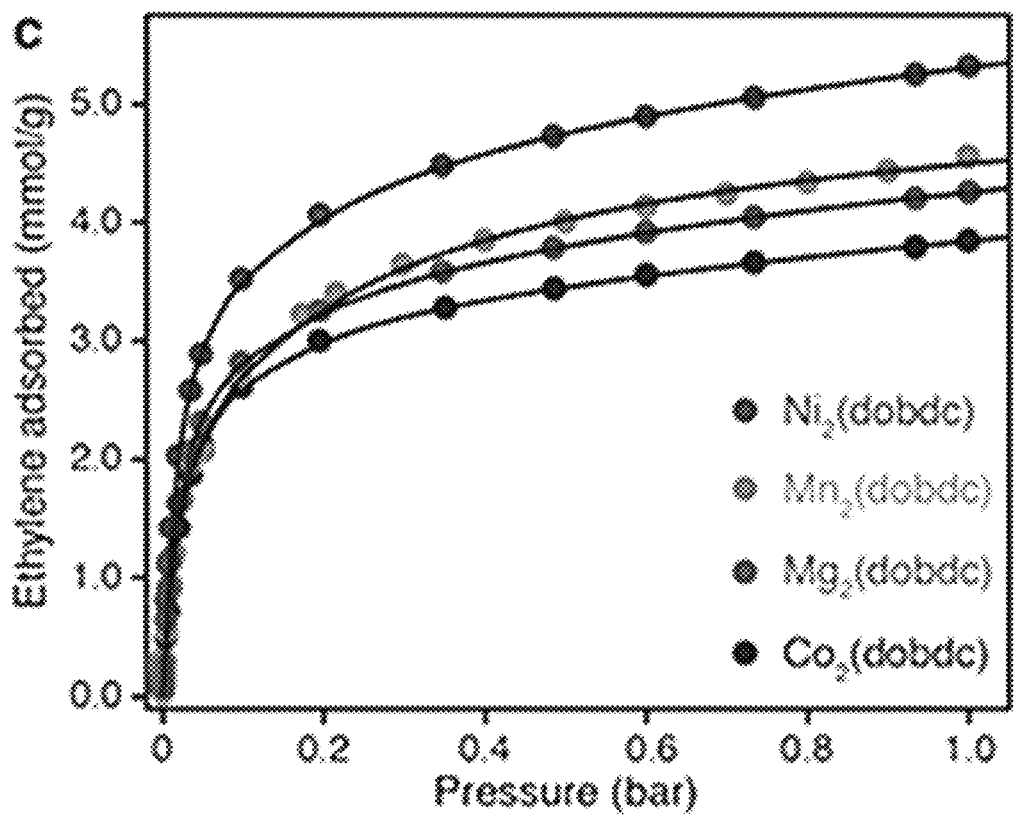

To achieve an intimate dispersion and test their influence on ethylene/ethane separation performance in polymer composites, a series of $M_2$(dobdc) (M=Mg, Mn, Co, Ni) nanocrystals were synthesized. As measured by dynamic light scattering, the mean particle sizes for $Co_2$(dobdc) and $Ni_2$(dobdc) were found to be 17±3 and 18±5 nm, respectively, while $Mn_2$(dobdc) and $Mg_2$(dobdc) tended to form much larger nanoparticles of 100±20 and 200±50 nm, respectively. From a practical point of view, polymer membranes that are currently used in industry are very thin (~100 nm), so dispersed particles in these films would need to be smaller than the thickness of the films. Indeed, for such nanocrystal/polymer composites to maintain processability, particles with dimensions much less than 100 nm would likely be required, which is the case for $Ni_2$(dobdc) and $Co_2$(dobdc). Although these are significantly smaller crystallites than their solvothermally synthesized counterparts, and thus have a greater ratio of external particle surface area relative to internal pore area, they retain a high ethylene adsorption capacity (see FIG. 14C) as well as ethylene/ethane selectivity (see FIG. 15). For the polymer phase of the membrane, we chose a high-performance polyimide, 6FDA-DAM (6FDA=4,4'-(hexaflouroisopropylidene)diphthalic anhydride; DAM=2,4,6-trimethyl-1,3-phenylenediamine), which has been identified as a promising material for olefin/paraffin separations based on a high olefin permeability and a high olefin/paraffin selectivity that place it near the predicted upper-bound for a pure polymer membrane. The permeabilities of M2(dobdc)/6FDA-DAM mixed-matrix membranes for ethylene and ethane are presented in Table 8.

TABLE 8

Low pressure ethylene and ethane permeabilities in $M_2$(dobdc)/6FDA-DAM mixed-matrix membranes.

| $M_2$(dobdc) in 6FDA-DAM | Loading (wt %) | $C_2H_4$ Permeability (barrer) | $C_2H_6$ Permeability (barrer) | $C_2H_4/C_2H_6$ Selectivity |
|---|---|---|---|---|
| Neat 6FDA-DAM | — | 65 (1) | 24 (1) | 2.7 (0.1) |
| $Mg_2$(dobdc) | 23 | 1140 (25) | 431 (9) | 2.6 (0.1) |
| $Mn_2$(dobdc) | 13 | 433 (7) | 188 (3) | 2.3 (0.1) |
| $Co_2$(dobdc) | 10 | 141 (3) | 36 (1) | 3.9 (0.1) |
| $Co_2$(dobdc) | 33 | 170 (6) | 35 (1) | 4.9 (0.2) |
| $Ni_2$(dobdc) | 12 | 215 (4) | 55 (1) | 4.0 (0.1) |
| $Ni_2$(dobdc) | 25 | 345 (6) | 75 (1) | 4.6 (0.1) |

Gas Sorption Characteristics of the Membranes.

Figure 14D:
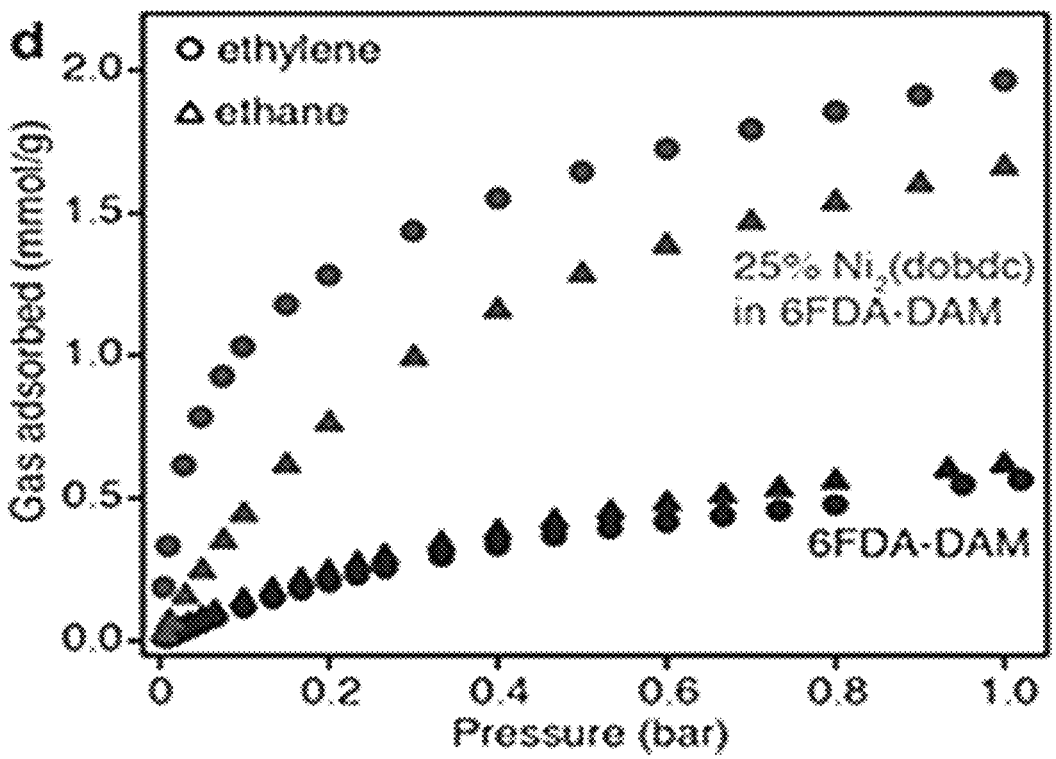
Figure 26A:
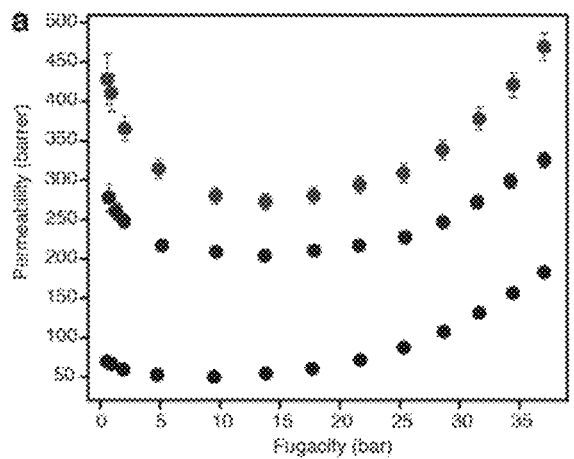
FIG. 26A-B provides $C_2H_4$ Fugacity-Based Permeability isotherms for (A, B) 6FDA-DAM and $M_2(dobdc)$.
Figure 26B:
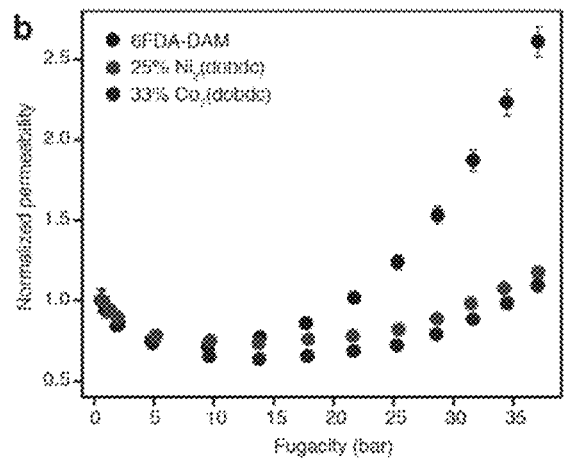

For each nanocrystal type studied, the amount of gas adsorbed in the composite film corresponds to the weighted average between the neat polyimide and the pure nanocrystals, indicating that the exposed metal cations of $M_2$(dobdc) are fully accessible to ethylene and ethane (see FIG. 26). Gas adsorption experiments performed on neat 6FDA-DAM compared to 6FDA-DAM loaded with 25 wt % $Ni_2$(dobdc) revealed that the presence of $Ni_2$(dobdc) dramatically increases the amount of both ethylene and ethane adsorbed, while also introducing a marked adsorption selectivity for ethylene (see FIG. 14D). Overall, the adsorption isotherms indicate that, in equilibrium with the upstream pressure, a higher concentration of gas is dissolved in the film for the $M_2$(dobdc)/6FDA-DAM membranes relative to the neat polymer. At the downstream face of the film, no gas is dissolved within the film as it is in equilibrium with vacuum, regardless of the adsorption isotherm of the membrane. This causes a steeper concentration gradient within $M_2$(dobdc)/6FDA-DAM membranes, and thus a greater driving force for transport and higher permeabilities. If the gas penetrating through the membrane were immobilized in the adsorbed phase within the nanocrystals, then the measured transport properties would instead be dominated by the polymer phase. Indeed, an enhanced adsorption combined with increased permeabilities would only be expected if diffusion through the pores of the $M_2$(dobdc) nanocrystals is fast relative to diffusion through the polymer. The increased permeation rates for ethylene and ethane therefore indicate that the adsorbed phase is mobile, and that gases transport rapidly between the nanocrystal and polymer phases.

Figure 8:
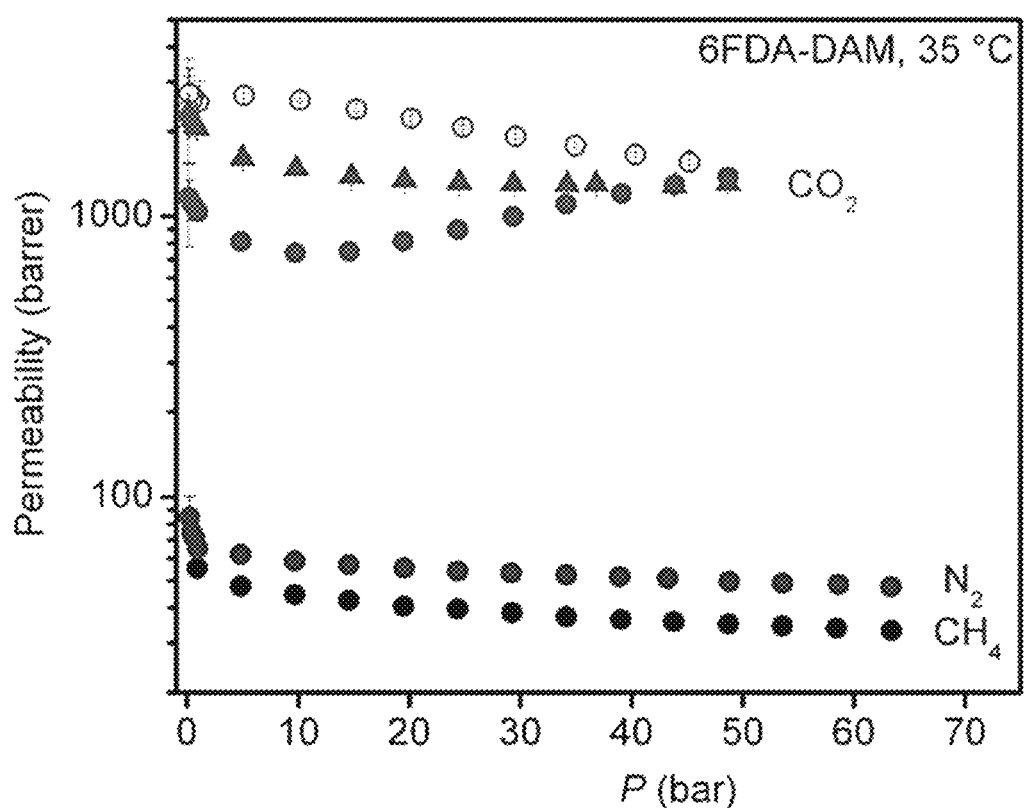
FIG. 8 presents the permeability isotherms of $CH_4$, $N_2$ and $CO_2$ in neat 6FDA-DAM. For $N_2$ and $CH_4$, hold times were six time lags. For CO2, closed circles are the first pressurization response with a hold time of 3 minutes, open circles are depressurization with a hold time of three minutes, and closed triangles are the second pressurization with a hold time of three minutes.
Figure 9:
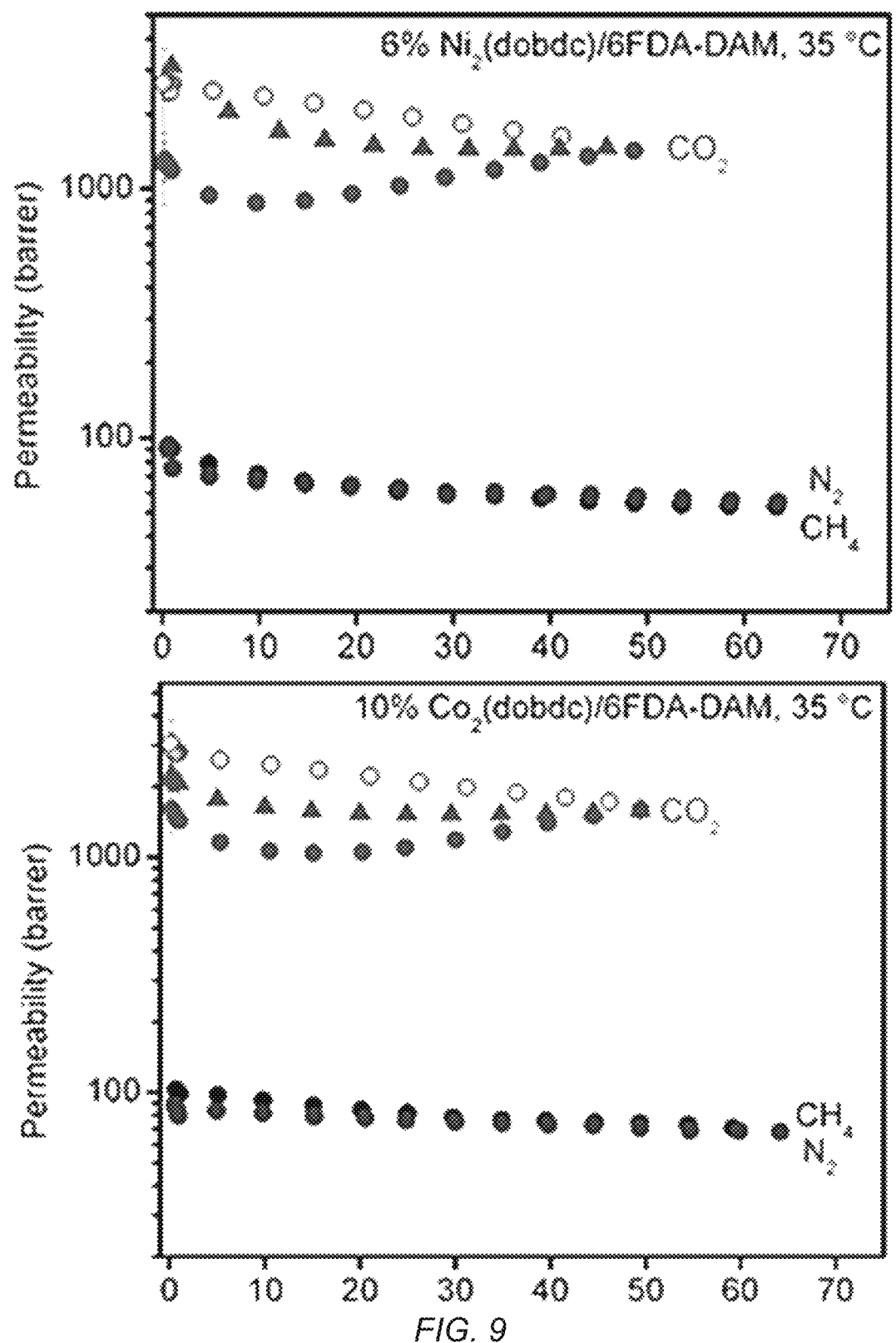
FIG. 9 presents permeability isotherms of $CH_4$ (black), $N_2$ (blue) and $CO_2$ (green) in $M_2$(dobdc)/6FDA-DAM mixed-matrix membranes at 35° C. For $CO_2$, closed circles are the first pressurization response with a hold time of 3 minutes, open circles are depressurization with a hold time of three minutes, and closed triangles are the second pressurization with a hold time of three minutes.
Figure 9:
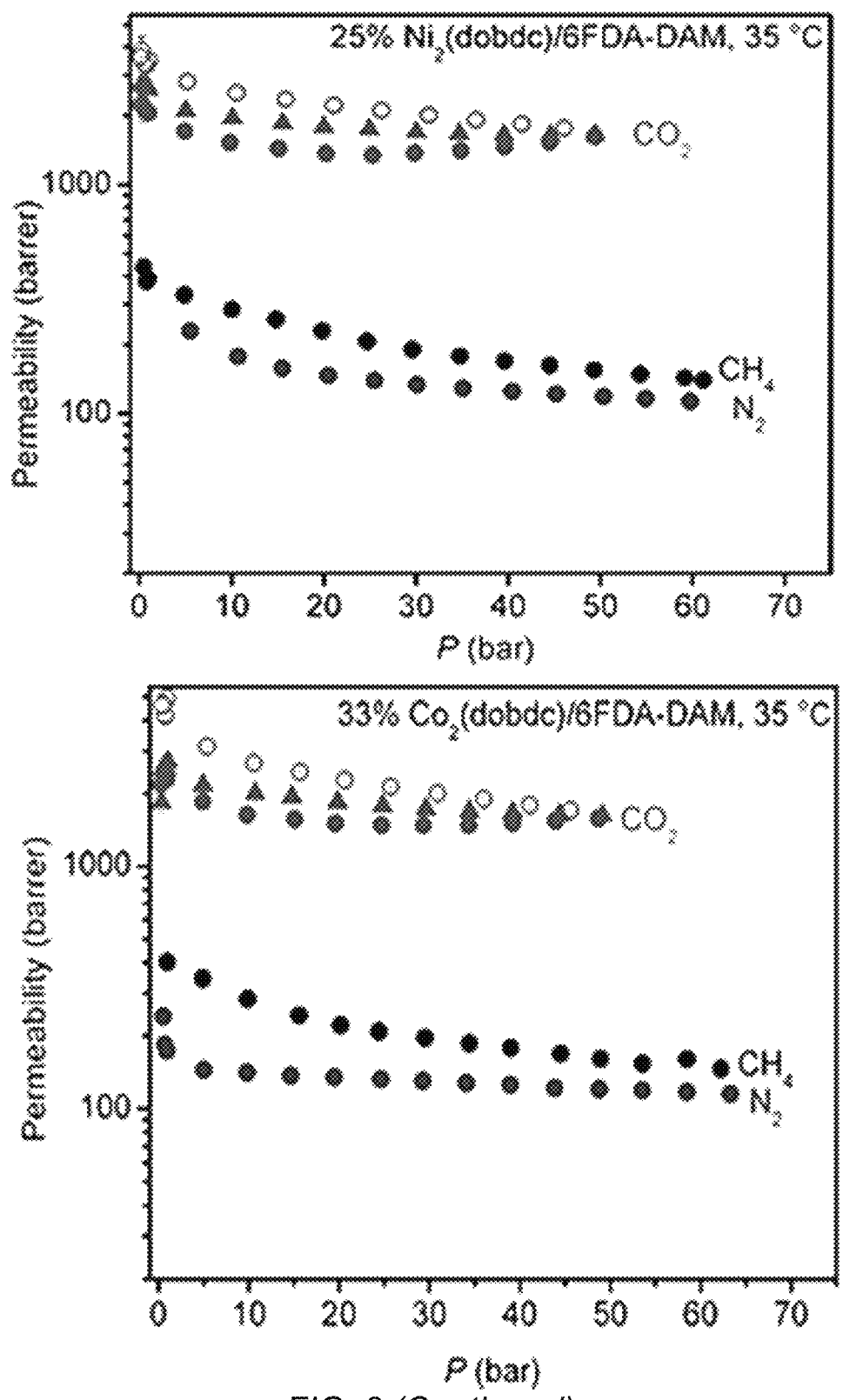
Figure 10:
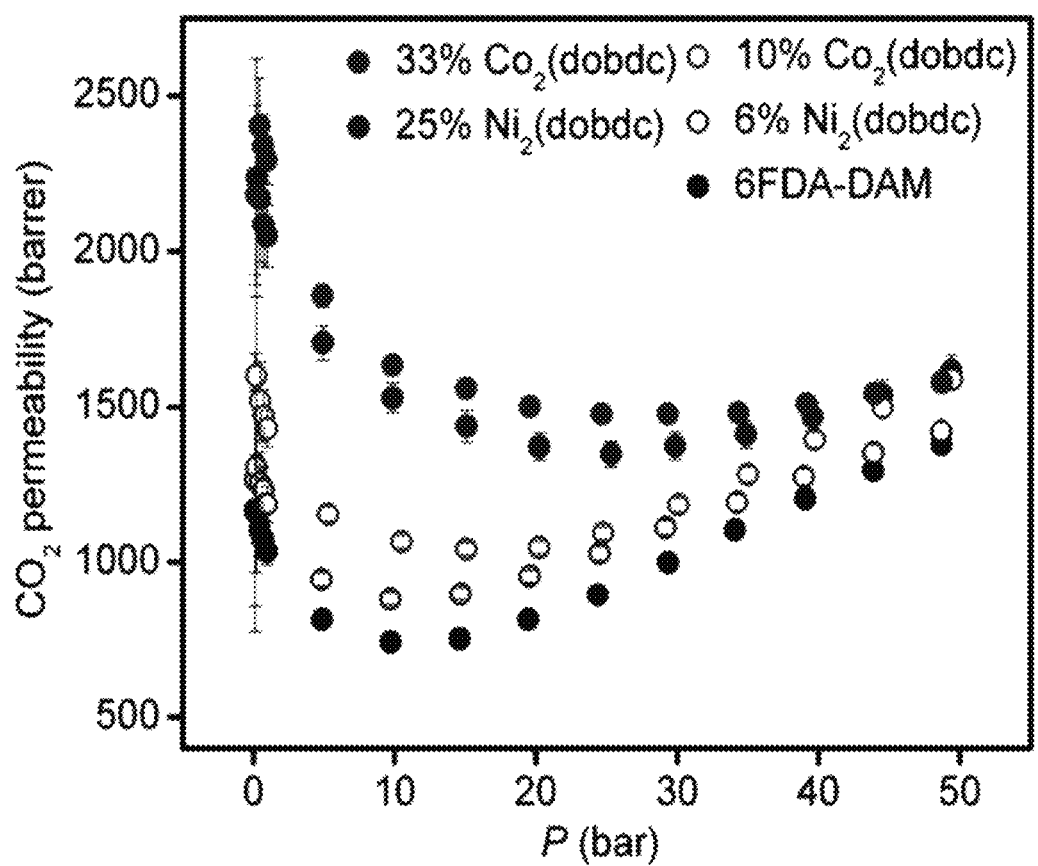
FIG. 10 presents the first pressurization permeability isotherms for $CO_2$ in $M_2$(dobdc)/6FDA-DAM and neat 6FDA-DAM at 35° C.
Figure 11:
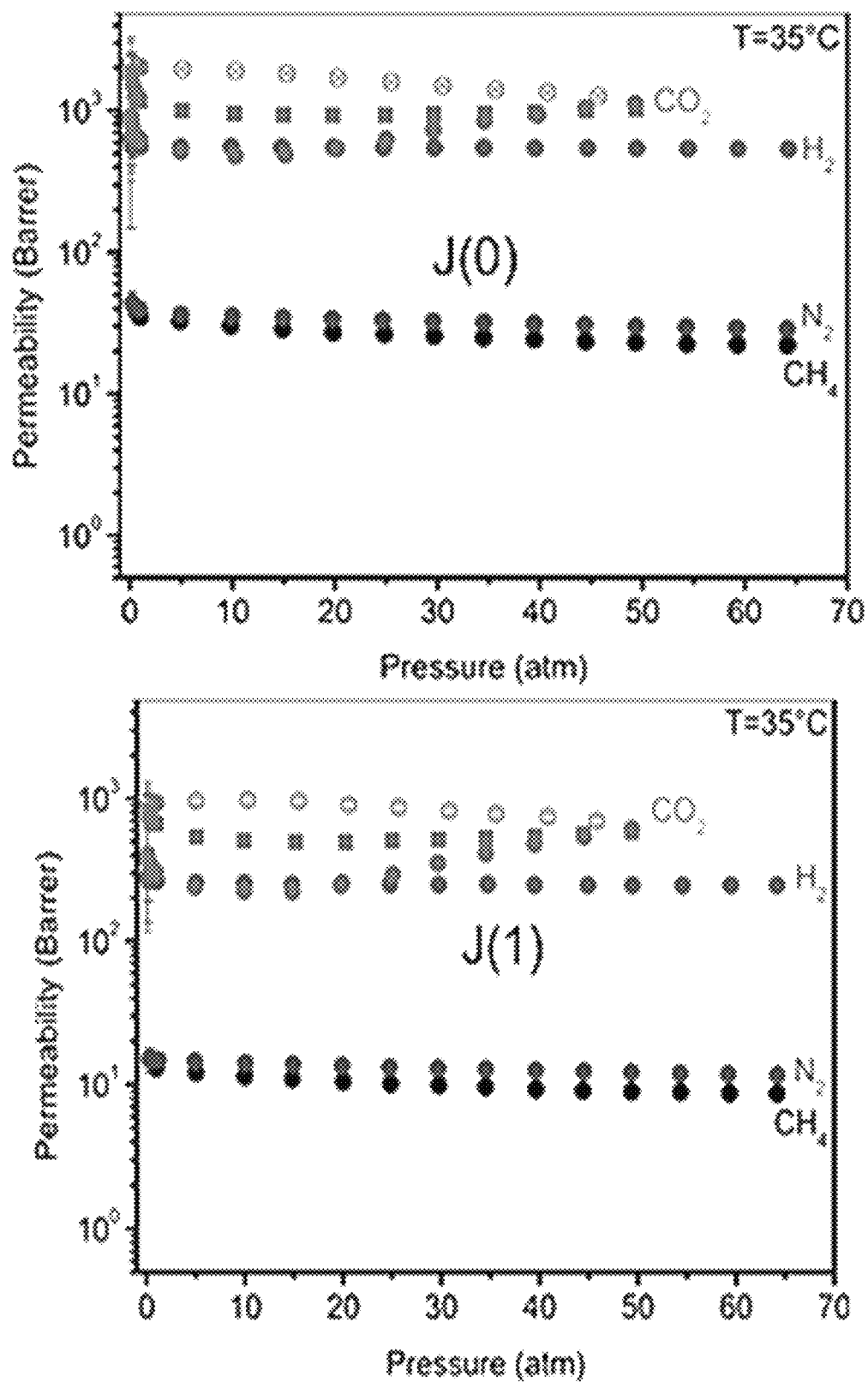
FIG. 11 presents the permeability isotherms of $CH_4$, $N_2$ and $CO_2$ in various neat copolymers of 6FDA-Durene: Jeffamine at 35° C. For $N_2$ and $CH_4$, hold times were six time lags. For $CO_2$, closed circles are the first pressurization response, open circles are depressurization, and closed triangles are the second pressurization.
Figure 11:
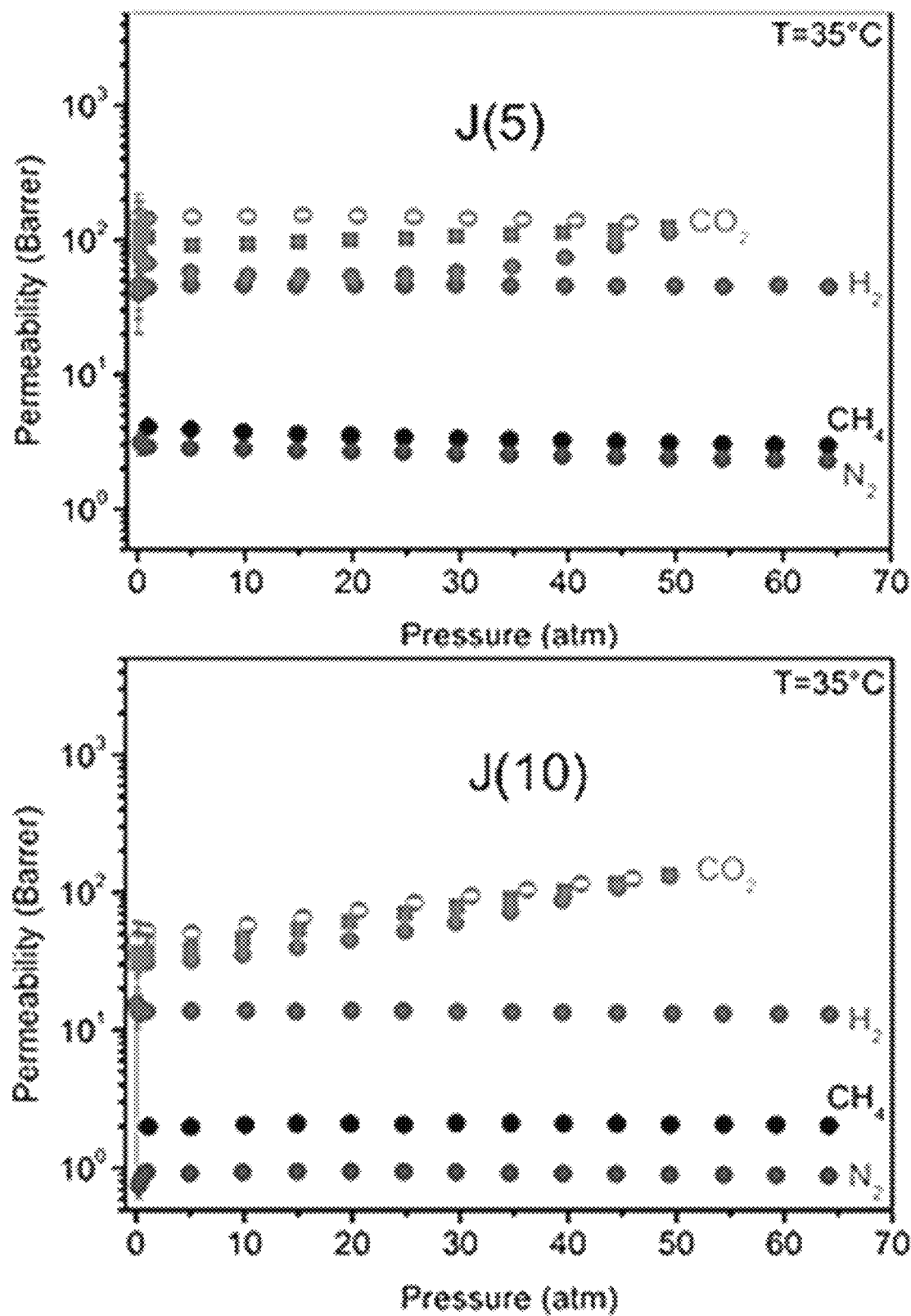
Figure 12:
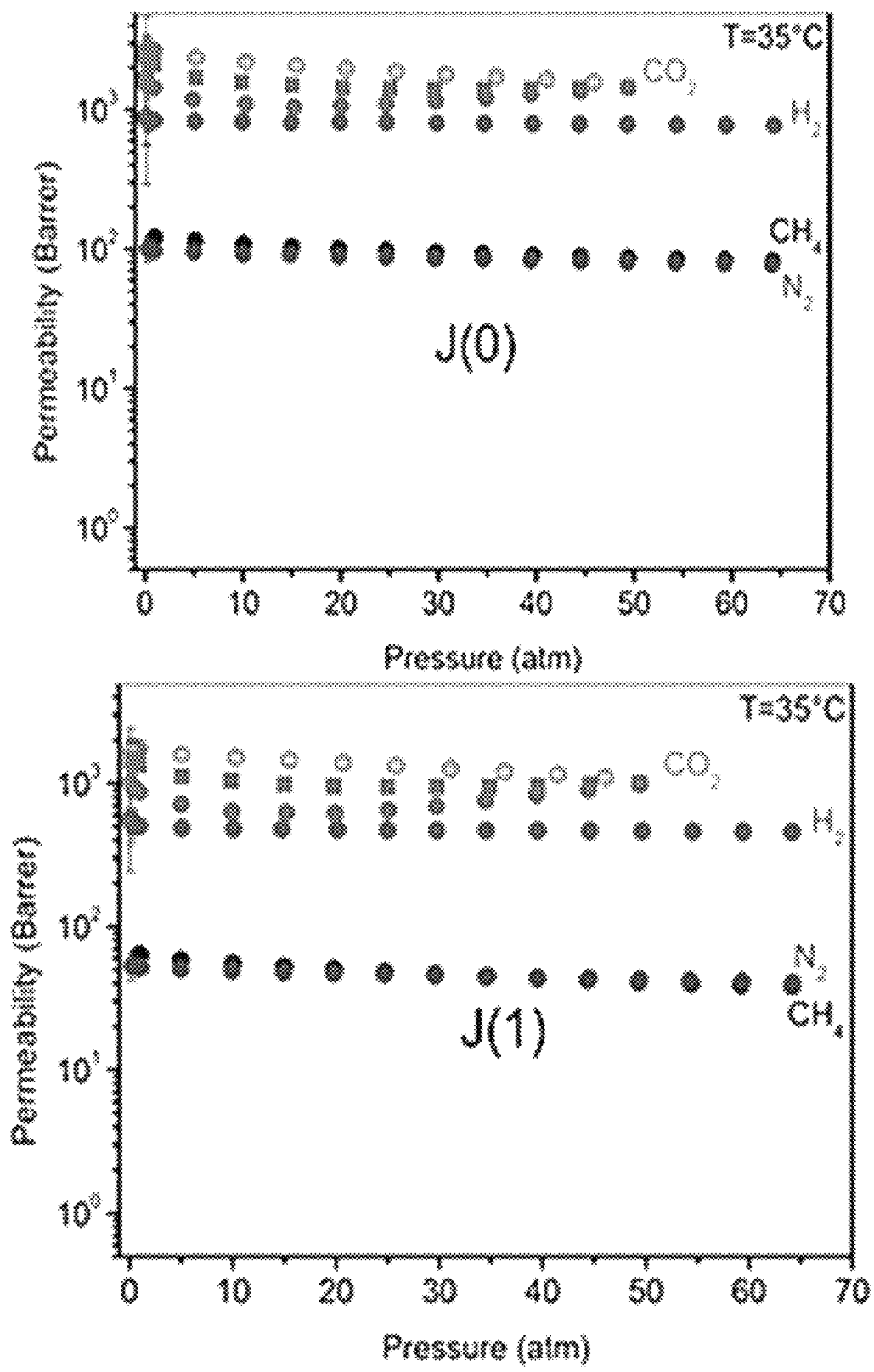
FIG. 12 presents permeability isotherms of $CH_4$, $N_2$ and $CO_2$ in various copolymers of approximately 20% $_{Mg2}$ (dobdc)/6FDA-Durene:Jeffamine at 35° C. For $N_2$ and $CH_4$, hold times were six time lags. For $CO_2$, closed circles are the first pressurization response, open circles are depressurization, and closed triangles are the second pressurization.
Figure 12:
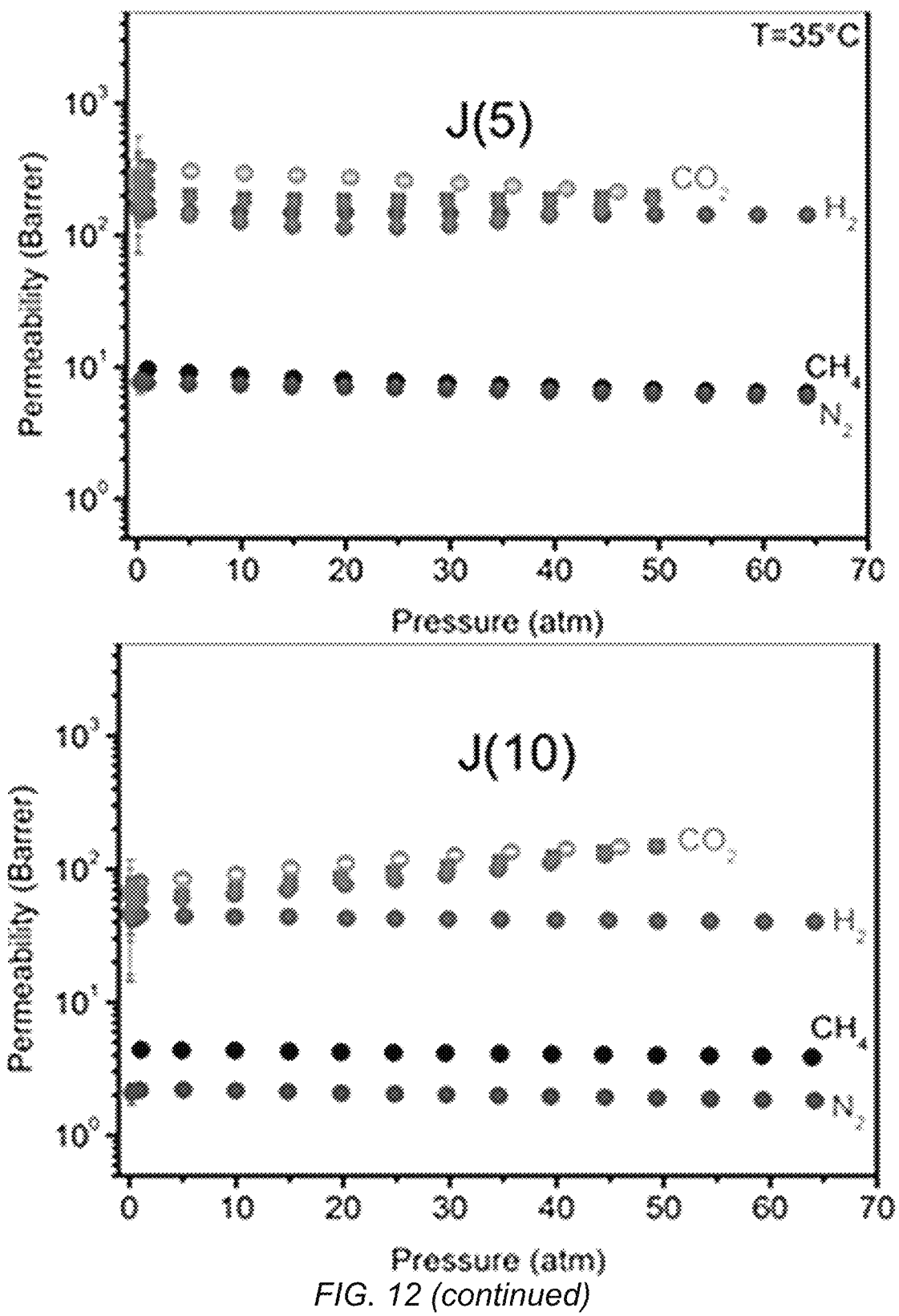

Importantly, there is a reduction in plasticization response during pure gas and mixed-gas permeation. The pure gas permeability isotherms were measured for various $M_2$(dobdc)/6FDA-DAM membranes (see FIGS. 8 and 9). Since $CO_2$ permeability in these systems is fast, time lags could not be detected. So, in order to account for the transience of the plasticization process, $CO_2$ permeation was allowed to continue for three minutes at each pressure step. FIG. 10 shows the $CO_2$ plasticization response for these membranes. There is a large increase in $CO_2$ permeability upon increasing M2(dobdc) loading, and also the plasticization pressure point in each curve shifts to higher pressures. This shift in plasticization pressures suggests that crosslinking induced by $M_2$(dobdc)/polymer interactions reduces plasticization. Consistent with Soxhlet extractions, the permeability-plasticization curves for 6FDA-Durene:Jeffamine J(10) (see FIG. 11) are unchanged upon incorporation of Mg2(dobdc) (see FIG. 12).

Figure 13:
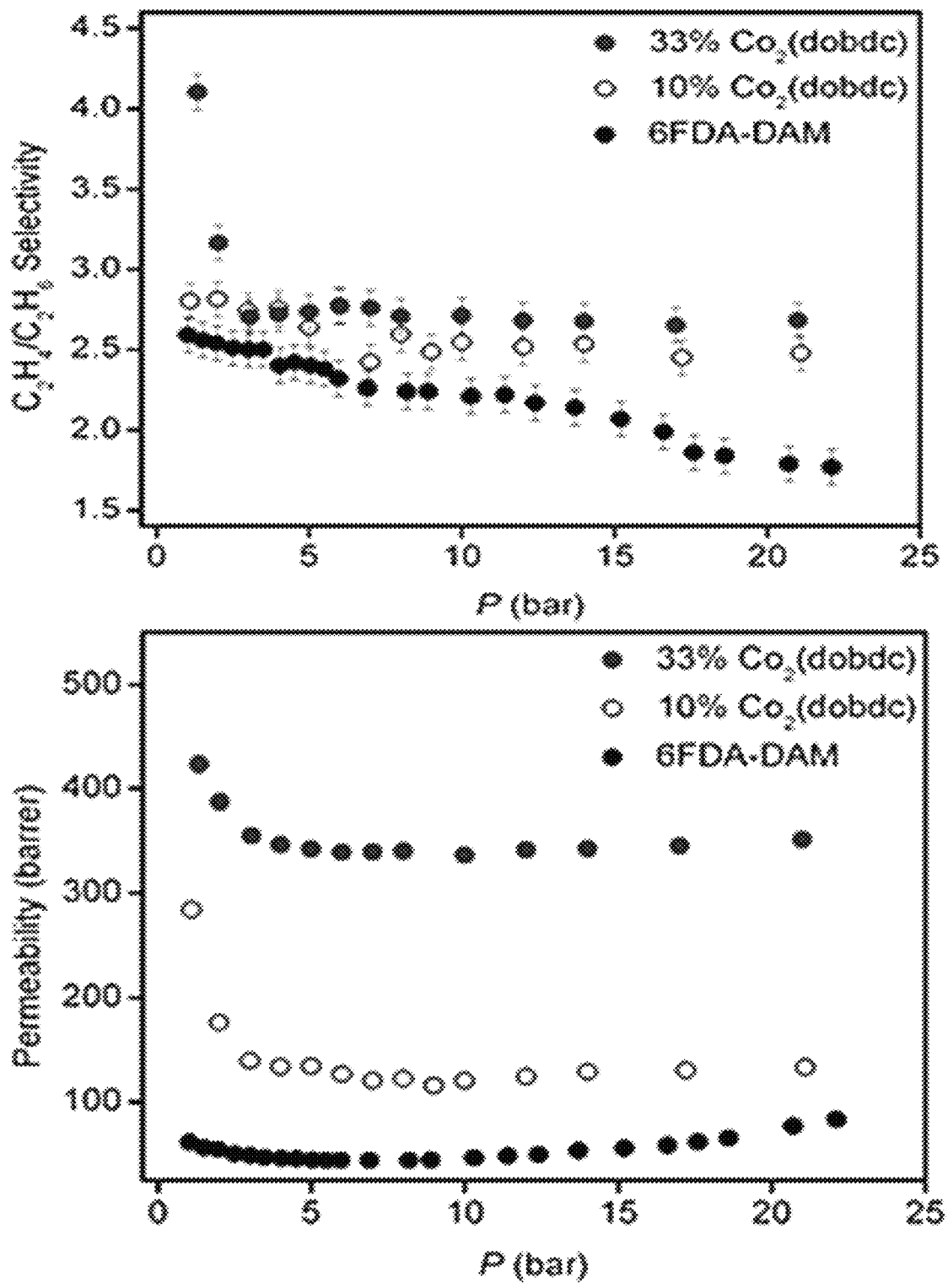
FIG. 13 presents selectivity (left) and permeability (right) isotherms for a 50:50 ethylene/ethane mixture in $Co_2$ (dobdc)/6FDA-DAM mixed-matrix membranes and neat 6FDA-DAM. Permeabilities determined by the constant volume method1 and selectivities from gas chromatography.

Finally, high-pressure binary feeds that are more directly comparable to real process conditions show the applicability of MOF crosslinking to reduce plasticization response. A binary mixture of $C_2H_4$ and $C_2H_6$ was flowed over the membrane at various feed pressures, and the permeate was analyzed with a gas chromatogram. From these experiments, the minimum in the pressure-permeability curve moved to higher pressures with increasing $Co_2$(dobdc) loading. Furthermore, permeability increased with $Co_2$(dobdc) incorporation, and the mixed-gas selectivity was retained over the full pressure range, up to 22 bar feed (see FIG. 13).

Single-Component Ethylene and Ethane Permeation Measurements with Membranes.

Figure 15A:
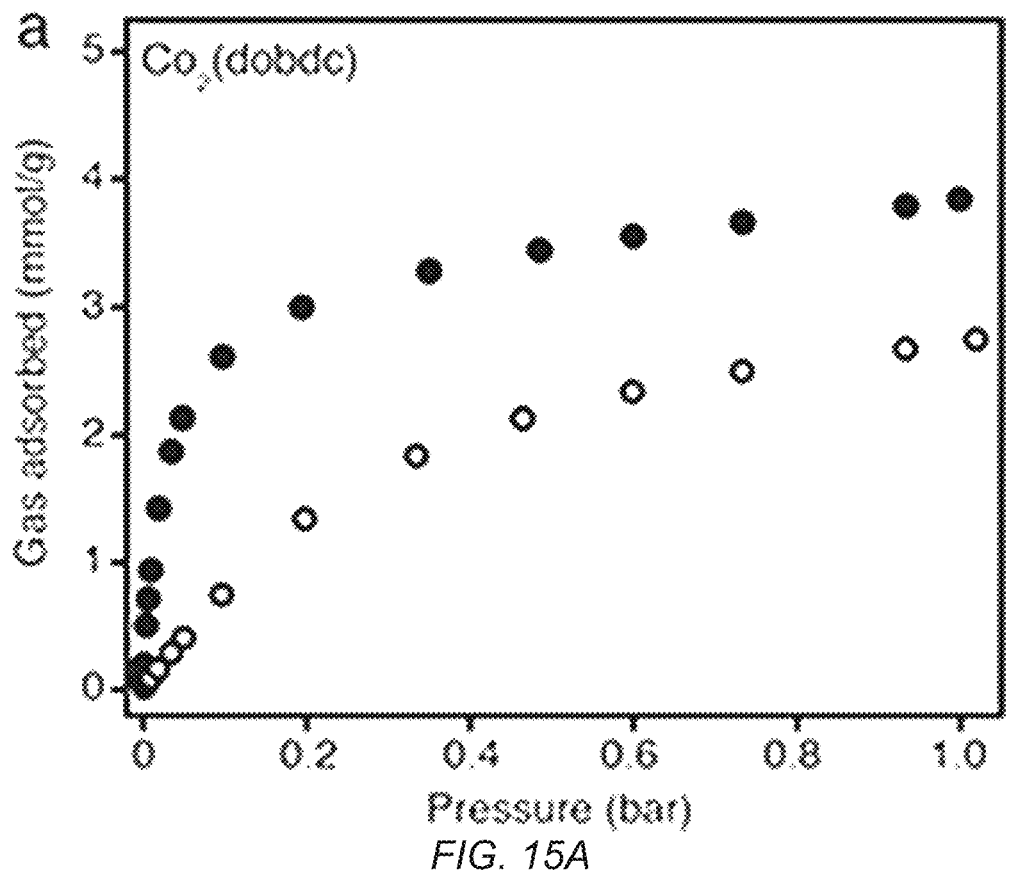
FIG. 15A-E presents ethylene and ethane isotherms for $M_2$(dobdc). Ethylene (closed circles) and ethane (open circles) isotherms for (A) $Co_2$(dobdc), (B) $Ni_2$(dobdc), (C) $Mg_2$(dobdc), and (D) $Mn_2$(dobdc) nanoparticles. Black lines represent dual-site Langmuir fits, which are given in Table 8. Similar adsorption isotherms compared to that of the bulk $M_2$(dobdc) confirms the quality of the nanocrystalline counterpart. (E) Ideal adsorbed solution theory (IAST) calculations of selectivity for ethylene/ethane at various feed compositions, a total pressure of 1 bar and temperature of 35° C.

Single-component ethylene and ethane permeation measurements were performed on a neat 6FDA-DAM membrane, as well as on $M_2$(dobdc)/6FDA-DAM composites with different $M_2$(dobdc) loadings (see FIG. 15A). In particular, incorporating $Ni_2$(dobdc) or $Co_2$(dobdc) into 6FDA-DAM significantly improves the gas separation performance. With 25 wt % $Ni_2$(dobdc) and 33 wt % $Co_2$(dobdc), selectivities for ethylene over ethane nearly doubled, increasing from 2.7 for the pure polymer to 4.6 and 5.0, respectively, while ethylene permeabilities improved by factors of 2.6 and 5.3, respectively. By applying results from equilibrium gas adsorption isotherms and permeation measurements, the relevant solubility and diffusivity parameters were obtained using the solution-diffusion model. It was found that the solubility and solubility-based selectivity is greatly increased from 0.86 in 6FDA-DAM to 1.32 in 25 wt % $Ni_2$(dobdc), while the diffusivity of ethylene is also increased without losses in diffusive selectivity (see Table 4). Indeed, this places these membranes well above the polymer upper-bound for ethylene/ethane, a particularly challenging membrane separation. Such increases in selectivity and permeability would translate to higher purity olefins produced using less membrane area, pushing membrane technology closer to commercial applicability. In contrast, $Mg_2$(dobdc) and $Mn_2$(dobdc) did not show improvements in ethylene/ethane selectivity. Instead, there were large increases in both ethylene and ethane permeabilities, leading to slight decreases in selectivity. As the ethylene adsorptive capacity and ethylene/ethane adsorptive selectivities among all frameworks are similar, this result suggests that the smaller particle sizes, and accompanying higher external surface areas, for $Ni_2$(dobdc) and $Co_2$(dobdc) lead to a greater fraction of the polymer at the nanocrystal interface, thereby minimizing the number of non-selective pathways for gas transport. For illustration, at a given volume fraction, the $Co_2$(dobdc) nanocrystals afford nearly 12 times the external surface area of the $Mg_2$(dobdc) nanocrystal aggregates. Despite attempts to synthesize smaller $Mg_2$(dobdc) and $Mn_2$(dobdc) nanocrystals, these frameworks were always found to agglomerate during synthesis.

Figure 15B:
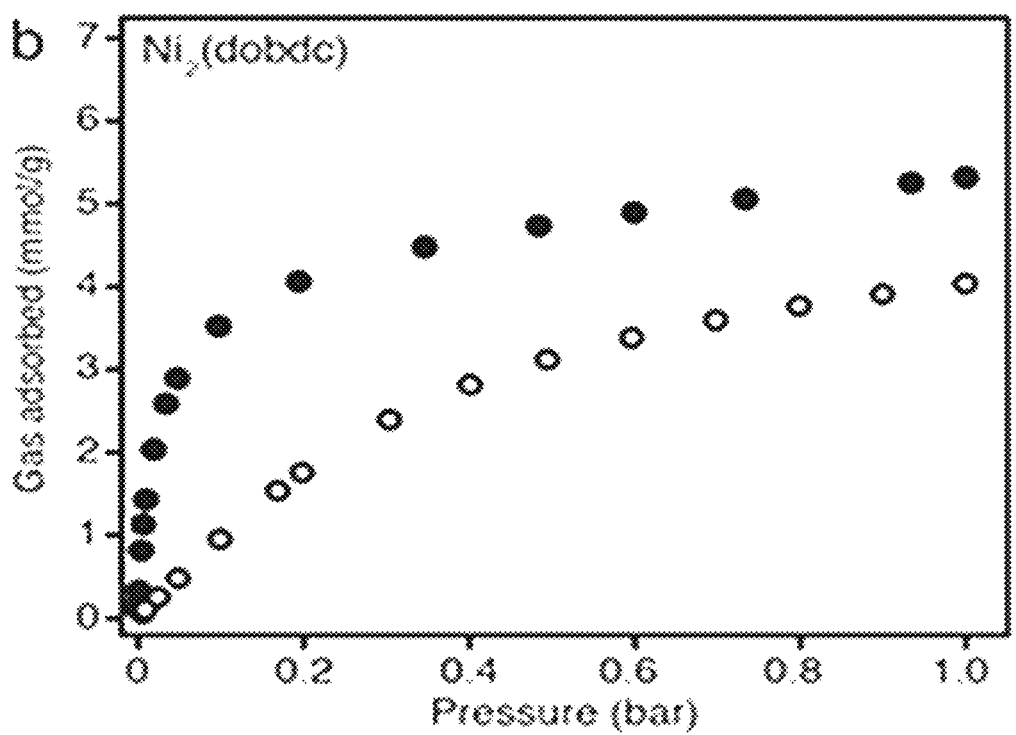
Figure 15C:
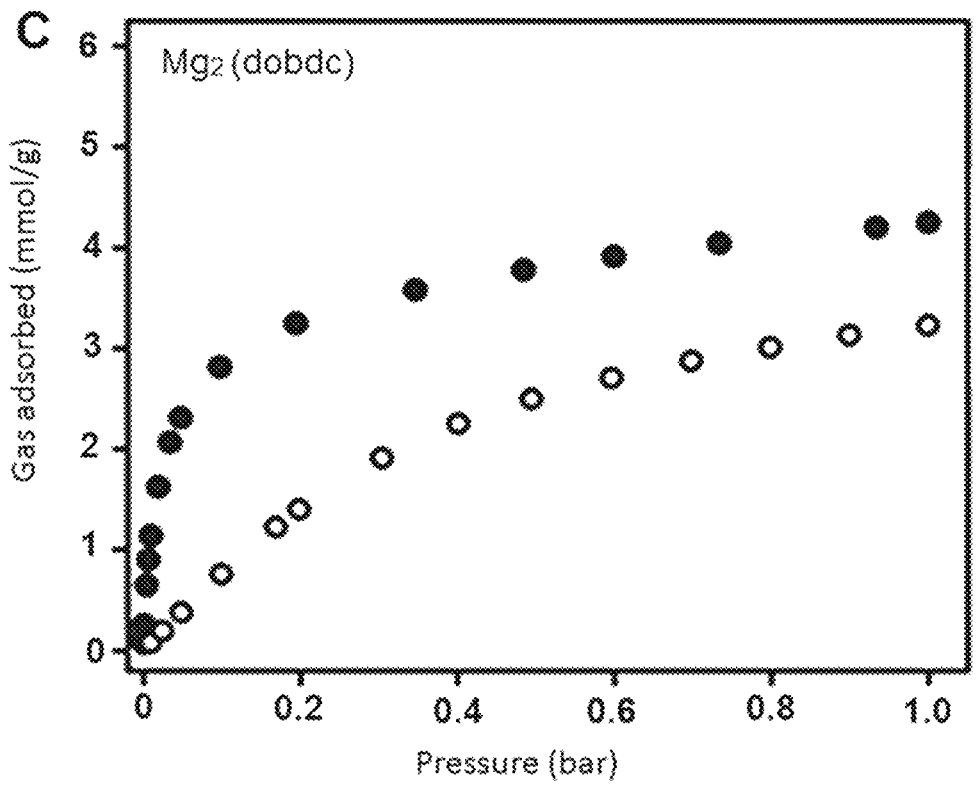
Figure 15D:
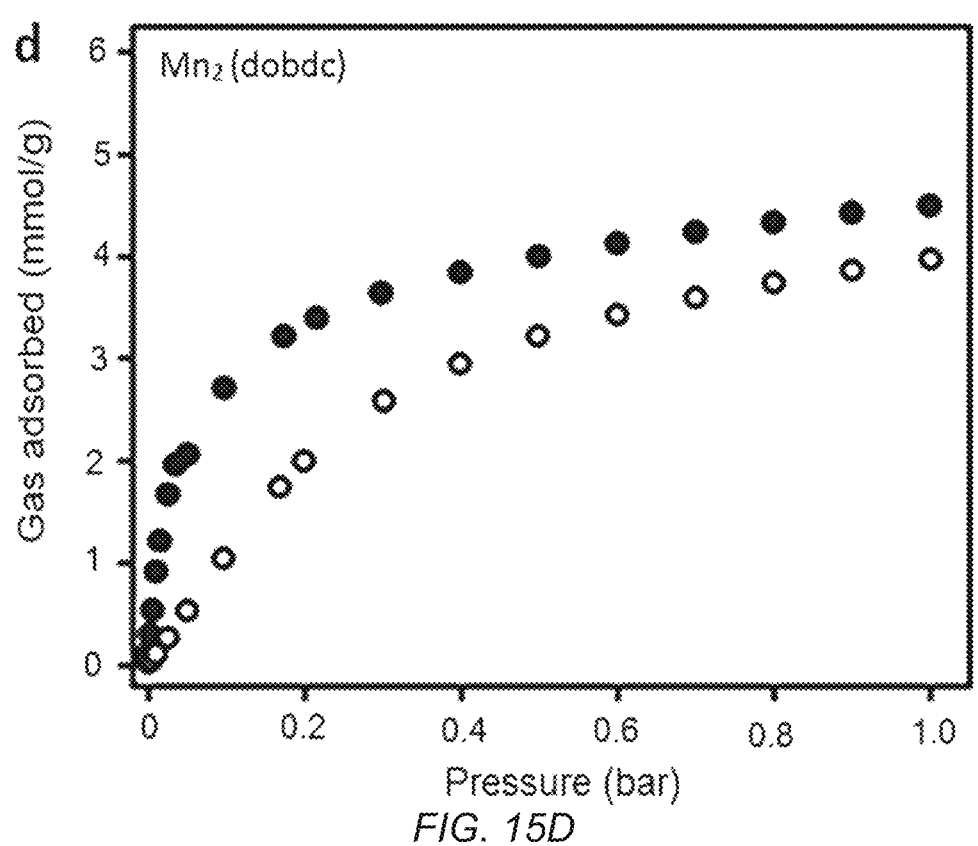
Figure 15E:
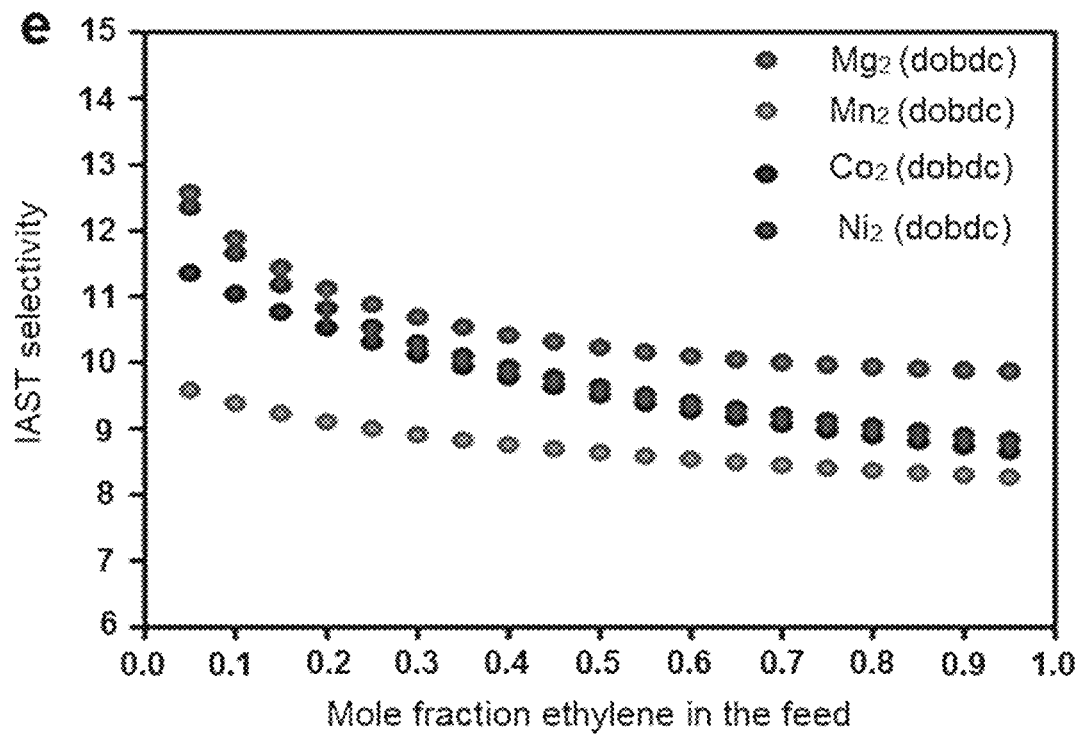
Figure 16:
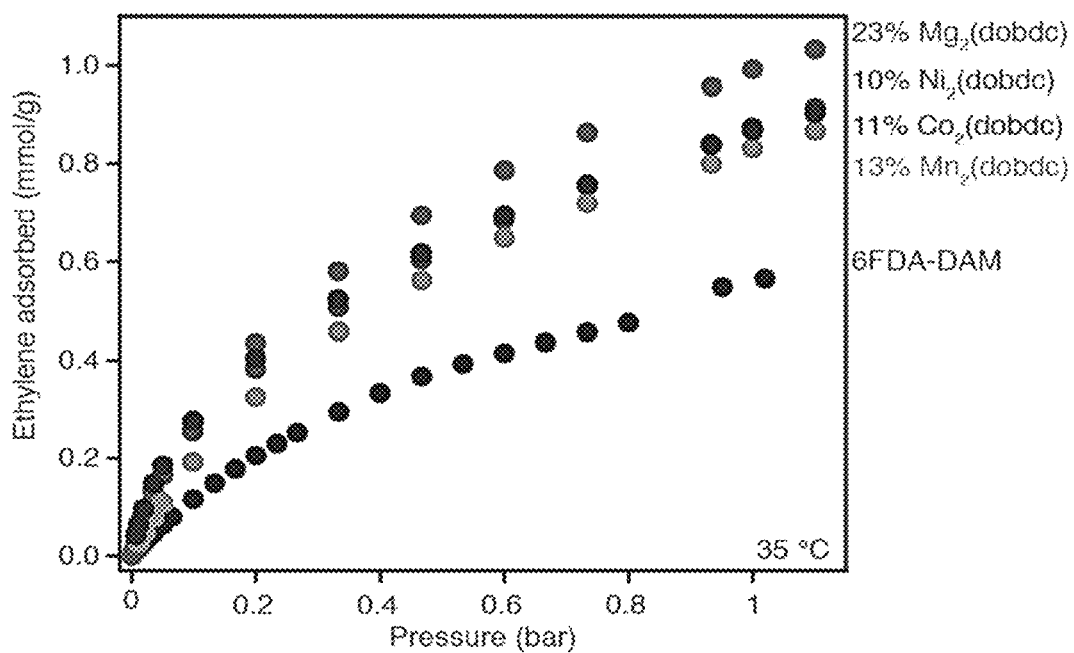
FIG. 16 presents equilibrium adsorption isotherms of ethylene in 6FDA-DAM and $M_2$(dobdc)/6FDA-DAN mixed matrix membranes at 35° C. Loadings correspond to the weight fraction of $M_2$(dobdc) within the polymer.
Figure 17A:
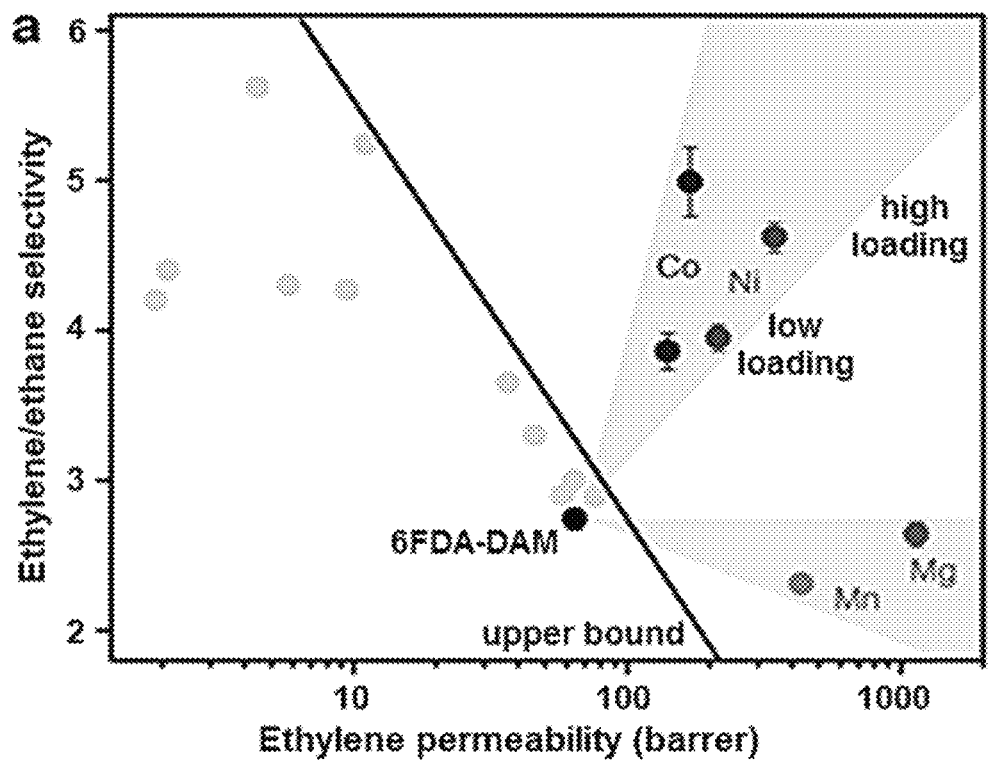
FIG. 17A-B demonstrates ethylene/ethane separation performance for $M_2$(dobdc)/6FDA-DAN membranes. (A) Membrane performance relative to the upper bound for polymers. Membrane loadings by weight are 10% and 33% for $Co_2$(dobdc), 6% and 25% for $Ni_2$(dobdc), 23% for $Mg_2$(dobdc), and 13% for $Mn_2$(dobdc). (B) Transmission electron micrographs of 33% $Co_2$(dobdc) (top) and 23% $Mg_2$(dobdc) (bottom) membrane cross-sections and corresponding illustrations of the proposed gas transport mechanisms, where purple hexagons represent $Co_2$(dobdc) or $Ni_2$(dobdc) nanocrystals and red hexagons represent $Mg_2$(dobdc) or $Mn_2$(dobdc) nanocrystals.
Figure 17B:
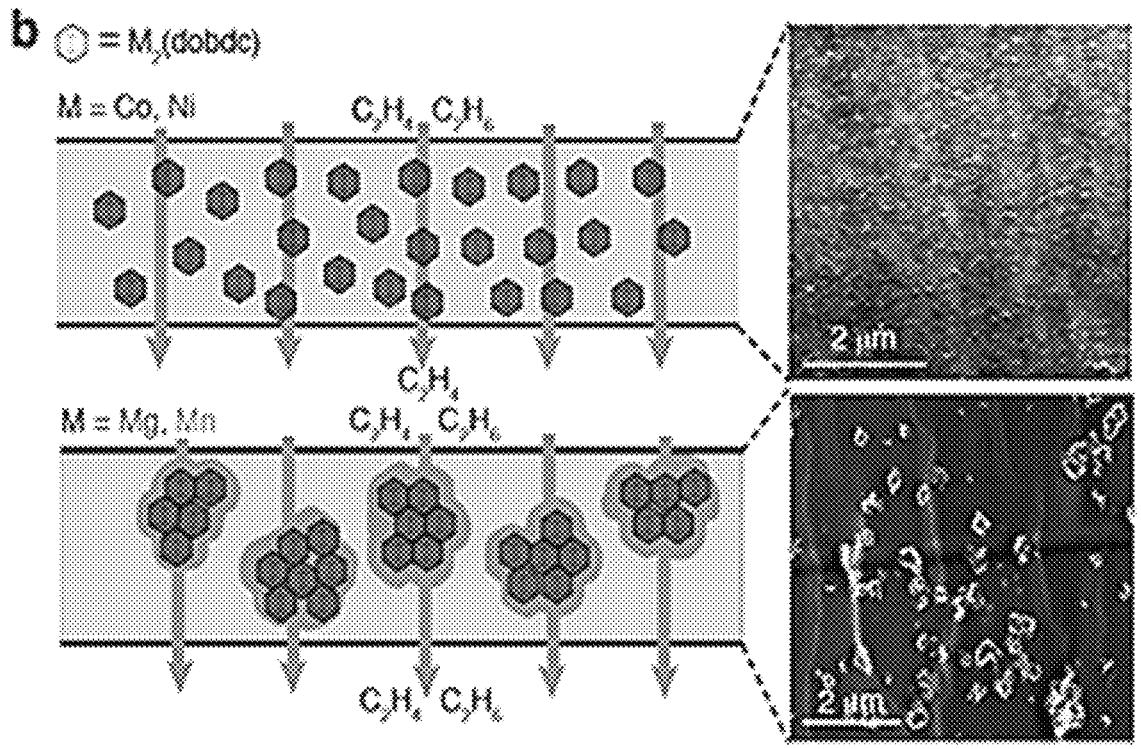
Figure 18:
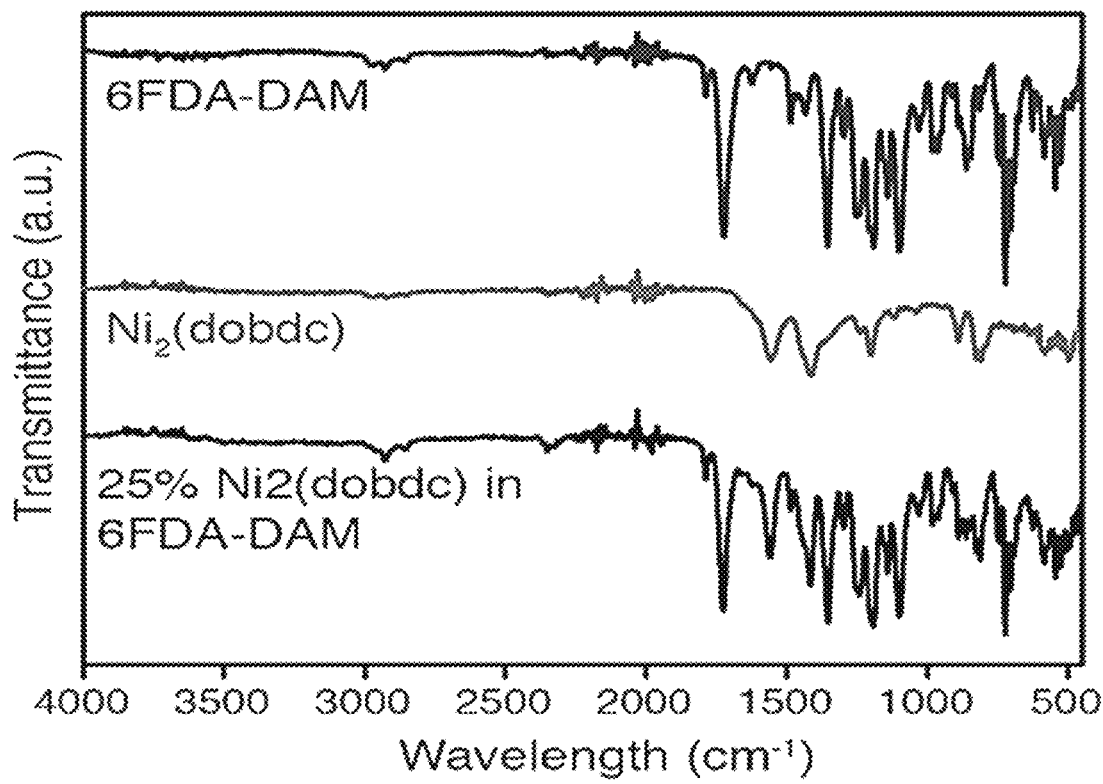
FIG. 18 provides infrared spectra for neat 6FDA-DAM (top), $Ni_2$(dobdc) (middle), and 25 wt % $Ni_2$(dobdc) in 6FDA-DAM (bottom).

The differences between these two types of composite membranes are illustrated in FIG. 15B. From the cross-sectional view of the membrane, the $Ni_2$(dobdc) and $Co_2$(dobdc) nanocrystals are well dispersed. Conversely, $Mg_2$(dobdc) and $Mn_2$(dobdc) crystals do not interact as strongly with the polymer, resulting in larger interfacial gaps that contribute to non-selective gas transport. Scanning and transmission electron microscopy images (see FIG. 5) support these depictions, revealing large agglomerations and interfacial gaps for the $Mg_2$(dobdc) and $Mn_2$(dobdc) membranes, whereas the film cross-sections are smooth and gaps are not apparent for the $Co_2$(dobdc) and $Ni_2$(dobdc) membranes. These results imply that the external surface functionality of the $M_2$(dobdc) nanocrystals plays a crucial role in their interactions with the polymer. Importantly, the nanocrystals necessarily have exposed surface metal sites capable of directly binding the polymer, and, in accord with the Irving-Williams stability order, the strength of those interactions can be expected to increase along the series Mg<Mn<<Co<Ni. The precise nature of these nanocrystal-polymer interactions was not readily apparent by infrared spectroscopy (see FIG. 18), although this is perhaps not surprising, since the overall percentage of coordinated polymer units is expected to be small.

Membrane Dissolution Studies Probing Strength and Abundance of Interfacial Interactions.

Figure 19A:
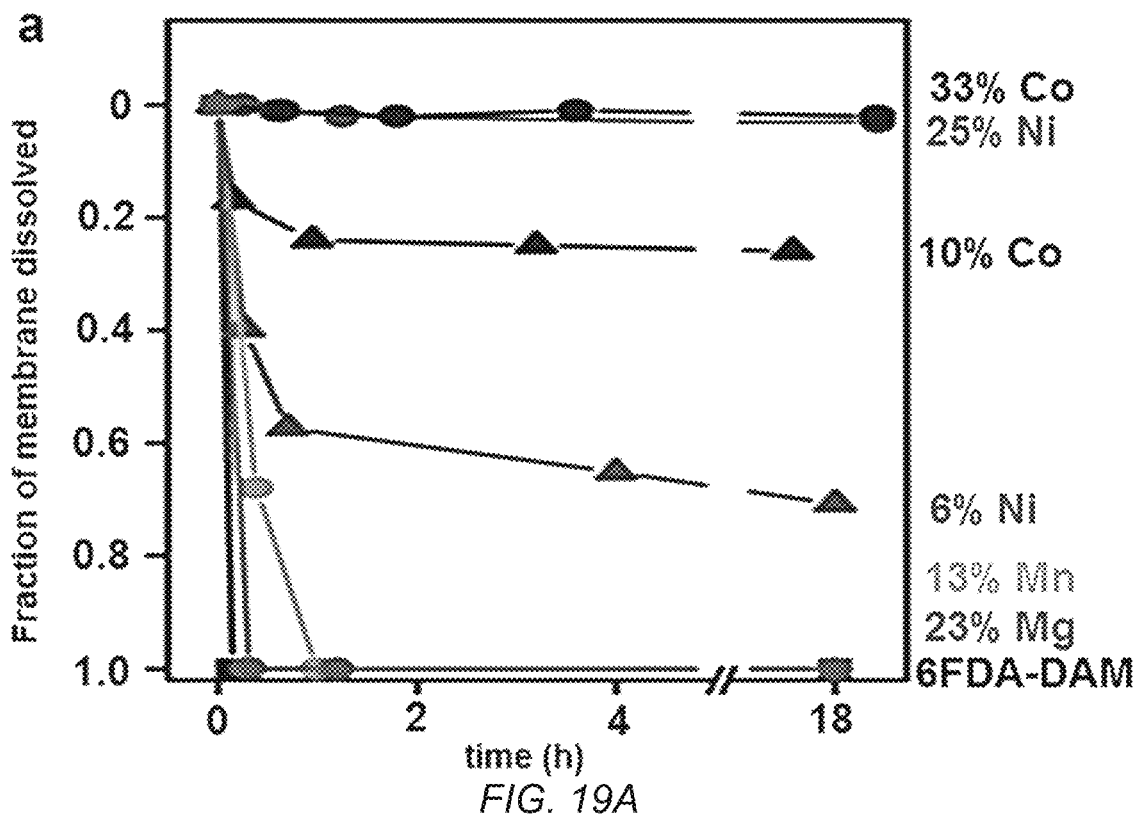
FIG. 19A-C demonstrates enhanced membrane stability leading to reduction in plasticization and high mixed-gas selectivities. (A) Quantification of membrane stability by Soxhlet extraction in refluxing dichloromethane. The fraction of membrane dissolved corresponds to the mass of membrane remaining after a given period of time in the extractor relative to the initial mass. (B) Illustration of the nanocrystal induced polymer rigidification, along with the structures of $M_2$(dobdc) and 6FDA-DAM. (C) Mixed-gas permeation data for a 50:50 $C_2H_4/C_2H_6$ mixture (top) and a 50:50 CO-2/$CH_4$ mixture (middle). Error bars correspond to propagation of uncertainty from the mass spectrometer calibration. Bottom, single component $C_2H_4$ permeabilities, normalized to the permeability measured at 0.75 bar. All permeabilities were collected at 35° C., and steady state permeation values were taken after six time-lags. The composition was sampled from permeate that accumulated after steady-state permeation was reached. Permeability and selectivity data corresponds to neat 6FDA-DAM (black squares), 25% $Ni_2$(dobdc)/6FDA-DAM (purple circles), and 33% $Co_2$(dobdc)/6FDA-DAM (navy circles).

Membrane dissolution studies were performed to probe directly the strength and abundance of these interfacial interactions. To quantify solubility, each membrane film was loaded into a Soxhlet extractor and exposed to dichloromethane heated at reflux for up to 18 h. The remaining mass, or gel fraction, of the film was then determined by drying the remaining film and measuring its weight (see FIG. 19A). The 6FDA-DAM polymer is fully soluble in dichloromethane during membrane casting, and, as expected, the neat polymer membrane readily dissolved back into its casting solvent. Similarly, films loaded with $Mg_2$(dobdc) or $Mn_2$(dobdc) also rapidly dissolved. However, membranes incorporating $Ni_2$(dobdc) or $Co_2$(dobdc) nanocrystals were found to be partially or completely insoluble under the same conditions. At the highest loadings of 33 and 25 wt %, respectively, no membrane dissolution was observed after 18 h, which implies that framework-polymer interactions are so abundant for $Co_2$(dobdc) and $Ni_2$(dobdc) films that the stability of the membrane is significantly enhanced. In further support of this conclusion, the polymer glass transition temperature was observed to increase from 393 to 397° C. upon addition of $Ni_2$(dobdc) (see Table 8), indicating that the polymer is more rigid when in contact with the nanocrystals.

TABLE 8

Elevation of glass transition temperature upon addition of $Ni_2$(dobdc) nanocrystals.

| $Ni_2$(dobdc) Loading (wt %) | Tg (° C.) |
| --- | --- |
| 0 | 393 |
| 6 | 396 |
| 25 | 397 |

Figure 19B:
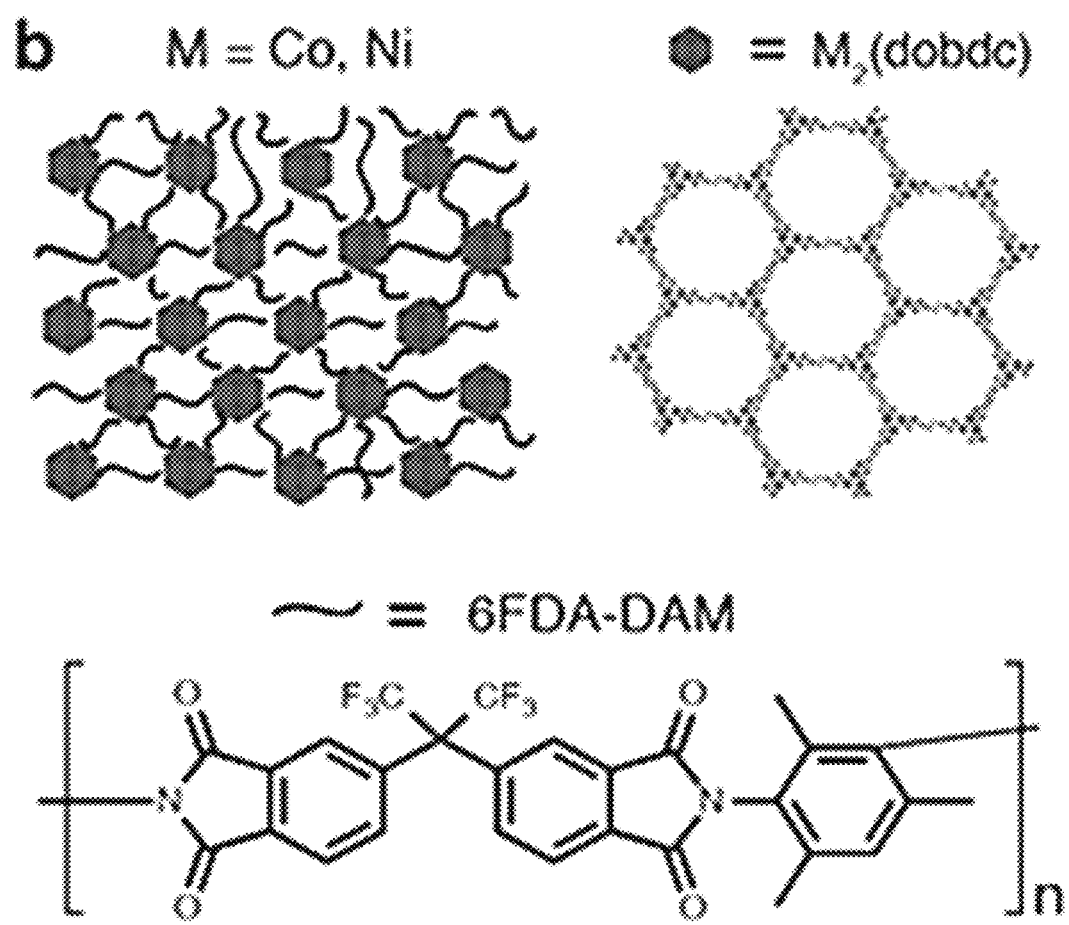
Figure 19C:
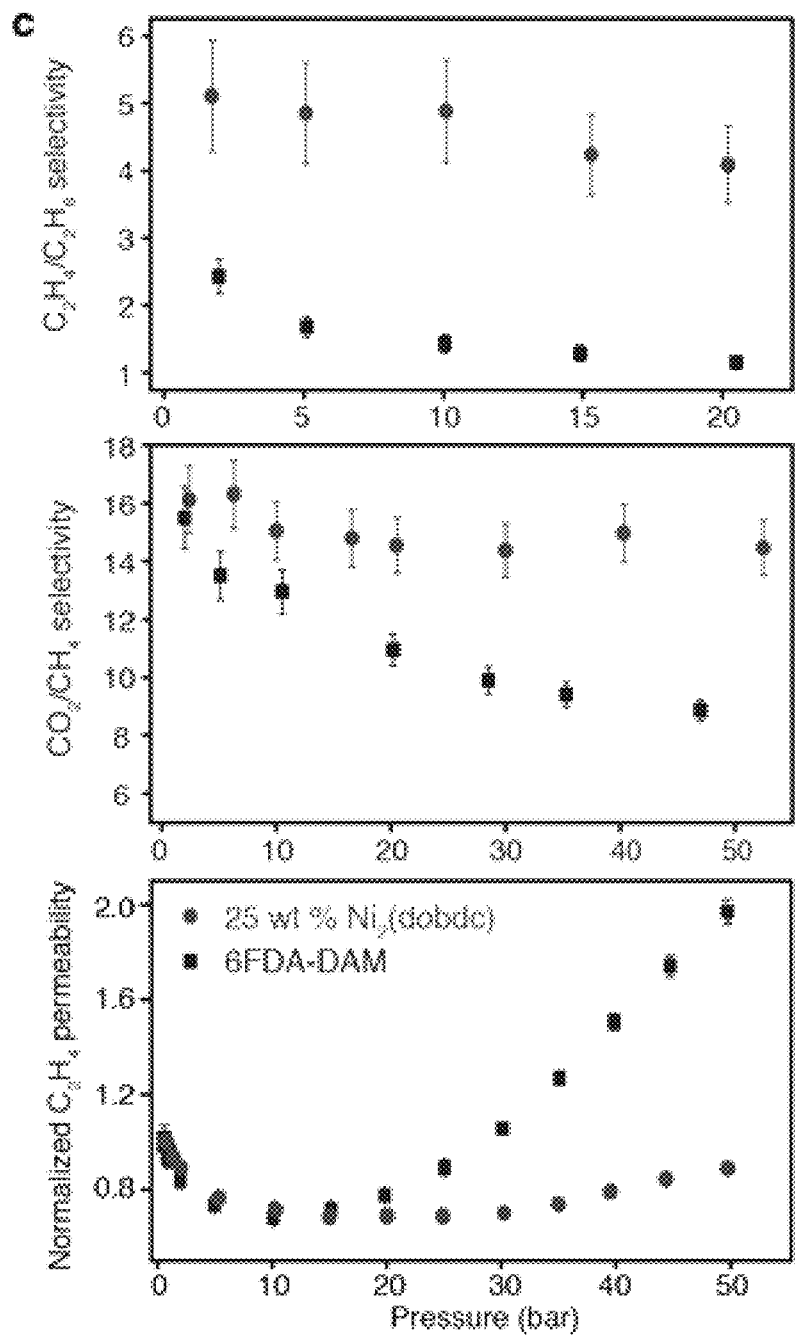

Thus, gel fraction and glass transition temperature results suggest that increased nanocrystal-polymer interfacial interactions reduce mobility of the polymer chains. FIG. 19B shows an illustration of the two types of $M_2$(dobdc) nanocrystal-polymer interactions we have observed for our samples, one with strong interactions and a homogenous nanocrystal distribution, and the other with weaker interactions leading to larger nanocrystal agglomerates.

Studying the Plasticization Pressure Response of the Membranes to Strongly Polarizable Gasses.

When polymer chains are mobile, a membrane is highly susceptible to plasticization, since the interaction with a penetrating gas can have a solvating effect on the polymer, thereby disrupting interchain interactions. Modifying the interchain interactions to reduce chain mobility, as occurs upon incorporating $Co_2$(dobdc) and $Ni_2$(dobdc) nanocrystals within 6FDA-DAM, should act to create plasticization resistance. To investigate this, the plasticization pressure response of these membranes was tracked for three strongly polarizable gasses. In addition to ethylene and ethane, we chose to study $CO_2$ in order to compare with other studies on membrane plasticization. Since permeability is normalized to the upstream pressure, the permeability of a non-plasticizing gas such as $CH_4$ or $N_2$ will remain constant or slightly decrease (see FIG. 10-11) upon increasing the pressure. If a plasticizing gas is tested in a permeation experiment, at a certain pressure, the permeability will begin to increase, and this pressure is known as the plasticization pressure. To a first approximation, a membrane with a higher plasticization pressure has a stronger resistance to plasticization than a membrane with a lower plasticization pressure. For membranes containing $Co_2$(dobdc) and $Ni_2$(dobdc) nanocrystals, we observed a significantly enhanced resistance to plasticization (see FIG. 19C, FIGS. 10-11, and FIG. 24), as indicated by a large increase in the plasticization pressure. For ethylene, ethane, and $CO_2$, the plasticization pressure shifted from ~10 bar for the pure polymer to greater than 20 bar for the nanocrystal-loaded films. Although an increase in the plasticization pressure is indicative of a reduction in membrane plasticization, the retention of high selectivities with increasing feed pressure is more conclusive. The permeation of equimolar mixtures of ethylene/ethane or $CO_2/CH_4$ were tested on 6FDA-DAM as well as 25 wt % $Ni_2$(dobdc). Due to membrane plasticization, 6FDA-DAM becomes nearly non-selective for ethylene/ethane at 20 bar feed pressure, and the selectivity for $CO_2/CH_4$ drops from 15.5 (1.0) at 2 bar feed pressure to 8.9 (0.4) at 47 bar. Upon incorporation of $Ni_2$(dobdc), no reduction in selectivities were observed under high pressure, mixed-gas conditions. For the nanocrystal composite, selectivities of 4.1 (0.6) at 20.5 bar of ethylene/ethane and 14.5 (0.9) at 52.5 bar of $CO_2/CH_4$ were observed. To the best of our knowledge, this is the first demonstration of a composite material that suppresses plasticization without losses in permeability or selectivity. Even more importantly, industrial ethylene/ethane separations would ideally be conducted near 20 bar, which is well above the plasticization pressure for most polymer membranes and renders these membranes non-selective, but is well below the plasticization pressure attainable with the approach established here.

A number of embodiments have been described herein. Nevertheless, it will be understood that various modifications may be made without departing from the spirit and scope of this disclosure. Accordingly, other embodiments are within the scope of the following claims.

What is claimed is:

1. A composite membrane comprising a plurality of nanocrystalline metal organic framework (MOF) nanoparticles having an average particle size of less than about 200 nanometers dispersed within a polymer material, wherein the composite membrane maintains high selectivity for a component gas in the presence a mixture of gases when compared to the pure polymer material not having the MOF, wherein the mixture of gases contains the component gas and at least one plasticizing gas, wherein the MOF comprises one or more cores comprising one or more linking moieties obtained from:

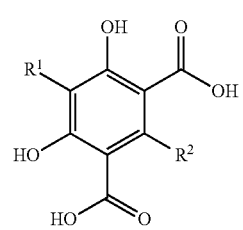

Formula (I)

or

Formula (II)

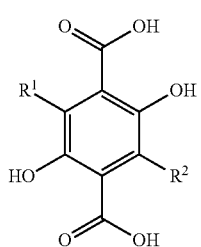

wherein,
R¹-R² are independently selected from the group comprising H, D, optionally substituted FG, optionally substituted alkyl, optionally substituted heteroalkyl, optionally substituted alkenyl, optionally substituted heteroalkenyl, optionally substituted alkynyl, optionally substituted heteroalkynyl, optionally substituted cycloalkyl, optionally substituted cycloalkenyl, optionally substituted aryl, optionally substituted heterocycle, and optionally substituted mixed ring system, and
wherein the one or more cores comprise $Co^{2+}$ and/or $Ni^{2+}$.

2. The composite membrane of claim 1, wherein the polymer material is selected from the group consisting of polyimides, polyetherimides, polyamides, aryl polyetherimides, cellulosic polymers, polycarbonate polymers, polysulfone, polyether, polyester polymers, polyarylate polymers, polysulfide polymers, and polyphosphazines.

3. The composite membrane of claim 1, wherein the polymer material is a 6FDA-based polyimide material, wherein 6FDA=(4,4'-hexafluoroisopropylidene) diphthalic anhydride).

4. The composite membrane of claim 3, wherein the polymer material comprises 6FDA-DAM, 6-FDA-Durene, or 6FDA-Durene:Jeffamine copolymers.

5. The composite membrane of claim 1, wherein the MOF comprises one or more cores obtained from linking moieties of structural Formula I(a) or Formula II(a):

Formula I(a)

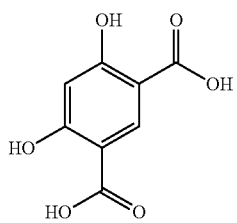

or

Formula II(a)

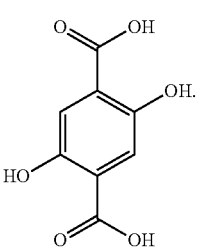

6. The composite membrane of claim 1, wherein the MOF material imparts chemical stability to the composite membrane.

7. The composite membrane of claim 1, wherein the MOF imparts adsorptive selectivity to the composite membrane.

8. A method to separate a component gas from a gas mixture comprising:
contacting the gas mixture with a composite membrane of claim 1, wherein the component gas is selectively adsorbed to the polymer membrane, and wherein the polymer membrane exhibits resistance to plasticization effects from plasticizing gases when exposed to a mixture of gases continuing at least one plasticizing gas.

9. The method of claim 8, wherein the method is carried out in the presence of plasticizing gases.

10. The method of claim 9, wherein the plasticizing gases are selected from $CO_2$, $C_2H_4$, $C_2H_6$, $C_3H_6$, $C_3H_8$, and/or butanes.

11. The method of claim 8, wherein the method can be carried out at a pressure of greater than 10 bar.

12. The method of claim 8, wherein the membrane selectively adsorbs a high density gas.

13. The method of claim 12, where the membrane can separate $CO_2$ from $CH_4$, $CO_2$ from $N_2$, $CO_2$ from $H_2$, $C_2H_4$ from $C_2H_6$, $C_3H_6$ from $C_3H_8$, $CH_4$ from $C_2H_6$, $H_2$ from hydrocarbons, and/or butenes or longer chain alkenes from alkanes.

14. The composite membrane of claim 1, wherein the MOF nanoparticles have an average particle size of less than about 100 nanometers.

15. The composite membrane of claim 1, wherein the MOF nanoparticles interact with the polymer via a metal-polymer interaction.

* * * * *